US009722433B2

United States Patent
Ichikawa et al.

(10) Patent No.: US 9,722,433 B2
(45) Date of Patent: Aug. 1, 2017

(54) POWER RECEIVING DEVICE, POWER TRANSMITTING DEVICE AND POWER TRANSFER SYSTEM

(71) Applicants: Shinji Ichikawa, Toyota (JP); Masayuki Komatsu, Toyota (JP); Shigeru Abe, Saitama (JP); Hiroyoshi Kaneko, Saitama (JP)

(72) Inventors: Shinji Ichikawa, Toyota (JP); Masayuki Komatsu, Toyota (JP); Shigeru Abe, Saitama (JP); Hiroyoshi Kaneko, Saitama (JP)

(73) Assignees: TOYOTA JIDOSHA KABUSHIKI KAISHA, Toyota (JP); NATIONAL UNIVERSITY CORPORATION SAITAMA UNIVERSITY, Saitama (JP)

( * ) Notice: Subject to any disclaimer, the term of this patent is extended or adjusted under 35 U.S.C. 154(b) by 209 days.

(21) Appl. No.: 14/764,219

(22) PCT Filed: Jan. 30, 2014

(86) PCT No.: PCT/IB2014/000087
§ 371 (c)(1),
(2) Date: Jul. 29, 2015

(87) PCT Pub. No.: WO2014/118615
PCT Pub. Date: Aug. 7, 2014

(65) Prior Publication Data
US 2015/0372498 A1 Dec. 24, 2015

(30) Foreign Application Priority Data

Jan. 31, 2013 (JP) ................................. 2013-017339

(51) Int. Cl.
*H02J 5/00* (2016.01)
*B60L 11/18* (2006.01)
(Continued)

(52) U.S. Cl.
CPC ............. *H02J 5/005* (2013.01); *B60L 11/005* (2013.01); *B60L 11/14* (2013.01); *B60L 11/182* (2013.01);
(Continued)

(58) Field of Classification Search
CPC ....... Y02T 90/127; Y02T 90/122; Y04S 30/14
(Continued)

(56) References Cited

U.S. PATENT DOCUMENTS

2011/0169337 A1 7/2011 Kozakai
2012/0007437 A1 1/2012 Fells et al.

FOREIGN PATENT DOCUMENTS

CN 101836272 A 9/2010
JP 2011-142559 A 7/2011
(Continued)

Primary Examiner — Robert Deberadinis
(74) Attorney, Agent, or Firm — Oliff PLC

(57) ABSTRACT

A power transmitting device includes power transmitting coils, which contactlessly transmit electric power to a power receiving coil, and a switching device. When the power receiving coil is a solenoid coil, the switching device connects the power transmitting coils in parallel with each other such that magnetic fluxes generated inside the power transmitting coils flowing in the same direction along a winding axis. When the power receiving coil is a circular coil, the switching device connects the power transmitting coils in series with each other such that magnetic fluxes generated inside the power transmitting coils flowing in opposite directions along the winding axis.

11 Claims, 26 Drawing Sheets

(51) Int. Cl.
*B60L 11/00* (2006.01)
*B60L 11/14* (2006.01)
*H01F 38/14* (2006.01)
*H02J 7/02* (2016.01)
*H04B 5/00* (2006.01)
*H02J 17/00* (2006.01)
*H01F 29/02* (2006.01)

(52) U.S. Cl.
CPC ....... B60L 11/1803 (2013.01); B60L 11/1833 (2013.01); B60L 11/1848 (2013.01); B60L 11/1861 (2013.01); B60L 11/1877 (2013.01); B60L 11/1887 (2013.01); H01F 38/14 (2013.01); H02J 7/025 (2013.01); H02J 17/00 (2013.01); H04B 5/0037 (2013.01); H04B 5/0087 (2013.01); *B60L 2210/30* (2013.01); *B60L 2210/40* (2013.01); *B60L 2230/14* (2013.01); *B60L 2230/16* (2013.01); *B60L 2240/547* (2013.01); *B60L 2240/549* (2013.01); *B60L 2250/16* (2013.01); *B60L 2260/28* (2013.01); *H01F 29/02* (2013.01); *Y02T 10/70* (2013.01); *Y02T 10/705* (2013.01); *Y02T 10/7022* (2013.01); *Y02T 10/7044* (2013.01); *Y02T 10/7077* (2013.01); *Y02T 10/7088* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 30/14* (2013.01)

(58) Field of Classification Search
USPC .......................................... 307/104
See application file for complete search history.

(56) References Cited

FOREIGN PATENT DOCUMENTS

| | | |
|---|---|---|
| JP | 2012-170195 A | 9/2012 |
| JP | 2014-131417 A | 7/2014 |

F I G . 23
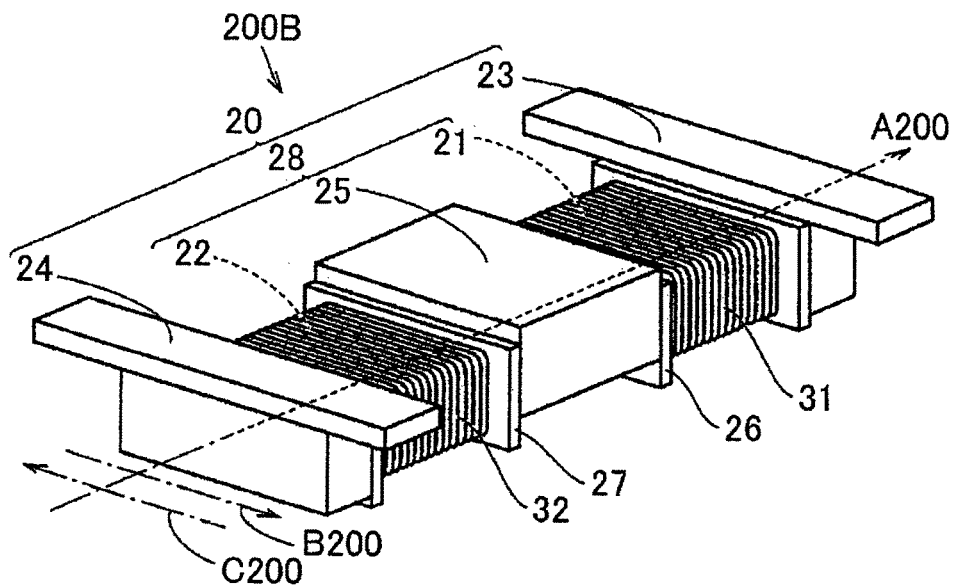
F I G . 24
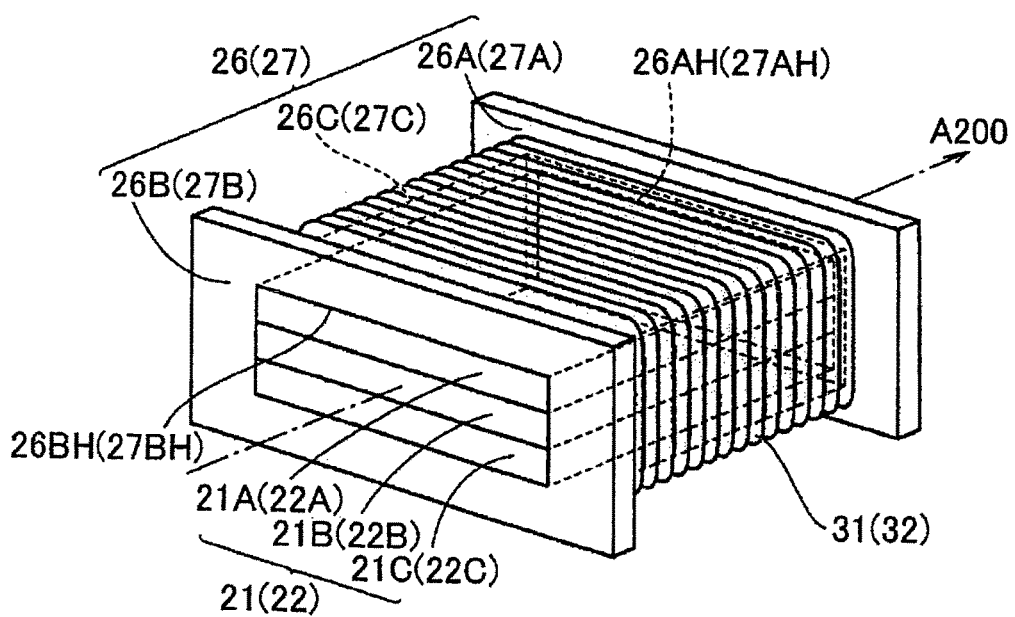

F I G . 29
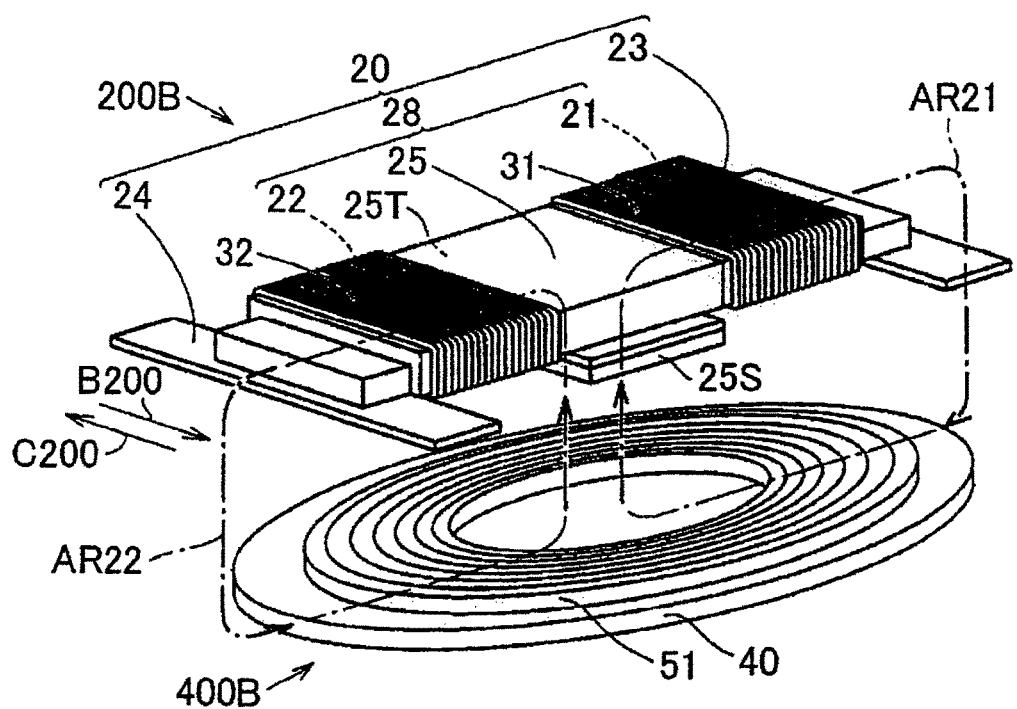

POWER RECEIVING DEVICE, POWER TRANSMITTING DEVICE AND POWER TRANSFER SYSTEM

BACKGROUND OF THE INVENTION

1. Field of the Invention

The invention relates to a power receiving device, a power transmitting device and a power transfer system.

2. Description of Related Art

With consideration for a natural environment, an electromotive vehicle, such as a hybrid vehicle and an electric vehicle, has become a focus of attention. The electromotive vehicle drives drive wheels by using electric power of a battery, or the like. In recent years, wireless charging that allows a battery of an electromotive vehicle to be charged contactlessly without using a plug, or the like, has become a focus of attention.

Japanese Patent Application Publication No. 2012-170195 (JP 2012-170195 A) describes the invention that relates to a contactless power supply system. In this contactless power supply system, when the specifications of supplied electric power are different between a power transmitting coil and a power receiving coil, a smaller one of the supplied electric powers is supplied. When the specifications of the gap length are different between the power transmitting coil and the power receiving coil, electric power is supplied in the gap length according to the specifications of the power transmitting coil. JP 2012-170195 A describes that, with the contactless power supply system, it is possible to share the power transmitting coil and the power receiving coil among contactless power supply transformers having different types of specifications.

Japanese Patent Application Publication No. 2011-142559 (JP 2011-142559 A) describes an invention that relates to a power supply system. The power supply system includes a power generating unit, a power supply element, a resonant element and a variable matching unit. The power supply element is formed of a coil that is supplied with electric power generated by the power generating unit. The resonant element is coupled to the power supply element through electromagnetic induction. The variable matching unit has an impedance matching function for electric power at a power supply point of the power supply element. The power supply element is configured to be able to change its diameter. The variable matching unit changes the diameter of the power supply element. JP 2011-142559 A describes that, with the power supply system, it is possible to achieve variable impedance matching at a low loss.

SUMMARY OF THE INVENTION

The invention provides a power receiving device, power transmitting device and power transfer system that, when electric power is transmitted to or received by one coil with the use of two coils electrically connected to each other and arranged at an interval, switch a connection mode of the two coils on the basis of the type of the one coil.

A first aspect of the invention provides a power transmitting device. The power transmitting device includes; a power transmitting coil configured to contactlessly transmit electric power to a power receiving coil in a state where the power transmitting coil faces the power receiving coil; and a switching device. The power transmitting coil includes a first power transmitting coil and a second power transmitting coil. The first power transmitting coil is provided so as to surround a winding axis extending in a winding axis direction that intersects with a facing direction in which the power transmitting coil faces the power receiving coil. The second power transmitting coil is electrically connected to the first power transmitting coil and is arranged next to the first power transmitting coil in the winding axis direction with a gap from the first power transmitting coil. The switching device is configured to, when the power receiving coil is a solenoid coil, connect the first power transmitting coil and the second power transmitting coil in parallel with each other such that first magnetic flux generated inside the first power transmitting coil and second magnetic flux generated inside the second power transmitting coil flowing in the same direction along the winding axis, and the switching device is configured to, when the power receiving coil is a circular coil, connect the first power transmitting coil and the second power transmitting coil in series with each other such that the first magnetic flux and the second magnetic flux flowing in opposite directions along the winding axis.

The power transmitting device may further include a core around which the power transmitting coil is wound. The core may include a first shaft portion around which the first power transmitting coil is wound, a second shaft portion around which the second power transmitting coil is wound, an intermediate portion provided between the first shaft portion and the second shaft portion, and an outside magnetic pole portion provided so as to extend in an intersecting direction that intersects with both the facing direction and the winding axis direction, the outside magnetic pole portion located on one end of the first shaft portion in the winding axis direction, the one end of the first portion being opposite to other end which faces the intermediate portion, the length of the intermediate portion being smaller in the intersecting direction than the length of the outside magnetic pole portion in the intersecting direction.

The length of the intermediate portion may be larger in the winding axis direction than the length of the outside magnetic pole portion. The length of the intermediate portion may be larger in the intersecting direction than the length of the first shaft portion and the length of the second shaft portion. The winding axis direction may be a direction perpendicular to the facing direction.

A second aspect of the invention provides a power receiving device. The power receiving device includes: a power receiving coil configured to contactlessly receive electric power from a power transmitting coil in a state where the power receiving coil faces the power transmitting coil; and a switching device. The power receiving coil includes a first power receiving coil and a second power receiving coil. The first power receiving coil is provided so as to surround a winding axis extending in a winding axis direction that intersects with a facing direction in which the power receiving coil faces the power transmitting coil. The second power receiving coil is electrically connected to the first power receiving coil and is arranged next to the first power receiving coil in the winding axis direction with a gap from the first power receiving coil. The switching device is configured to, when the power transmitting coil is a solenoid coil, connect the first power receiving coil and the second power receiving coil in parallel with each other such that first magnetic flux generated inside the first power receiving coil and second magnetic flux generated inside the second power receiving coil flowing in the same direction along the winding axis, and the switching device is configured to, when the power transmitting coil is a circular coil, connect the first power receiving coil and the second power receiving coil in series with each other such that the first magnetic flux and the second magnetic flux flowing in opposite directions along the winding axis.

The power receiving device may further include a core around which the power receiving coil is wound. The core may include a first shaft portion around which the first power receiving coil is wound, a second shaft portion around which the second power receiving coil is wound, an intermediate portion provided between the first shaft portion and the second shaft portion, and an outside magnetic pole portion provided so as to extend in an intersecting direction that intersects with both the facing direction and the winding axis direction, the outside magnetic pole portion located on one end of the first shaft portion in the winding axis direction, the one end of the first portion being opposite to other end which faces the intermediate portion, the length of the intermediate portion being smaller in the intersecting direction than the length of the outside magnetic pole portion in the intersecting direction.

The length of the intermediate portion may be larger in the winding axis direction than the length of the outside magnetic pole portion. The length of the intermediate portion may be larger in the intersecting direction than the length of the first shaft portion and the length of the second shaft portion. The winding axis direction may be a direction perpendicular to the facing direction.

A third aspect of the invention provides a power transfer system. The power transfer system includes: a power receiving device; and a power transmitting device configured to contactlessly transmit electric power to the power receiving device in a state where the power transmitting device faces the power receiving device. One of the power receiving device and the power transmitting device includes a first coil, a second coil and a switching device. The first coil is provided so as to surround a winding axis extending in a winding axis direction that intersects with a facing direction in which the power receiving device and the power transmitting device face each other. The second coil is electrically connected to the first coil and is arranged next to the first coil in the winding axis direction with a gap from the first coil. The switching device is configured to, when a coil included in the other one of the power receiving device and the power transmitting device is a solenoid coil, connect the first coil and the second coil in parallel with each other such that first magnetic flux generated inside the first coil and second magnetic flux generated inside the second coil flowing in the same direction along the winding axis, and the switching device is configured to, when the coil included in the other one of the power receiving device and the power transmitting device is a circular coil, connect the first coil and the second coil in series with each other such that the first magnetic flux and the second magnetic flux flowing in opposite directions along the winding axis.

According to the aspects of the invention, it is possible to obtain the power receiving device, the power transmitting device and the power transfer system that, when electric power is transmitted to or received by one coil with the use of two coils electrically connected to each other and arranged with a gap from each other, switch a connection mode of the two coils on the basis of the type of the one coil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 23 is a perspective view that shows a power receiving unit of the power receiving device according to the second embodiment;

FIG. 24 is a perspective view that shows a support member used in the power receiving unit of the power receiving device according to the second embodiment;

FIG. 29 is a perspective view that schematically shows a state where electric power is transferred with the use of the power transfer system according to the second embodiment;

DETAILED DESCRIPTION OF EMBODIMENTS

Figure 1:
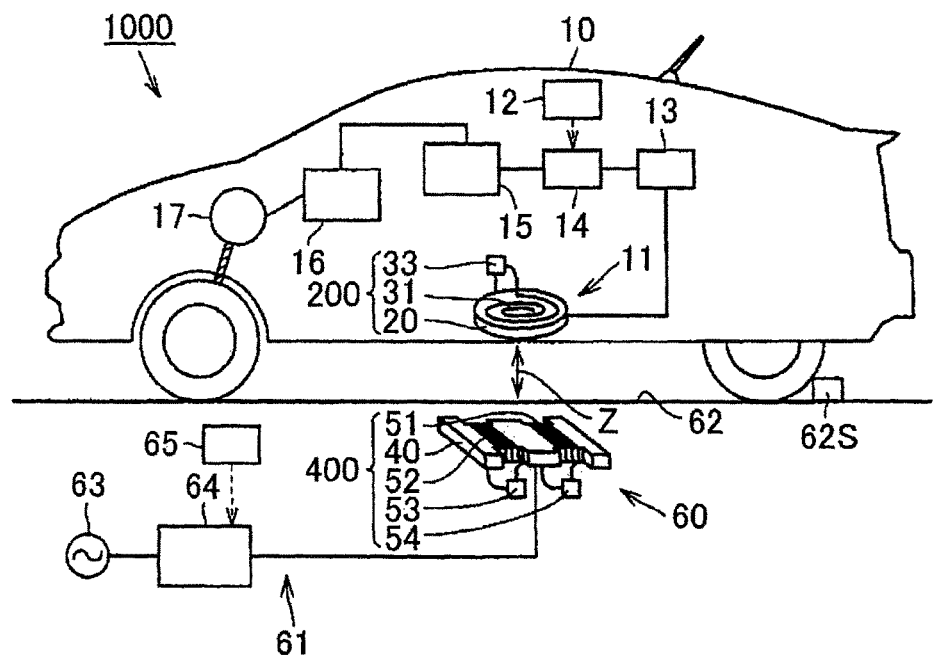
FIG. 1 is a view that schematically shows a power transfer system according to a first embodiment.

Hereinafter, embodiments of the invention will be described with reference to the accompanying drawings. In the description of the embodiments, when the number, the amount, and the like, are referred to, the scope of the invention is not always limited to those number, amount, and the like, unless otherwise specified. In the description of the embodiments, like reference numerals denote the same or corresponding components, and the overlap description may be omitted.

First Embodiment

<Power Transfer System 1000>

FIG. 1 is a view that schematically shows a power transfer system 1000, a power receiving device 11 and a power transmitting device 60 according to a first embodiment. As shown in FIG. 1, the power transfer system 1000 includes an external power supply device 61 and an electromotive vehicle 10.

<External Power Supply Device 61>

The external power supply device 61 includes the power transmitting device 60, a high-frequency power driver 64 and a power transmitting ECU 65 that serves as a control unit. The high-frequency power driver 64 is connected to an alternating-current power supply 63. The alternating-current power supply 63 may be a commercial power supply or an independent power supply device. The power transmitting device 60 is connected to the high-frequency power driver 64. The power transmitting ECU 65 executes drive control over the high-frequency power driver 64, and the like. The power transmitting device 60 includes a power transmitting unit 400, and is provided in a parking space 62.

The power transmitting unit 400 includes a ferrite core 40, coils 51, 52 (primary coils) and capacitors 53, 54 (capacitors). The coils 51, 52 that serve as power transmitting coils are arranged so as to surround the outer periphery of the core 40. The coil 51 (first power transmitting coil or first coil) and the coil 52 (second power transmitting coil or second coil) are electrically connected to the capacitors 53, 54 and the high-frequency power driver 64.

The coils 51, 52 each have a stray capacitance. In the power transmitting unit 400, an electric circuit is formed of the inductances of the coils 51, 52, the stray capacitances of the coils 51, 52 and the capacitances of the capacitors 53, 54. The capacitors 53, 54 are not indispensable components and may be used as needed. Further details of the core 40, the coils 51, 52, and the like, will be described later with reference to FIG. 6 to FIG. 10.

<Electromotive Vehicle 10>

The electromotive vehicle 10 includes an engine (not shown) and a fuel cell (not shown), and functions as a hybrid vehicle. The electromotive vehicle 10 may function as a fuel-cell vehicle or may function as an electric vehicle as long as the electromotive vehicle 10 is a vehicle that is driven by a motor. In the present embodiment, a power receiving object is a vehicle; instead, the power receiving object may be a device other than the vehicle.

The electromotive vehicle 10 includes the power receiving device 11, a vehicle electronic control unit (ECU) 12, a rectifier 13, a DC/DC converter 14, a battery 15, a power control unit 16 and a motor unit 17.

The power receiving device 11 receives electric power from the power transmitting device 60 in a state where the electromotive vehicle 10 is stopped at a predetermined position in the parking space 62 and the power receiving device 11 faces the power transmitting device 60. A sprag 62S and a line (not shown) indicating a parking position and a parking area are provided in the parking space 62 in order to cause the electromotive vehicle 10 to stop at the predetermined position. The power receiving device 11 includes a power receiving unit 200.

The power receiving unit 200 includes a ferrite core 20, a coil 31 (secondary coil) and a capacitor 33. The coil 31 is arranged concentrically, and is connected to the rectifier 13. The core 20 and the coil 31 constitute a circular coil-type coil unit. Magnetic fluxes generated around the core 20 each have a so-called doughnut shape, and pass through the center portion of the core 20 having a circular shape. The center portion here is near the center of the outer shape circle of the core 20 and is a hollow portion on the inside of the coil 31 where no coil 31 is present.

The coil 31 has a stray capacitance. In the power receiving unit 200, an electric circuit is formed of the inductance of the coil 31, the stray capacitance of the coil 31 and the capacitance of the capacitor 33. The capacitor 33 is not an indispensable component and may be used as needed.

The DC/DC converter 14 is connected to the rectifier 13. The rectifier 13 converts alternating current, supplied from the power receiving device 11, to direct current, and supplies the direct current to the DC/DC converter 14. The battery 15 is connected to the DC/DC converter 14. The DC/DC converter 14 adjusts the voltage of direct current supplied from the rectifier 13, and supplies the direct current to the battery 15.

The vehicle ECU 12 executes drive control over the DC/DC converter 14, the power control unit 16, and the like. The DC/DC converter 14 is not an indispensable component and may be used as needed. When the DC/DC converter 14 is not used, a matching transformer may be provided between the power transmitting device 60 and high-frequency power driver 64 of the external power supply device 61 (described in detail later). The matching transformer may be substituted for the DC/DC converter 14 by matching impedance.

The power control unit 16 is connected to the battery 15. The motor unit 17 is connected to the power control unit 16. The power control unit 16 includes a converter (not shown) connected to the battery 15 and an inverter (not shown) connected to the converter.

The converter adjusts (steps up) direct current supplied from the battery 15, and supplies the direct current to the inverter. The inverter converts direct current, supplied from the converter, to alternating current, and supplies the alternating current to the motor unit 17. The motor unit 17 includes a motor generator that functions as a generator and a motor generator that functions as an electric motor. For example, a three-phase alternating-current motor may be used as the motor unit 17. The motor unit 17 is driven by alternating current supplied from the inverter of the power control unit 16.

Figure 2:
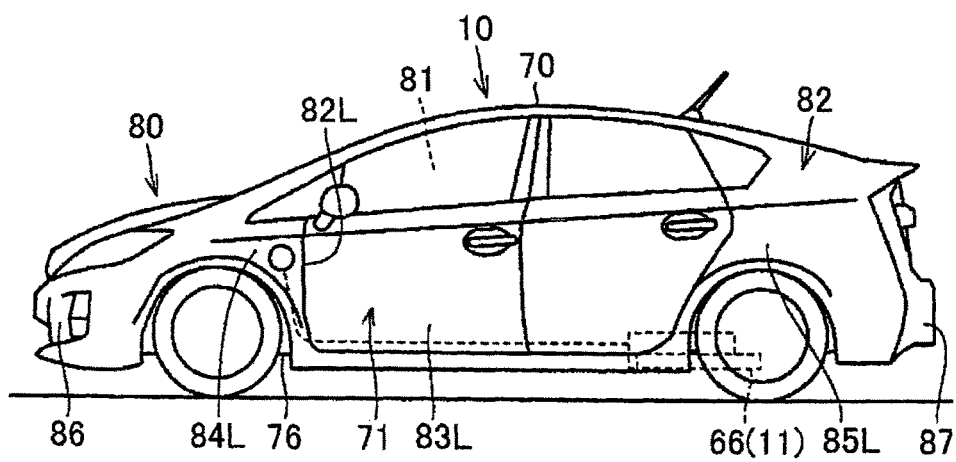
FIG. 2 is a left side view that shows an electromotive vehicle of the power transfer system according to the first embodiment.

FIG. 2 is a left side view that shows the electromotive vehicle 10. As shown in FIG. 2, the electromotive vehicle 10 further includes a vehicle body 70 and wheels. A drive compartment 80, a passenger compartment 81 and a luggage compartment 82 are provided inside the vehicle body 70. The motor unit 17 shown in FIG. 1, the engine (not shown), and the like, are accommodated in the drive compartment 80. The passenger compartment 81 is located on the rear side of the drive compartment 80 in the travel direction of the electromotive vehicle 10. The luggage compartment 82 is located on the rear side of the passenger compartment 81 in the travel direction of the electromotive vehicle 10.

A passenger opening 82L, a door 83L, a front fender 84L, a front bumper 86, a rear fender 85L and a rear bumper 87 are provided at a left side face 71 of the vehicle body 70. The passenger opening 82L communicates with the passenger compartment 81. The door 83L opens or closes the passenger opening 82L. The front fender 84L is located on the front side of the passenger opening 82L in the travel direction of the electromotive vehicle 10.

The front bumper 86 is located on the front side of the front fender 84L in the travel direction of the electromotive vehicle 10. The rear fender 85L is located on the rear side of the passenger opening 82L in the travel direction of the electromotive vehicle 10. The rear bumper 87 is located on the rear side of the rear fender 85L in the travel direction of the electromotive vehicle 10. A right side face (not shown) of the vehicle body 70 has a similar configuration to that of the left side face 71 of the vehicle body 70.

Figure 3:
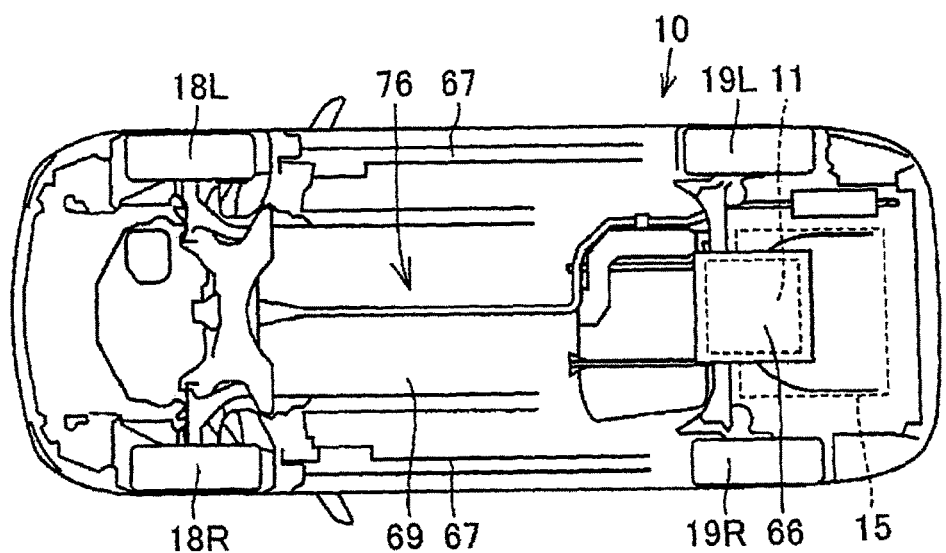
FIG. 3 is a bottom view that shows the electromotive vehicle of the power transfer system according to the first embodiment.

FIG. 3 is a bottom view that shows the electromotive vehicle 10. As shown in FIG. 3, the electromotive vehicle 10 has a bottom face 76. The bottom face 76 of the electromotive vehicle 10 is a visually recognizable region within the electromotive vehicle 10 when the electromotive vehicle 10 is viewed from a location distanced vertically downward with respect to a ground surface in a state where the wheels (tires) of the electromotive vehicle 10 are in contact with the ground surface.

The electromotive vehicle 10 includes front wheels 18R, 18L arranged in the width direction of the electromotive vehicle 10 and rear wheels 19R, 19L arranged in the width direction of the electromotive vehicle 10. The front wheels 18R, 18L are located to the front side of the rear wheels 19R, 19L in the travel direction of the electromotive vehicle 10. In the electromotive vehicle 10, the front wheels 18R, 18L may constitute drive wheels or the rear wheels 19R, 19L may constitute drive wheels or both the front wheels and the rear wheels may constitute drive wheels.

A floor panel 69, side members 67 and cross members are provided at the bottom face 76 of the electromotive vehicle 10. The floor panel 69 partitions the inside of the electromotive vehicle 10 and the outside of the electromotive vehicle 10 from each other. The side members 67 are arranged on the lower face of the floor panel 69. The cross members are arranged on the lower face of the floor panel 69. The power receiving device 11 according to the present embodiment is provided on the bottom face 76 of the electromotive vehicle 10 in a state where the power receiving device 11 is contained in a case 66, and is arranged between the rear wheel 19R and the rear wheel 19L. The battery 15 is arranged near the power receiving device 11.

Various methods may be employed in order to fix the power receiving device 11 to the bottom face 76 of the electromotive vehicle 10. For example, the power receiving device 11 may be fixed to the bottom face 76 of the electromotive vehicle 10 by suspending the power receiving device 11 from the side members 67 or the cross members. The power receiving device 11 may be fixed to the floor panel 69.

<Circuit Configuration>

Figure 4:
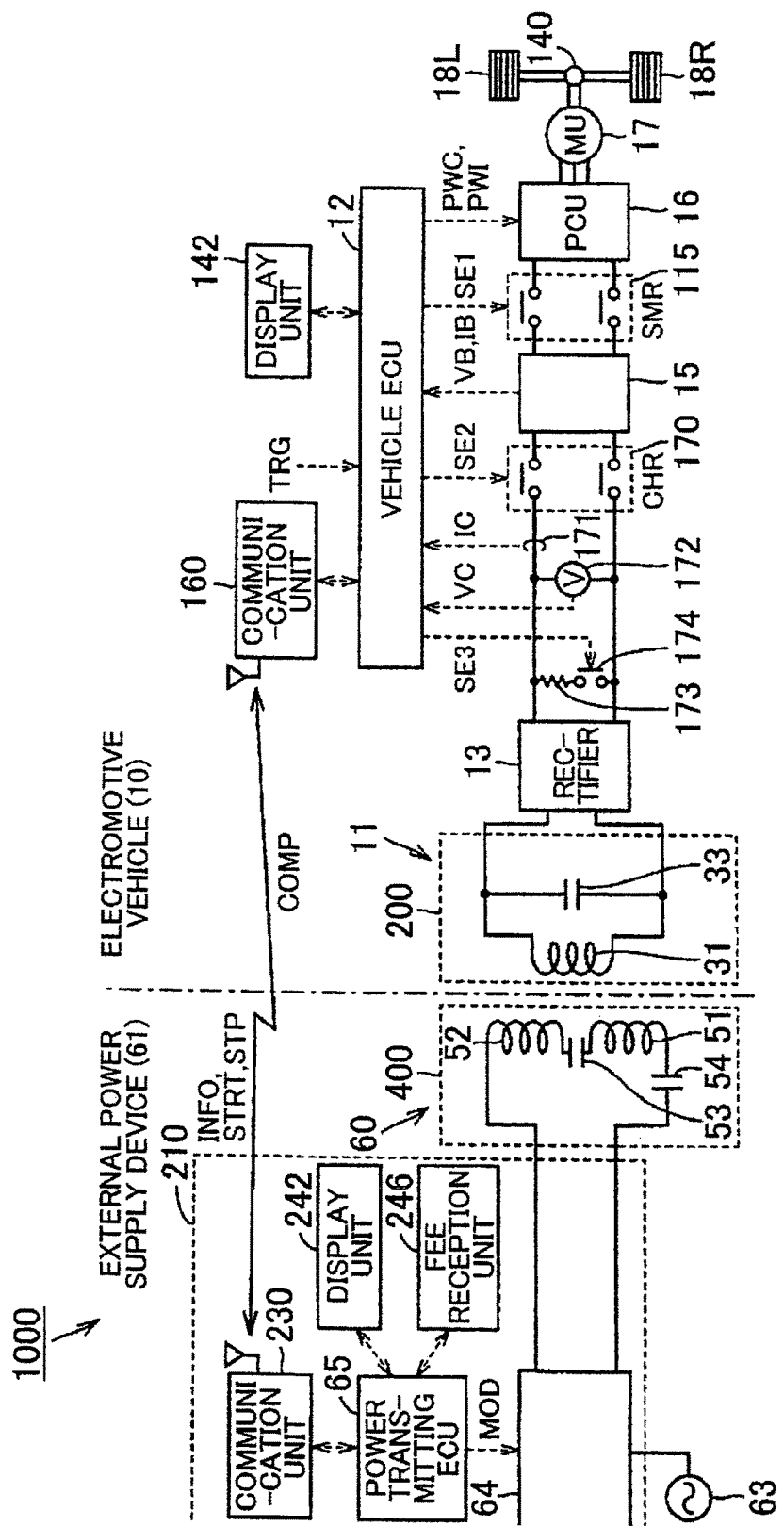
FIG. 4 is a view that shows the detailed circuit configuration of the power transfer system according to the first embodiment.

FIG. 4 is a view that shows the detailed circuit configuration of the power transfer system 1000 (also see FIG. 1). Hereinafter, the detailed circuit configuration of the electromotive vehicle 10 and external power supply device 61 will be described.

<Electromotive Vehicle 10>

The electromotive vehicle 10 includes the power receiving device 11 (power receiving unit 200), the rectifier 13, a charging relay (CHR) 170, the battery 15, a system main relay (SMR) 115, the power control unit (PCU) 16, the motor unit (MU) 17, a power transmission gear 140, the front wheels 18R, 18L (drive wheels), the vehicle ECU 12 that serves as the control unit, a display unit 142, a communication unit 160, a current sensor 171, a voltage sensor 172, a load resistor 173 and a relay 174.

The power receiving unit 200 of the power receiving device 11 includes the coil 31, which serves as a power receiving coil, and the capacitor 33. The capacitor 33 is connected in parallel with the coil 31. As described above, the capacitor 33 is not an indispensable component and may be used as needed.

The capacitor 33 constitutes an LC resonant circuit together with the coil 31. The capacitance of the capacitor 33 is set as needed on the basis of the inductance of the coil 31 such that a predetermined frequency is obtained. The capacitor 33 may be one or a plurality of switching capacitors selected from among a plurality of switching capacitors having different capacitances by switching electrical connection. The capacitor 33 may be the one (for example variable capacitor) of which the capacitance is adjustable. These switching capacitor and variable capacitor may be used as the capacitor 33 in combination.

The coil 31 contactlessly receives electric power from the coils 51, 52 (primary coils) of the power transmitting unit 400 of the power transmitting device 60 through electromagnetic induction by using an electromagnetic field. The number of turns of the coil 31 and a distance from the coil 31 to the coils 51, 52 are set as needed on the basis of the distance between the coil 31 and the coils 51, 52, the frequency of the coils 51, 52, the frequency of the coil 31, and the like, such that a coupling coefficient κ that indicates the degree of coupling between the coils 51, 52 and the coil 31, and the like, become appropriate values.

The coil 31 outputs received electric power to the rectifier 13. The rectifier 13 rectifies alternating-current power received from the coil 31, and outputs the rectified direct-current power to the battery 15 via the charging relay 170. For example, a diode bridge and a smoothing capacitor (both are not shown) are included as the rectifier 13. A so-called switching regulator that carries out rectification by using switching control may also be used as the rectifier 13. The rectifier 13 may be included in the power receiving unit 200, and the rectifier 13 is more desirably a static rectifier, such as a diode bridge, in order to prevent, for example, erroneous operation of switching elements due to an electromagnetic field generated.

In the configuration shown in FIG. 4, direct-current power rectified by the rectifier 13 is directly output to the battery 15. When a rectified direct-current voltage differs from a charging voltage that is allowed by the battery 15, the DC/DC converter 14 (see FIG. 1) for voltage conversion may be provided between the rectifier 13 and the battery 15 as described with reference to FIG. 1.

The load resistor 173 and the relay 174 that are connected in series with each other for position detection are connected to the output portion of the rectifier 13. Before full-scale charging is started, a small electric power is transmitted from the external power supply device 61 to the vehicle as a test signal. At this time, the relay 174 is controlled by a control signal SE3 from the vehicle ECU 12, and is set to a conductive state.

The voltage sensor 172 is provided between a pair of power lines that connect the rectifier 13 to the battery 15. The voltage sensor 172 detects a secondary-side direct-current voltage of the rectifier 13, that is, a received voltage received from the power transmitting device 60, and then outputs the detected value VC to the vehicle ECU 12. The vehicle ECU 12 determines a power receiving efficiency on the basis of the voltage VC, and transmits information about the power receiving efficiency to the external power supply device 61 via the communication unit 160.

The current sensor 171 is provided in one of the power lines that connect the rectifier 13 to the battery 15. The current sensor 171 detects a charging current for charging the battery 15, and outputs the detected value IC to the vehicle ECU 12. The charging relay 170 is electrically connected to the rectifier 13 and the battery 15. The charging relay 170 is controlled by a control signal SE2 from the vehicle ECU 12, and switches between supply of electric power from the rectifier 13 to the battery 15 and interruption of supply of the electric power.

The battery 15 is an electric power storage element that is configured to be chargeable and dischargeable. The battery 15 is, for example, formed to include a secondary battery, such as a lithium ion battery, a nickel-metal hydride battery and a lead-acid battery, or an electrical storage element, such as an electric double layer capacitor. The battery 15 is connected to the rectifier 13 via the charging relay 170. The battery 15 stores electric power received by the power receiving unit 200 and rectified by the rectifier 13.

The battery 15 is connected to the power control unit 16 via the system main relay 115. The battery 15 supplies electric power for generating vehicle driving force to the power control unit 16. The battery 15 stores electric power generated by the motor unit 17. The output of the battery 15 is, for example, about 200 V.

A voltage sensor and a current sensor (both are not shown) are provided for the battery 15. The voltage sensor is used to detect a voltage VB of the battery 15. The current sensor is used to detect a current IB input to or output from the battery 15. These detected values are output to the vehicle ECU 12. The vehicle ECU 12 computes the state of charge (also referred to as "SOC") of the battery 15 on the basis of the voltage VB and the current IB.

The system main relay 115 is inserted in power lines that connect the battery 15 to the power control unit 16. The system main relay 115 is controlled by a control signal SE1 from the vehicle ECU 12, and switches between supply of electric power between the battery 15 and the power control unit 16 and interruption of supply of the electric power.

The power control unit 16 includes the converter and the inverter (both are not shown). The converter is controlled by a control signal PWC from the vehicle ECU 12, and converts voltage from the battery 15. The inverter is controlled by a control signal PWI from the vehicle ECU 12, and drives the motor unit 17 by using electric power converted by the converter.

The motor unit 17 functions as an alternating-current rotary electric machine. For example, a permanent magnet synchronous motor that includes a rotor in which a permanent magnet is embedded is used as the motor unit 17. The output torque of the motor unit 17 is transmitted to the drive wheels (front wheels 18R, 18L) via the power transmission gear 140 to cause the electromotive vehicle 10 to travel. The motor unit 17 is able to generate electric power by using the rotational force of the drive wheels during regenerative braking operation of the electromotive vehicle 10. Electric power generated during regenerative braking operation is converted by the power control unit 16 to charging electric power for charging the battery 15.

In the hybrid vehicle equipped with the engine (not shown) in addition to the motor unit 17, the engine and the motor unit 17 are cooperatively operated to generate vehicle driving force. In this case, the battery 15 may be charged with electric power generated through rotation of the engine.

The communication unit 160 is a communication interface for carrying out wireless communication between the electromotive vehicle 10 and the external power supply device 61. The communication unit 160 outputs battery information INFO about the battery 15, including the SOC, from the vehicle ECU 12 to the external power supply device 61. The communication unit 160 outputs a signal STRT or a signal STP, which instructs the external power supply device 61 to start or stop transmission of electric power, to the power transmitting device 60.

The vehicle ECU 12 includes a central processing unit (CPU), a storage unit and an input/output buffer, which are not shown in the drawings. The vehicle ECU 12 inputs signals from the sensors, and the like, outputs control signals to the devices, and controls the electromotive vehicle 10 and the devices. Control over the electromotive vehicle 10 and the devices is not only limited to processing by software but may also be processed by exclusive hardware (electronic circuit).

When the vehicle ECU 12 receives a charging start signal TRG through user's operation, or the like, the vehicle ECU 12 outputs the signal STRT for instructions to start transmission of electric power to the external power supply device 61 via the communication unit 160 on the basis of the fact that a predetermined condition is satisfied. The vehicle ECU 12 outputs the signal STP for instructions to stop transmission of electric power to the external power supply device 61 via the communication unit 160 on the basis of the fact that the battery 15 is fully charged, user's operation, or the like.

The display unit 142 of the electromotive vehicle 10, for example, indicates a determination result as to whether the power transmitting unit 400 of the external power supply device 61 is compatible with the power receiving unit 200 of the electromotive vehicle 10 after the vehicle ECU 12 communicates with the external power supply device 61.

<External Power Supply Device 61>

The external power supply device 61 includes a charging station 210 and the power transmitting device 60 (power transmitting unit 400). The charging station 210 includes a communication unit 230, the power transmitting ECU 65 that serves as the control unit, the high-frequency power driver 64, a display unit 242 and a fee reception unit 246. The power transmitting unit 400 of the power transmitting device 60 includes the coils 51, 52 (primary coils) and the capacitors 53, 54.

The high-frequency power driver 64 is controlled by a control signal MOD from the power transmitting ECU 65, and converts electric power, received from the alternating-current power supply 63, such as a commercial power supply, to high-frequency electric power. The high-frequency power driver 64 supplies converted high-frequency electric power to the coils 51, 52. No matching transformer that transforms impedance is shown in FIG. 4; however, a matching transformer may be provided between the high-frequency power driver 64 and the power transmitting unit 400 or between the power receiving unit 200 and the rectifier 13.

The coils 51, 52 contactlessly transmit electric power to the coil 31 (secondary coil) of the power receiving unit 200 of the electromotive vehicle 10 through electromagnetic induction. The number of turns of each of the coils 51, 52 and a distance from the coils 51, 52 to the coil 31 are set as needed on the basis of the distance between the coils 51, 52 and the coil 31 of the electromotive vehicle 10, the frequency of each of the coils 51, 52 and coil 31, and the like, such that the coupling coefficient κ that indicates the degree of coupling between the coils 51, 52 and the coil 31, and the like, become appropriate values.

The coils 51, 52 are electrically connected to each other, and a state where the coils 51, 52 are connected in series with each other is shown in FIG. 4. The capacitor 53 is provided between the coil 51 and the coil 52. The capacitor 54 is provided between the coil 51 and the alternating-current power supply 63. Although details will be described later, the coils 51, 52 are selectively switched between a series connection state and a parallel connection state by a switching device 91 (see FIG. 5).

The capacitors 53, 54 constitute an LC resonant circuit together with the coils 51, 52. The capacitance of each of the capacitors 53, 54 is set as needed on the basis of the inductance of each of the coils 51, 52 such that a predetermined frequency is obtained. The capacitors 53, 54 may be one or a plurality of switching capacitors selected from among a plurality of switching capacitors having different capacitances by switching electrical connection. The capacitors 53, 54 may be the ones (for example, variable capacitors) of which the capacitance is adjustable. These switching capacitor and variable capacitor may be used as the capacitors 53, 54 in combination.

The communication unit 230 is a communication interface for carrying out wireless communication between the external power supply device 61 and the electromotive vehicle 10. The communication unit 230 receives the battery information INFO and the signal STRT or signal STP for instructions to start or stop transmission of electric power, transmitted from the communication unit 160 of the electromotive vehicle 10, and outputs these pieces of information to the power transmitting ECU 65.

Cash, a prepaid card, a credit card, or the like, is inserted into the fee reception unit 246 in advance of charging. The power transmitting ECU 65 causes the high-frequency power driver 64 to transmit a test signal by using a small electric power. The small electric power is an electric power smaller than a charging electric power for charging the battery after authentication or an electric power that is transmitted at the time of position alignment, and may include an electric power that is transmitted intermittently.

The vehicle ECU 12 transmits the control signal SE2 and the control signal SE3 such that the relay 174 is turned on and the charging relay 170 is turned off in order to receive the test signal. The vehicle ECU 12 calculates a power receiving efficiency and a charging efficiency on the basis of the voltage VC. The vehicle ECU 12 transmits the calculated charging efficiency or power receiving efficiency to the external power supply device 61 via the communication unit 160.

The display unit 242 of the external power supply device 61 shows the charging efficiency or a charging electric power unit price corresponding to the charging efficiency to a user. The display unit 242 may have a function as an input unit, such as a touch panel, and is able to accept user's input for whether to approve the charging electric power unit price. The power transmitting ECU 65 causes the high-frequency power driver 64 to start full-scale charging when the charging electric power unit price is approved. When charging has been completed, a fee is paid at the fee reception unit 246.

The power transmitting ECU 65 includes a CPU, a storage device and an input/output buffer (which are not shown in the drawings). The power transmitting ECU 65 receives signals from sensors, or the like, outputs control signals to the devices, and controls the devices in the charging station 210. These controls are not only limited to processing by software but may also be processed by exclusive hardware (electronic circuit).

Figure 5:
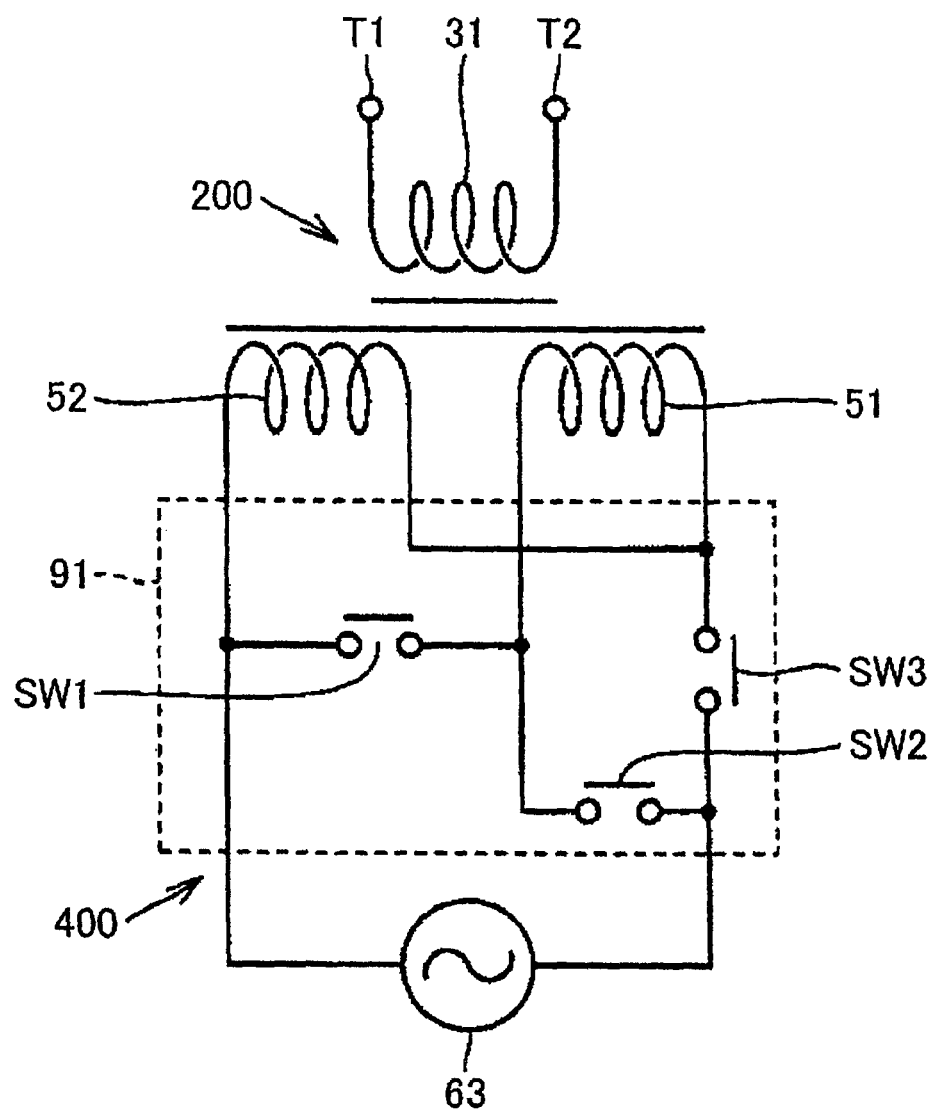
FIG. 5 is a circuit diagram that schematically shows a switching device used in a power transmitting device of the power transfer system according to the first embodiment and a surrounding configuration of the switching device.

FIG. 5 is a circuit diagram that schematically shows the switching device 91 used in the power transmitting unit 400 and its surrounding configuration. The power receiving unit 200 includes the coil 31. Both terminals T1, T2 of the coil 31 are connected to the rectifier 13 (see FIG. 4). The coils 51, 52 used in the power transmitting unit 400 are configured to be able to switch the direction of current flowing through the coils 51, 52 in an electrical control manner by operation of the switching device 91.

The power transmitting device including the power transmitting unit 400 is able to change between a configuration (see FIG. 12 and FIG. 13) corresponding to a circular coil and a configuration (see FIG. 15 and FIG. 16) corresponding to a solenoid coil (also referred to as square coil) by a switching signal transmitted from the communication unit 160 (see FIG. 4) to the communication unit 230 (see FIG. 4). For example, when switches SW1, SW3 are set in the off state and a switch SW2 is set in the on state (see FIG. 13), the coils 51, 52 are connected in series with each other. For example, when the switches SW1, SW3 are set in the on state and the switch SW2 is set in the off state (see FIG. 16), the coils 51, 52 are connected in parallel with each other. Details of these operations will be described later with reference to FIG. 12 to FIG. 16.

<Power Transmitting Unit 400>

Figure 6:
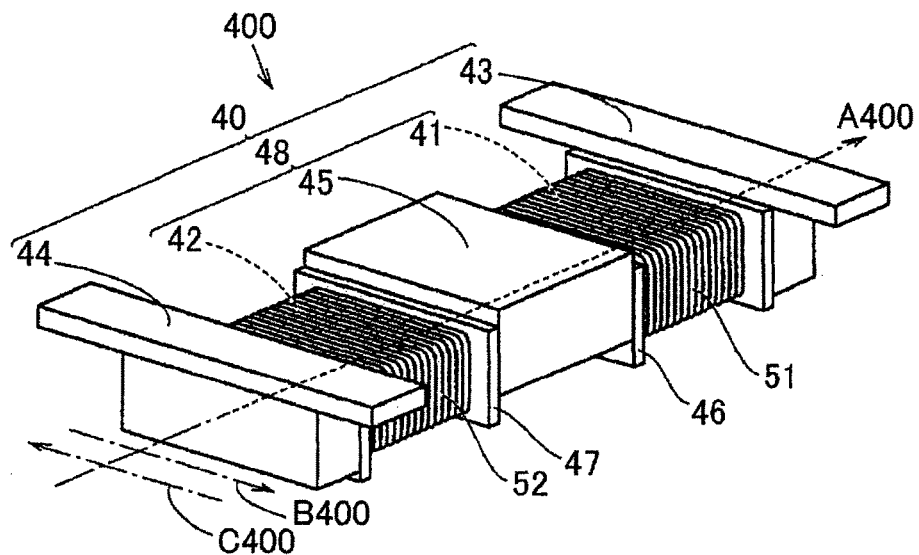
FIG. 6 is a perspective view that shows a power transmitting unit of the power transmitting device according to the first embodiment.

FIG. 6 is a perspective view that shows the power transmitting unit 400 of the external power supply device 61 (see FIG. 1). The power transmitting unit 400 includes the core 40, the coil 51, the coil 52 and the capacitors 53, 54 (see FIG. 1).

The core 40 is formed of a ferrite member, and includes a shaft portion 48 and outside magnetic pole portions 43, 44. The shaft portion 48 has such a shape that the shaft portion 48 extends in a direction (winding axis direction) in which winding axes A400 of the coils 51, 52 extend. In the present embodiment, the winding axes A400 of the coils 51, 52 are located along the same straight line, and have a shape extending in a straight line. The coils 51, 52 are arranged next to each other at an interval in the direction in which the winding axes A400 extend. The winding axis A400 of each of the coils 51, 52 extends in a direction that intersects with a facing direction (arrow Z direction in FIG. 1) (direction perpendicular to the facing direction).

The facing direction is a direction in which the coils 51, 52 face the coil 31 (see FIG. 1) of the power receiving unit 200 (see FIG. 1). The facing direction in the present embodiment is a direction perpendicular to the surface (ground surface) of the parking space 62 (see FIG. 1). The winding axes A400 extend in a direction parallel to the surface (ground surface) of the parking space 62 (see FIG. 1). The coils 51, 52 are provided so as to surround the corresponding winding axes A400.

For example, where the coil 51 is sectioned into unit length from one end portion in the longitudinal direction of the coil 51 to the other end portion in the longitudinal direction of the coil 51, the winding axis A400 of the coil 51 is a line drawn to pass through the curvature radius center of the coil 51 for each unit length or near the curvature radius center. A method of deriving the winding axis A400 that is an imaginary line from the curvature radius center of the coil 51 for each unit length includes various approximation methods, such as linear approximation, logarithmic approximation and polynomial approximation. The same applies to the winding axis A400 of the coil 52. In the present embodiment, the winding axis of the coil 51 and the winding axis of the coil 52 form substantially the same straight line as the winding axis A400.

The shaft portion 48 includes a winding portion 41 that serves as a first shaft portion, a winding portion 42 that serves as a second shaft portion and a center magnetic pole portion 45 that serves as an intermediate portion. In the present embodiment, the coils 51, 52 and the winding portions 41, 42 are fixed with the use of support members 46, 47.

Figure 7:
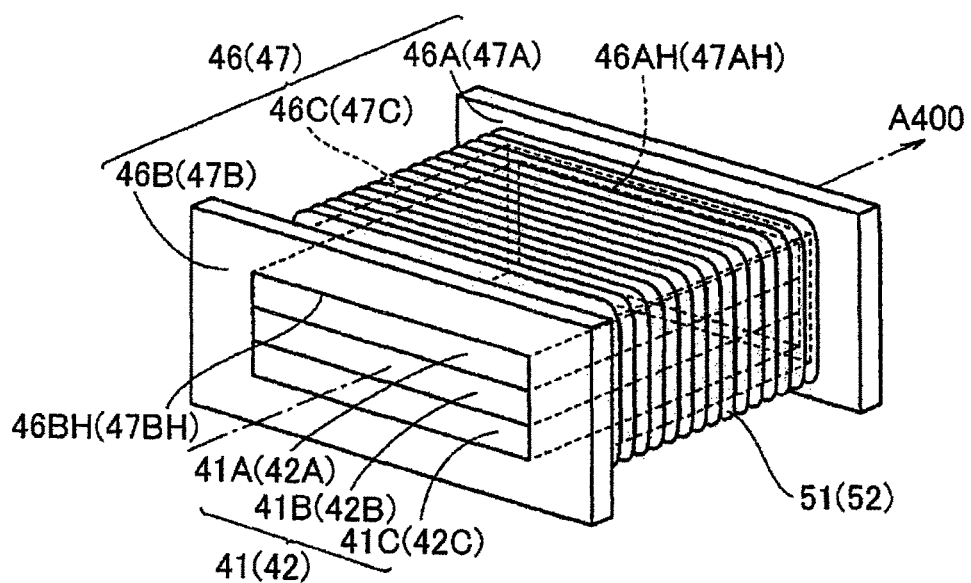
FIG. 7 is a perspective view that shows a support member used in the power transmitting unit of the power transmitting device according to the first embodiment.

FIG. 7 is a perspective view that shows the support member 46. The support member 46 includes plate portions 46A, 46B and a tubular portion 46C. Each of the plate portions 46A, 46B has a plate shape, and is arranged so as to extend in a direction perpendicular to the winding axis A400 of the coil 51. Each of the plate portions 46A, 46B according to the present embodiment has a rectangular outer shape, and is arranged so as to extend in the direction perpendicular to the winding axis A400 of the coil 51. The plate portion 46A and the plate portion 46B are arranged so as to face each other at an interval in a direction in which the winding axis A400 extends.

The plate portion 46A has an opening 46AH having a rectangular inner peripheral shape. The plate portion 46B has an opening 46BH having a rectangular inner peripheral shape. The tubular portion 46C has a hollow shape. The tubular portion 46C according to the present embodiment has a square tubular shape, and is provided so as to connect the plate portion 46A to the plate portion 46B. The opening 46AH of the plate portion 46A and the opening 46BH of the plate portion 46B communicate with each other via the inside of the tubular portion 46C.

The winding portion 41 is formed by laminating ferrites 41A, 41B, 41C having a plate shape, and is inserted inside the tubular portion 46C. The winding portion 41 according to the present embodiment is formed of the plurality of ferrites; instead, the winding portion 41 may be formed of a single ferrite. The coil 51 is wound around the tubular portion 46C.

In a state where the coil 51 is wound around the tubular portion 46C, the coil 51 is arranged around the winding portion 41. The coil 51 is formed so as to be displaced in the direction in which the winding axis A400 extends as a portion of the coil 51 shifts from one end portion toward the other end portion in the direction in which the winding axis A400 extends. A positional deviation of the coil 51 in the direction along the winding axis A400 is prevented by the plate portion 46A. A positional deviation of the coil 51 in a direction opposite to the direction along the winding axis A400 is prevented by the plate portion 46B.

The reference signs indicated with parentheses in FIG. 7 correspond to the support member 47. In the present embodiment, the support member 47 has the same shape as the support member 46. The support member 47 includes plate portions 47A, 47B and a tubular portion 47C. Each of the plate portions 47A, 47B has a plate shape, and is arranged so as to extend in the direction perpendicular to the winding axis A400 of the coil 52. Each of the plate portions 47A, 47B according to the present embodiment has a rectangular outer shape, and is arranged so as to extend in the direction perpendicular to the winding axis A400 of the coil 52. The plate portion 47A and the plate portion 47B are arranged so as to face each other at an interval in the direction in which the winding axis A400 extends.

The plate portion 47A has an opening 47AH having a rectangular inner peripheral shape. The plate portion 47B has an opening 47BH having a rectangular inner peripheral shape. The tubular portion 47C has a hollow shape. The tubular portion 47C according to the present embodiment has a square tubular shape, and is provided so as to connect the plate portion 47A to the plate portion 47B. The opening 47AH of the plate portion 47A and the opening 47BH of the plate portion 47B communicate with each other via the inside of the tubular portion 47C.

The winding portion 42 is formed by laminating ferrites 42A, 42B, 42C having a plate shape, and is inserted inside the tubular portion 47C. The winding portion 42 according to the present embodiment is formed of the plurality of ferrites; instead, the winding portion 42 may be formed of a single ferrite. The coil 52 is wound around the tubular portion 47C.

In a state where the coil 52 is wound around the tubular portion 47C, the coil 52 is arranged around the winding portion 42. The coil 52 is formed so as to be displaced in the direction in which the winding axis A400 extends as a portion of the coil 52 shifts from one end toward the other end in the direction in which the winding axis A400 extends. A positional deviation of the coil 52 in the direction along the winding axis A400 is prevented by the plate portion 47A. A positional deviation of the coil 52 in a direction opposite to the direction along the winding axis A400 is prevented by the plate portion 47B.

Referring back to FIG. 6, the center magnetic pole portion 45 of the core 40 includes a ferrite and a fixing member (not shown) that fixes the ferrite. The center magnetic pole portion 45 is provided between the support member 46 and the support member 47 in the direction in which the winding axis A400 extends. The ferrite of the center magnetic pole portion 45 is arranged between the winding portion 41 and the winding portion 42 in the direction in which the winding axis A400 extends. The ferrite used in the center magnetic pole portion 45 has a rectangular parallelepiped shape as a whole. The ferrite used in the center magnetic pole portion 45 also may be formed of a plurality of members or may be formed of a single member.

The outside magnetic pole portion 43 of the core 40 is provided on the side of the end portion of the winding portion 41 with respect to the center magnetic pole portion 45 in the shaft portion 48 in the direction in which the winding axis A400 extends. In other words, the outside magnetic pole portion 43 located at one end of the winding portion 41 in the winding axis direction A400, and the one end of the winding portion 41 being opposite to other end which faces the center magnetic pole portion 45. The outside magnetic pole portion 43 is formed in a plate shape, and includes a ferrite and a fixing member (not shown) that fixes the ferrite.

The outside magnetic pole portion 43 has a rectangular outer shape, and has a shape extending in a perpendicular direction B400. The perpendicular direction B400 here is a direction perpendicular to both the facing direction (Z direction in FIG. 1) that is the direction in which the coils 51, 52 face the coil 31 (see FIG. 1) and the direction in which the winding axis A400 extends. The perpendicular direction B400 is not limited to just the perpendicular case, and may be a direction (intersecting direction) that intersects with the facing direction (Z direction in FIG. 1) that is the direction in which the coils 51, 52 face the coil 31 and the direction in which the winding axis A400 extends. The ferrite used in the outside magnetic pole portion 43 may also be formed of a plurality of members or may be formed of a single member.

The outside magnetic pole portion 44 of the core 40 is provided on the side of the end portion of the winding portion 42 with respect to the center magnetic pole portion 45 in the shaft portion 48 in the direction in which the winding axis A400 extends. In other words, the outside magnetic pole portion 44 located at one end of the winding portion 42 in the winding axis direction A400, and the one end of the winding portion 42 being opposite to other end which faces the center magnetic pole portion 45. The outside magnetic pole portion 44 is formed in a plate shape, and includes a ferrite and a fixing member (not shown) that fixes the ferrite.

The outside magnetic pole portion 44 also has a rectangular outer shape, and has a shape extending in the perpendicular direction B400. The perpendicular direction B400 here is a direction perpendicular to both the facing direction (Z direction in FIG. 1) that is the direction in which the coils 51, 52 face the coil 31 (see FIG. 1) and the direction in which the winding axis A400 extends. The ferrite used in the outside magnetic pole portion 44 may also be formed of a plurality of members or may be formed of a single member.

Figure 8:
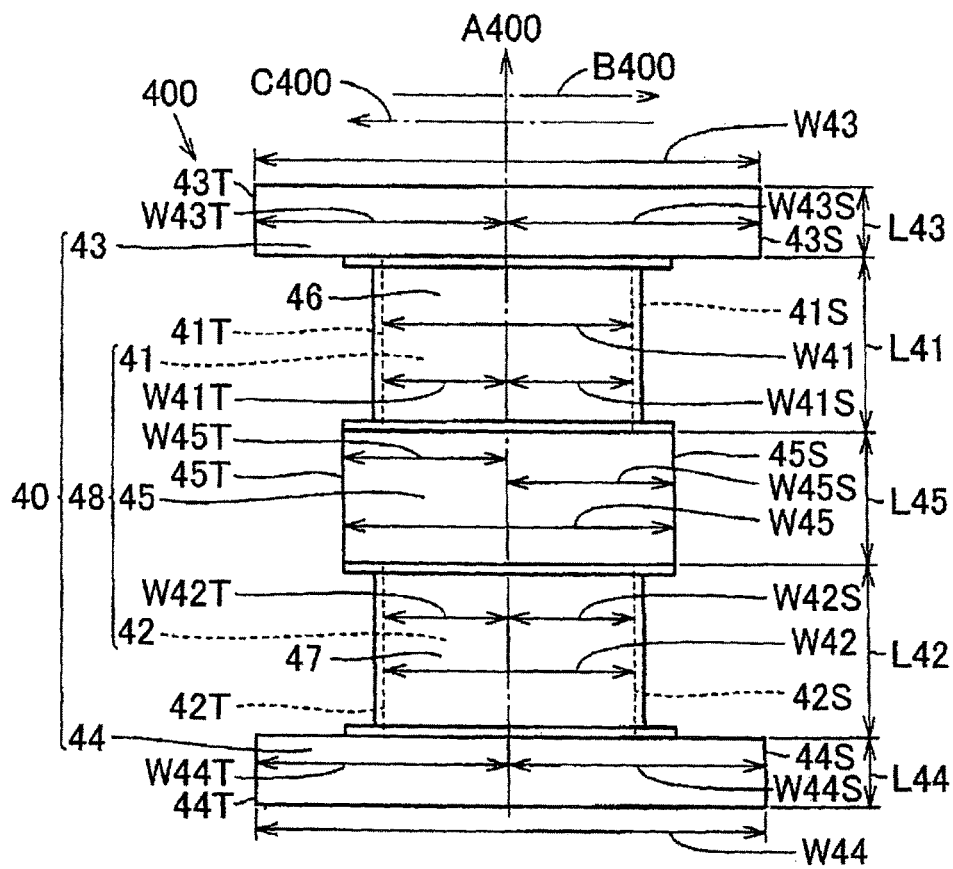
FIG. 8 is a plan view that shows a core used in the power transmitting unit of the power transmitting device according to the first embodiment.
Figure 9:
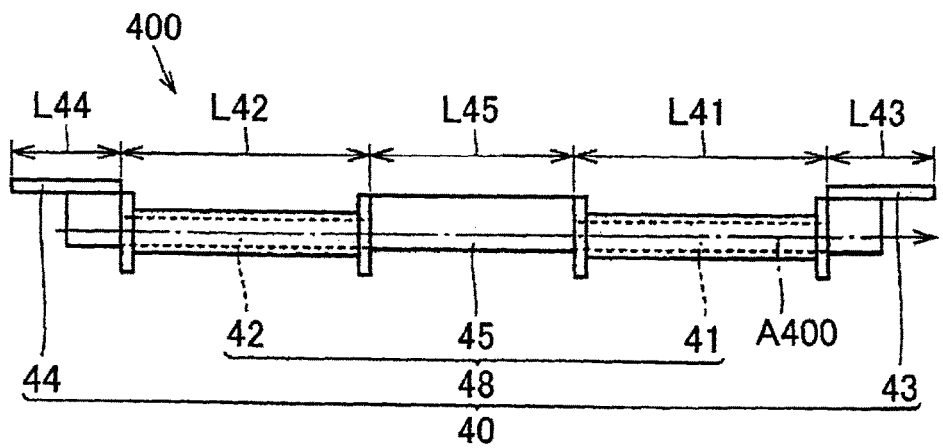
FIG. 9 is a side view that shows the core used in the power transmitting unit of the power transmitting device according to the first embodiment.
Figure 10:
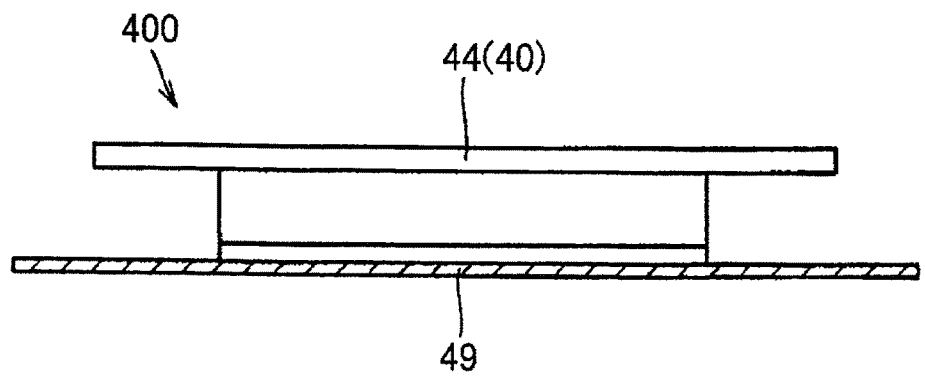
FIG. 10 is a front view that shows the core used in the power transmitting unit of the power transmitting device according to the first embodiment.

FIG. 8 is a plan view that shows the core 40. FIG. 9 is a side view that shows the core 40. FIG. 10 is a front view that shows the core 40. For the sake of convenience of description, FIG. 8 to FIG. 10 show a state where the coils 51, 52 (see FIG. 4) are not wound around the core 40. Although only shown in FIG. 10, a shield 49 is arranged on the lower side of the power transmitting unit 400. The lower side of the power transmitting unit 400 here includes a side in a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The thickness of the shield 49 in the facing direction is, for example, 1 mm.

<Center Magnetic Pole Portion 45>

As mainly shown in FIG. 8, in the perpendicular direction B400 perpendicular to both the winding axis A400 and the facing direction (Z direction in FIG. 1), the center magnetic pole portion 45 has a length W45. The center magnetic pole portion 45 according to the present embodiment has an outer edge 45S at the front side in the direction in which the perpendicular direction B400 extends, and has an outer edge 45T at the front side in the direction in which a direction C400 opposite to the perpendicular direction B400.

The outer edges 45S, 45T according to the present embodiment each have a planar shape extending from the upper side toward the lower side (in a direction vertical to the sheet of FIG. 8). The upper side here includes a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The lower side here includes a direction heading from the power transmitting unit 400 toward the power receiving unit 200 (see FIG. 1) in the facing direction (Z direction in FIG. 1) that is the direction in which the power receiving unit 200 (see FIG. 1) and the power transmitting unit 400 face each other.

When the power transmitting unit 400 is viewed in the direction perpendicular to both the winding axis A400 and the perpendicular direction B400 (when the power transmitting unit 400 is viewed in plan as shown in FIG. 8), the outer edges 45S, 45T according to the present embodiment are parallel to the winding axis A400. The length W45 according to the present embodiment is a size between the outer edge 45S and the outer edge 45T, and is the same value at any position in the direction in which the winding axis A400 extends. In other words, the center magnetic pole portion 45 according to the present embodiment has such a shape that the length W45 in the perpendicular direction B400 is the same value at any position in the direction in which the winding axis A400 extends.

In the present embodiment, the outer edge 45S of the center magnetic pole portion 45 corresponds to a portion of the center magnetic pole portion 45, farthest from the winding axis A400 in the direction in which the perpendicular direction B400 extends. A size W45S between the outer edge 45S and the winding axis A400 in the perpendicular direction B400 is the same value at any position in the direction in which the winding axis A400 extends.

In the present embodiment, the outer edge 45T of the center magnetic pole portion 45 corresponds to a portion of the center magnetic pole portion 45, farthest from the winding axis A400 in the direction in which the direction C400 opposite to the perpendicular direction B400 extends. A size W45T between the outer edge 45T and the winding axis A400 in the opposite direction C400 is the same value at any position in the direction in which the winding axis A400 extends.

In the present embodiment, the size W45S and the size W45T have the same value, and the length W45 is equal to the sum of the size W45S and the size W45T. When the outer edge 45S and the outer edge 45T are not parallel to each other, the length W45 of the center magnetic pole portion 45 may be, for example, calculated as the average of the length W45 per unit length of the center magnetic pole portion 45 at a selected position in the direction in which the winding axis A400 extends. As shown in FIG. 9, the center magnetic pole portion 45 in the present embodiment has a length L45 in the direction in which the winding axis A400 extends.

<Winding Portion 41>

As shown in FIG. 8, in the perpendicular direction B400 perpendicular to both the winding axis A400 and the facing direction (Z direction in FIG. 1), the winding portion 41 has a length W41. The winding portion 41 according to the present embodiment has an outer edge 41S at the front side in the direction in which the perpendicular direction B400 extends, and has an outer edge 41T at the front side in the direction in which the direction C400 opposite to the perpendicular direction B400 extends.

The outer edges 41S, 41T according to the present embodiment each have a planar shape extending from the upper side toward the lower side (in a direction vertical to the sheet of FIG. 8). The upper side here includes a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The lower side here includes a direction heading from the power transmitting unit 400 toward the power receiving unit 200 (see FIG. 1) in the facing direction (Z direction in FIG. 1) that is the direction in which the power receiving unit 200 (see FIG. 1) and the power transmitting unit 400 face each other.

When the power transmitting unit 400 is viewed in the direction perpendicular to both the winding axis A400 and the perpendicular direction B400 (when the power transmitting unit 400 is viewed in plan as shown in FIG. 8), the outer edges 41S, 41T according to the present embodiment are parallel to the winding axis A400. The length W41 according to the present embodiment is a size between the outer edge 41S and the outer edge 41T, and is the same value at any position in the direction in which the winding axis A400 extends. In other words, the winding portion 41 according to the present embodiment has such a shape that the length W41 in the perpendicular direction B400 is the same value at any position in the direction in which the winding axis A400 extends.

In the present embodiment, the outer edge 41S of the winding portion 41 corresponds to a portion of the winding portion 41, farthest from the winding axis A400 in the direction in which the perpendicular direction B400 extends. A size W41S between the outer edge 41S and the winding axis A400 in the perpendicular direction B400 is the same value at any position in the direction in which the winding axis A400 extends.

In the present embodiment, the outer edge 41T of the winding portion 41 corresponds to a portion of the winding portion 41, farthest from the winding axis A400 in the direction in which the direction C400 opposite to the perpendicular direction B400 extends. A size W41T between the outer edge 41T and the winding axis A400 in the opposite direction C400 is the same value at any position in the direction in which the winding axis A400 extends.

In the present embodiment, the size W41S and the size W41T have the same value, and the length W41 is equal to the sum of the size W41S and the size W41T. When the outer edge 41S and the outer edge 41T are not parallel to each other, the length W41 of the winding portion 41 may be, for example, calculated as the average of the length W41 per unit length of the winding portion 41 at a selected position in the direction in which the winding axis A400 extends. As shown in FIG. 9, the winding portion 41 in the present embodiment has a length L41 in the direction in which the winding axis A400 extends.

<Winding Portion 42>

As shown in FIG. 8, in the perpendicular direction B400 perpendicular to both the winding axis A400 and the facing direction (Z direction in FIG. 1), the winding portion 42 has a length W42. The winding portion 42 according to the present embodiment has an outer edge 42S at the front side in the direction in which the perpendicular direction B400 extends, and has an outer edge 42T at the front side in the direction in which the direction C400 opposite to the perpendicular direction B400 extends.

The outer edges 42S, 42T according to the present embodiment each have a planar shape extending from the upper side toward the lower side (in a direction vertical to the sheet of FIG. 8). The upper side here includes a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The lower side here includes a direction heading from the power transmitting unit 400 toward the power receiving unit 200 (see FIG. 1) in the facing direction (Z direction in FIG. 1) that is the direction in which the power receiving unit 200 (see FIG. 1) and the power transmitting unit 400 face each other.

When the power transmitting unit 400 is viewed in the direction perpendicular to both the winding axis A400 and the perpendicular direction B400 (when the power transmitting unit 400 is viewed in plan as shown in FIG. 8), the outer edges 42S, 42T according to the present embodiment are parallel to the winding axis A400. The length W42 according to the present embodiment is a size between the outer edge 42S and the outer edge 42T, and is the same value at any position in the direction in which the winding axis A400 extends. In other words, the winding portion 42 according to the present embodiment has such a shape that the length W42 in the perpendicular direction B400 is the same value at any position in the direction in which the winding axis A400 extends.

In the present embodiment, the outer edge 42S of the winding portion 42 corresponds to a portion of the winding portion 42, farthest from the winding axis A400 in the direction in which the perpendicular direction B400 extends. A size W42S between the outer edge 42S and the winding axis A400 in the perpendicular direction B400 is the same value at any position in the direction in which the winding axis A400 extends.

In the present embodiment, the outer edge 42T of the winding portion 42 corresponds to a portion of the winding portion 42, farthest from the winding axis A400 in the direction in which the direction C400 opposite to the perpendicular direction B400 extends. A size W42T between the outer edge 42T and the winding axis A400 in the opposite direction C400 is the same value at any position in the direction in which the winding axis A400 extends.

In the present embodiment, the size W42S and the size W42T have the same value, and the length W42 is equal to the sum of the size W42S and the size W42T. When the outer edge 42S and the outer edge 42T are not parallel to each other, the length W42 of the winding portion 42 may be, for example, calculated as the average of the length W42 per unit length of the winding portion 42 at a selected position in the direction in which the winding axis A400 extends. As shown in FIG. 9, the winding portion 42 in the present embodiment has a length L42 in the direction in which the winding axis A400 extends.

In the present embodiment, the length W41 of the winding portion 41 and the length W42 of the winding portion 42 have the same value. The size W41S of the winding portion 41, the size W41T of the winding portion 41, the size W42S of the winding portion 42 and the size W42T of the winding portion 42 all have the same value. The length L41 of the winding portion 41 and the length L42 of the winding portion 42 have the same value.

<Outside Magnetic Pole Portion 43>

As shown in FIG. 8, in the perpendicular direction B400 perpendicular to both the winding axis A400 and the facing direction (Z direction in FIG. 1), the outside magnetic pole portion 43 has a length W43. The outside magnetic pole portion 43 according to the present embodiment has an outer edge 43S at the front side in the direction in which the perpendicular direction B400 extends, and has an outer edge 43T at the front side in the direction in which the direction C400 opposite to the perpendicular direction B400 extends.

The outer edges 43S, 43T according to the present embodiment each have a planar shape extending from the upper side toward the lower side (in a direction vertical to the sheet of FIG. 8). The upper side here includes a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The lower side here includes a direction heading from the power transmitting unit 400 toward the power receiving unit 200 (see FIG. 1) in the facing direction (Z direction in FIG. 1) that is the direction in which the power receiving unit 200 (see FIG. 1) and the power transmitting unit 400 face each other.

When the power transmitting unit 400 is viewed in the direction perpendicular to both the winding axis A400 and the perpendicular direction B400 (when the power transmitting unit 400 is viewed in plan as shown in FIG. 8), the outer edges 43S, 43T according to the present embodiment are parallel to the winding axis A400. The length W43 according to the present embodiment is a size between the outer edge 43S and the outer edge 43T, and is the same value at any position in the direction in which the winding axis A400 extends. In other words, the outside magnetic pole portion 43 according to the present embodiment has such a shape that the length W43 in the perpendicular direction B400 is the same value at any position in the direction in which the winding axis A400 extends.

In the present embodiment, the outer edge 43S of the outside magnetic pole portion 43 corresponds to a portion of the outside magnetic pole portion 43, farthest from the winding axis A400 in the direction in which the perpendicular direction B400 extends. A size W43S between the outer edge 43S and the winding axis A400 in the perpendicular direction B400 is the same value at any position in the direction in which the winding axis A400 extends.

In the present embodiment, the outer edge 43T of the outside magnetic pole portion 43 corresponds to a portion of the outside magnetic pole portion 43, farthest from the winding axis A400 in the direction in which the direction C400 opposite to the perpendicular direction B400 extends. A size W43T between the outer edge 43T and the winding axis A400 in the opposite direction C400 is the same value at any position in the direction in which the winding axis A400 extends.

In the present embodiment, the size W43S and the size W43T have the same value, and the length W43 is equal to the sum of the size W43S and the size W43T. When the outer edge 43S and the outer edge 43T are not parallel to each other, the length W43 of the outside magnetic pole portion 43 may be, for example, calculated as the average of the length W43 per unit length of the outside magnetic pole portion 43 at a selected position in the direction in which the winding axis A400 extends. As shown in FIG. 9, the outside magnetic pole portion 43 in the present embodiment has a length L43 in the direction in which the winding axis A400 extends.

<Outside Magnetic Pole Portion 44>

As shown in FIG. 8, in the perpendicular direction B400 perpendicular to both the winding axis A400 and the facing direction (Z direction in FIG. 1), the outside magnetic pole portion 44 has a length W44. The outside magnetic pole portion 44 according to the present embodiment has an outer edge 44S at the front side in the direction in which the perpendicular direction B400 extends, and has an outer edge 44T at the front side in the direction in which the direction C400 opposite to the perpendicular direction B400 extends.

The outer edges 44S, 44T according to the present embodiment each have a planar shape extending from the upper side toward the lower side (in a direction vertical to the sheet of FIG. 8). The upper side here includes a direction heading from the power receiving unit 200 (see FIG. 1) toward the power transmitting unit 400 in the facing direction (Z direction in FIG. 1) that is the direction in which the power receiving unit 200 (see FIG. 1) and the power transmitting unit 400 face each other. The lower side here includes a direction heading from the power transmitting unit 400 toward the power receiving unit 200 (see FIG. 1) in the facing direction (Z direction in FIG. 1) that is the direction in which the power receiving unit 200 (see FIG. 1) and the power transmitting unit 400 face each other.

When the power transmitting unit 400 is viewed in the direction perpendicular to both the winding axis A400 and the perpendicular direction B400 (when the power transmitting unit 400 is viewed in plan as shown in FIG. 8), the outer edges 44S, 44T according to the present embodiment are parallel to the winding axis A400. The length W44 according to the present embodiment is a size between the outer edge 44S and the outer edge 44T, and is the same value at any position in the direction in which the winding axis A400 extends. In other words, the outside magnetic pole portion 44 according to the present embodiment has such a shape that the length W44 in the perpendicular direction B400 is the same value at any position in the direction in which the winding axis A400 extends.

In the present embodiment, the outer edge 44S of the outside magnetic pole portion 44 corresponds to a portion of the outside magnetic pole portion 44, farthest from the winding axis A400 in the direction in which the perpendicular direction B400 extends. A size W44S between the outer edge 44S and the winding axis A400 in the perpendicular direction B400 is the same value at any position in the direction in which the winding axis A400 extends.

In the present embodiment, the outer edge 44T of the outside magnetic pole portion 44 corresponds to a portion of the outside magnetic pole portion 44, farthest from the winding axis A400 in the direction in which the direction C400 opposite to the perpendicular direction B400 extends. A size W44T between the outer edge 44T and the winding axis A400 in the opposite direction C400 is the same value at any position in the direction in which the winding axis A400 extends.

In the present embodiment, the size W44S and the size W44T have the same value, and the length W44 is equal to the sum of the size W44S and the size W44T. When the outer edge 44S and the outer edge 44T are not parallel to each other, the length W44 of the outside magnetic pole portion 44 may be, for example, calculated as the average of the length W44 per unit length of the outside magnetic pole portion 44 at a selected position in the direction in which the winding axis A400 extends. As shown in FIG. 9, the outside magnetic pole portion 44 in the present embodiment has a length L44 in the direction in which the winding axis A400 extends.

In the present embodiment, the length W43 of the outside magnetic pole portion 43 and the length W44 of the outside magnetic pole portion 44 have the same value. The size W43S of the outside magnetic pole portion 43, the size W43T of the outside magnetic pole portion 43, the size W44S of the outside magnetic pole portion 44 and the size W44T of the outside magnetic pole portion 44 all have the same value. The length L43 of the outside magnetic pole portion 43 and the length L44 of the outside magnetic pole portion 44 also have the same value.

As shown in FIG. 8, the length W45 of the center magnetic pole portion 45 in the perpendicular direction B400 is larger than the length W41 of the winding portion 41 in the perpendicular direction B400, and is larger than the length W42 of the winding portion 42 in the perpendicular direction B400. Suitably, the length W45 of the center magnetic pole portion 45 in the perpendicular direction B400 should be smaller than the length W43 of the outside magnetic pole portion 43 in the perpendicular direction B400, and should be smaller than the length W44 of the outside magnetic pole portion 44 in the perpendicular direction B400.

<Size Relationship> (W45<W43, W45<W44, W45>W41, W45>W42)

In the present embodiment, the size W45S between the portion (outer edge 45S) of the center magnetic pole portion 45, farthest from the winding axis A400 in the perpendicular direction B400, and the winding axis A400 is smaller than the size W43S between the portion (outer edge 43S) of the outside magnetic pole portion 43, farthest from the winding axis A400 in the perpendicular direction B400, and the winding axis A400, and is smaller than the size W44S between the portion (outer edge 44S) of the outside magnetic pole portion 44, farthest from the winding axis A400 in the perpendicular direction B400, and the winding axis A400.

<Size Relationship> (W45S<W43S, W45S<W44S)

In the present embodiment, the size W45S between the portion (outer edge 45S) of the center magnetic pole portion 45, farthest from the winding axis A400 in the perpendicular direction B400, and the winding axis A400 is larger than the size W41S between the portion (outer edge 41S) of the winding portion 41, farthest from the winding axis A400 in the perpendicular direction B400, and the winding axis A400, and is larger than the size W42S between the portion (outer edge 42S) of the winding portion 42, farthest from the winding axis A400 in the perpendicular direction B400, and the winding axis A400.

<Size Relationship> (W45S>W41S, W45S>W42S)

In the present embodiment, the size W45T between the portion (outer edge 45T) of the center magnetic pole portion 45, farthest from the winding axis A400 in the direction C400 opposite to the perpendicular direction B400, and the winding axis A400 is smaller than the size W43T between the portion (outer edge 43T) of the outside magnetic pole portion 43, farthest from the winding axis A400 in the direction C400 opposite to the perpendicular direction B400, and the winding axis A400, and is smaller than the size W44T between the portion (outer edge 44T) of the outside magnetic pole portion 44, farthest from the winding axis A400 in the direction C400 opposite to the perpendicular direction B400, and the winding axis A400.

<Size Relationship> (W45T<W43T, W45T<W44T)

In the present embodiment, the size W45T between the portion (outer edge 45T) of the center magnetic pole portion 45, farthest from the winding axis A400 in the direction C400 opposite to the perpendicular direction B400, and the winding axis A400 is larger than the size W41T between the portion (outer edge 41T) of the winding portion 41, farthest from the winding axis A400 in the direction C400 opposite to the perpendicular direction B400, and the winding axis A400, and is larger than the size W42T between the portion (outer edge 42T) of the winding portion 42, farthest from the winding axis A400 in the direction C400 opposite to the perpendicular direction B400, and the winding axis A400.

<Size Relationship> (W45T>W41T, W45T>W42T)

Suitably, as shown in FIG. 8, the portion (outer edge 45S) of the center magnetic pole portion 45, farthest from the winding axis A400 in the perpendicular direction B400, should be located closer to the winding axis A400 in the perpendicular direction B400 than the portion (outer edge 43S) of the outside magnetic pole portion 43, farthest from the winding axis A400 in the perpendicular direction B400. Similarly, the portion (outer edge 45S) of the center magnetic pole portion 45, farthest from the winding axis A400 in the perpendicular direction B400, should be located closer to the winding axis A400 in the perpendicular direction B400 than the portion (outer edge 44S) of the outside magnetic pole portion 44, farthest from the winding axis A400 in the perpendicular direction B400.

Suitably, as shown in FIG. 8, the portion (outer edge 45T) of the center magnetic pole portion 45, farthest from the winding axis A400 in the direction C400 opposite to the perpendicular direction B400, should be located closer to the winding axis A400 in the direction C400 opposite to the perpendicular direction B400 than the portion (outer edge 43T) of the outside magnetic pole portion 43, farthest from the winding axis A400 in the direction C400 opposite to the perpendicular direction B400. Similarly, the portion (outer edge 45T) of the center magnetic pole portion 45, farthest from the winding axis A400 in the direction C400 opposite to the perpendicular direction B400, should be located closer to the winding axis A400 in the direction C400 opposite to the perpendicular direction B400 than the portion (outer edge 44T) of the outside magnetic pole portion 44, farthest from the winding axis A400 in the direction C400 opposite to the perpendicular direction B400.

Figure 11:
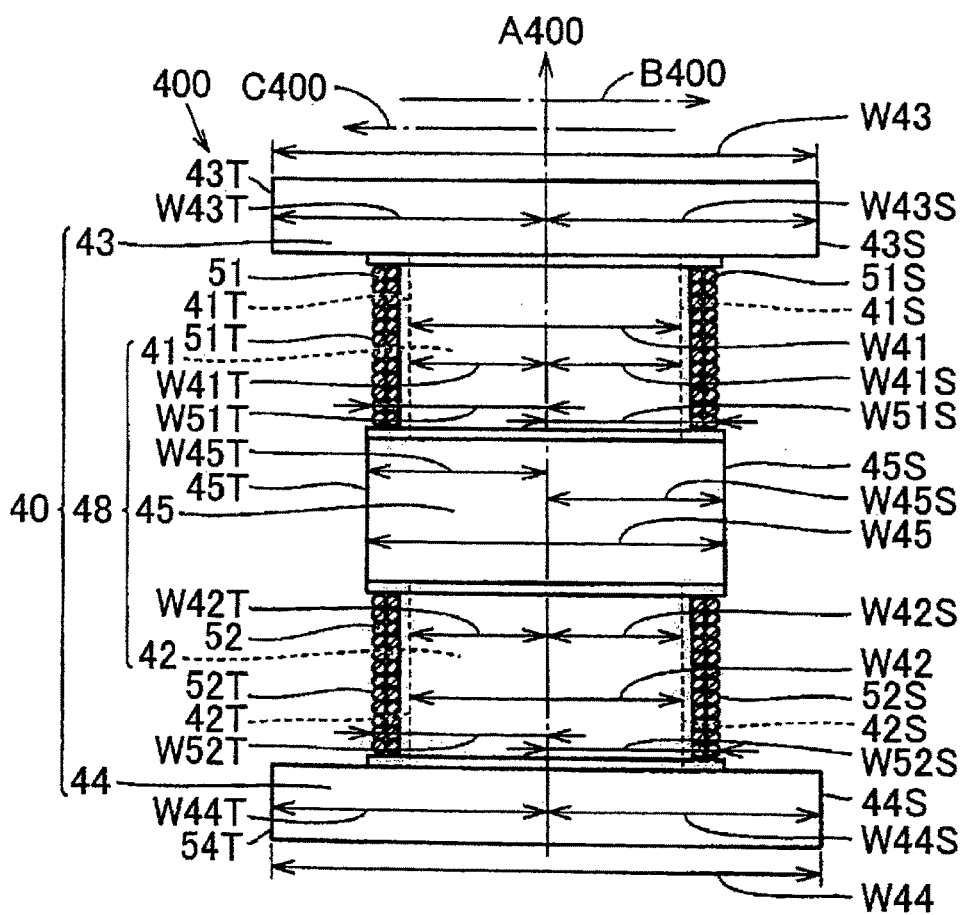
FIG. 11 is a plan view that shows a state where coils are arranged around the core used in the power transmitting unit of the power transmitting device according to the first embodiment.

FIG. 11 is a plan view that shows a state where the coil 51 is arranged around the winding portion 41 of the core 40 and the coil 52 is arranged around the winding portion 42 of the core 40. In the present embodiment, an external common tangent of the coil 51 at the front side (right side in the sheet of FIG. 11) in the perpendicular direction B400 extends in a straight line parallel to the winding axis A400. In other words, a straight line that connects the portions (portions 51S) of the coil 51, farthest from the winding axis A400 in the perpendicular direction B400, extends in a straight line parallel to the winding axis A400. The straight line corresponds to the external common tangent of the coil 51 at the front side (right side in the sheet of FIG. 11) in the perpendicular direction B400.

An external common tangent of the coil 51 at the front side (left side in the sheet of FIG. 11) in the direction C400 opposite to the perpendicular direction B400 extends in a straight line parallel to the winding axis A400. In other words, a straight line that connects the portions (portions 51T) of the coil 51, farthest from the winding axis A400 in the direction C400 opposite to the perpendicular direction B400, extends in a straight line parallel to the winding axis A400. The straight line corresponds to the external common tangent of the coil 51 at the front side (left side in the sheet of FIG. 11) in the direction C400 opposite to the perpendicular direction B400.

An external common tangent of the coil 52 at the front side (right side in the sheet of FIG. 11) in the perpendicular direction B400 also extends in a straight line parallel to the winding axis A400. In other words, a straight line that connects the portions (portions 52S) of the coil 52, farthest from the winding axis A400 in the perpendicular direction B400, extends in a straight line parallel to the winding axis A400. The straight line corresponds to the external common tangent of the coil 52 at the front side (right side in the sheet of FIG. 11) in the perpendicular direction B400.

An external common tangent of the coil 52 at the front side (left side in the sheet of FIG. 11) in the direction C400 opposite to the perpendicular direction B400 extends in a straight line parallel to the winding axis A400. In other words, a straight line that connects the portions (portions 52T) of the coil 52, farthest from the winding axis A400 in the direction C400 opposite to the perpendicular direction B400, extends in a straight line parallel to the winding axis A400. The straight line corresponds to the external common tangent of the coil 52 at the front side (left side in the sheet of FIG. 11) in the direction C400 opposite to the perpendicular direction B400.

As shown in FIG. 11, more suitably, the size W45S between the portion (outer edge 45S) of the center magnetic pole portion 45, farthest from the winding axis A400 in the perpendicular direction B400, and the winding axis A400 should be larger than the size W51S between the portions (portions 51S) of the coil 51, farthest from the winding axis A400 in the perpendicular direction B400, and the winding axis A400. Similarly, the size W45S between the portion (outer edge 45S) of the center magnetic pole portion 45, farthest from the winding axis A400 in the perpendicular direction B400, and the winding axis A400 should be larger than the size W52S between the portions (portions 52S) of the coil 52, farthest from the winding axis A400 in the perpendicular direction B400, and the winding axis A400.

<Size Relationship> (W45S>W51S, W45S>W52S)

More suitably, the size W45T between the portion (outer edge 45T) of the center magnetic pole portion 45, farthest from the winding axis A400 in the direction C400 opposite to the perpendicular direction B400, and the winding axis A400 should be larger than the size W51T between the portions (portions 51T) of the coil 51, farthest from the winding axis A400 in the direction C400 opposite to the perpendicular direction B400, and the winding axis A400. Similarly, the size W45T between the portion (outer edge 45T) of the center magnetic pole portion 45, farthest from the winding axis A400 in the direction C400 opposite to the perpendicular direction B400, and the winding axis A400 should be larger than the size W52T between the portions (portions 52T) of the coil 52, farthest from the winding axis A400 in the direction C400 opposite to the perpendicular direction B400, and the winding axis A400.

<Size Relationship> (W45T>W51T, W45T>W52T)

Referring back to FIG. 8 and FIG. 9, more suitably, the length L45 of the center magnetic pole portion 45 should be larger than the length L43 of the outside magnetic pole portion 43. The length L45 of the center magnetic pole portion 45 should be larger than the length L44 of the outside magnetic pole portion 44. When a circular coil is used in the power receiving device, the center magnetic pole portion 45 faces the center portion of the core having a circular shape in the power receiving device. Because the length L45 of the center magnetic pole portion 45 is larger than the length L43 or the length L44, it is possible to obtain a high coupling coefficient.

<Size Relationship> (L45>L43, L45>L44)

<Transfer of Electric Power to Circular Coil>

Figure 12:
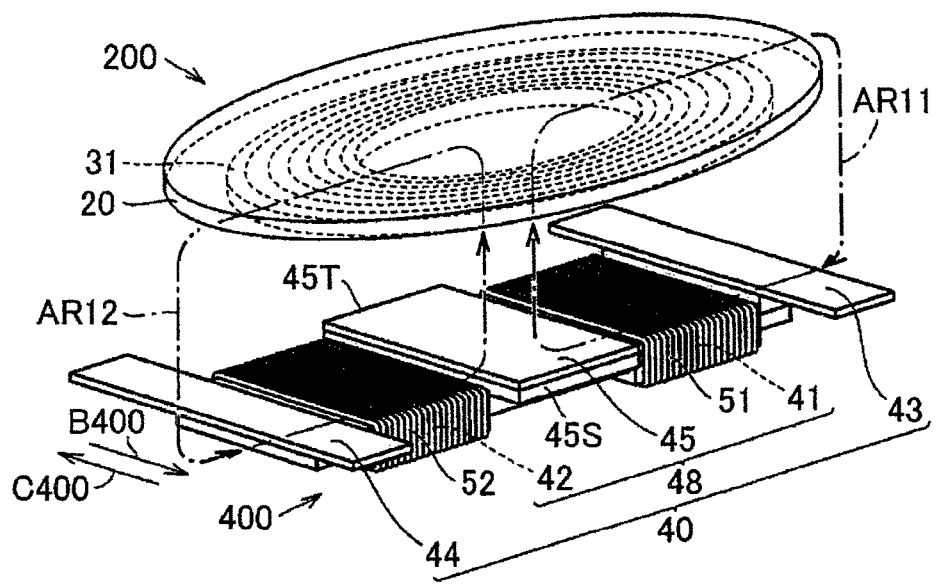
FIG. 12 is a perspective view that schematically shows a state where electric power is transferred with the use of the power transfer system according to the first embodiment.
Figure 13:
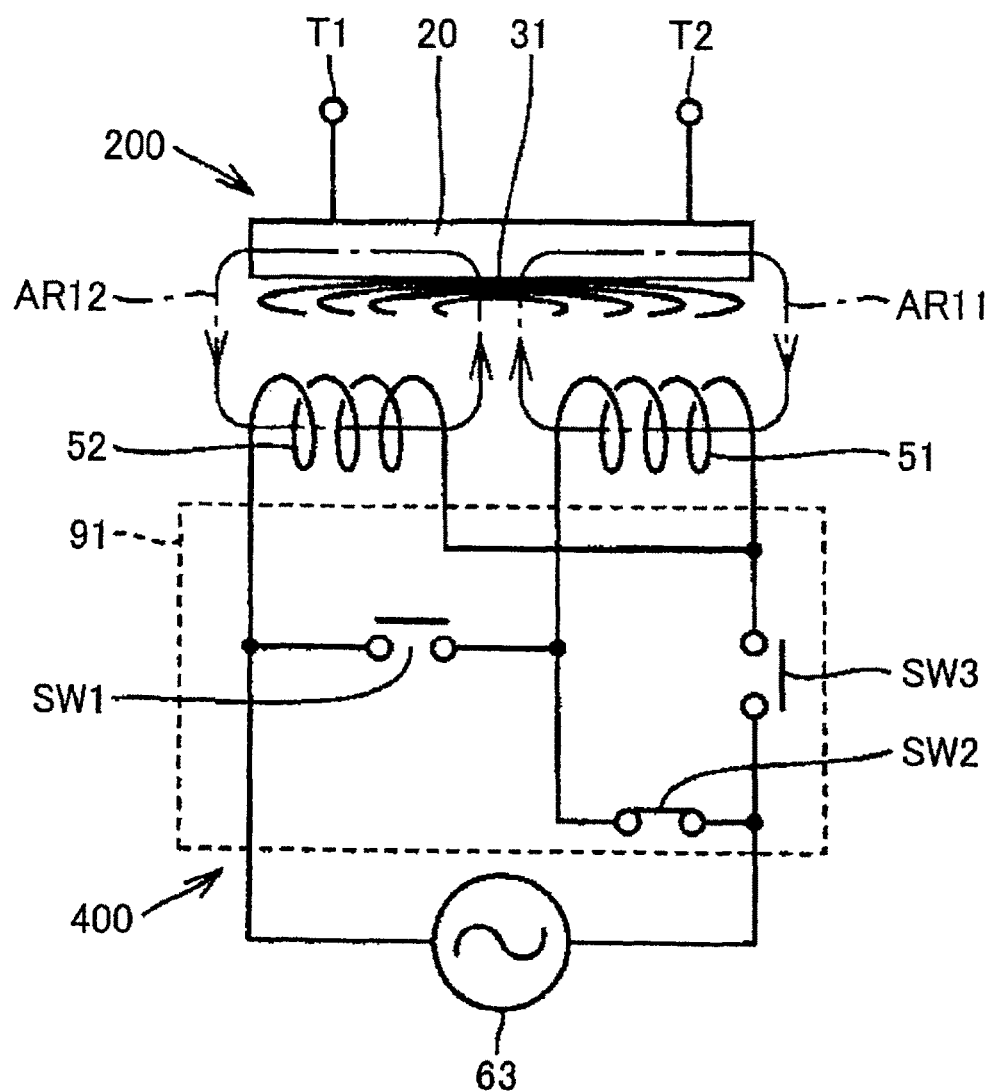
FIG. 13 is a circuit view that schematically shows a state where electric power is transferred with the use of the power transfer system according to the first embodiment.

FIG. 12 is a perspective view that schematically shows a state where electric power is transferred between the power receiving unit 200 and the power transmitting unit 400. FIG. 13 is a circuit diagram that schematically shows a state where electric power is transferred between the power receiving unit 200 and the power transmitting unit 400. As shown in FIG. 12 and FIG. 13, when electric power is transferred between the power receiving unit 200 and the power transmitting unit 400, the power receiving unit 200 and the power transmitting unit 400 are arranged so as to face each other with an air gap therebetween.

The switching device 91 (see FIG. 13) receives information, including whether the type of the coil unit of the power receiving unit is a circular coil or a solenoid coil, via the communication unit 160 (see FIG. 4) and the communication unit 230 (see FIG. 4). The switching device 91 is driven by the switching signal, and sets the switches SW1, SW3 in the off state and sets the switch SW2 in the on state. The coil 51 and the coil 52 are connected in series with each other.

Alternating current having a predetermined frequency is supplied from the alternating-current power supply 63 to the coils 51, 52. When the predetermined alternating current is supplied to the coils 51, 52, electromagnetic fields (arrows AR11, AR12) that oscillate at the predetermined frequency are respectively formed around the coils 51, 52.

A magnetic flux indicated by the arrow AR11 in FIG. 12 passes through the outside magnetic pole portion 43, winding portion 41 and center magnetic pole portion 45 of the core 40. Inside the coil 51, a magnetic flux flowing from the outside magnetic pole portion 43 side toward the center magnetic pole portion 45 side is generated.

A magnetic flux indicated by the arrow AR12 in FIG. 12 passes through the outside magnetic pole portion 44, winding portion 42 and center magnetic pole portion 45 of the core 40. Inside the coil 52, a magnetic flux flowing from the outside magnetic pole portion 44 side toward the center magnetic pole portion 45 side is generated. Inside the coil 51 and inside the coil 52, magnetic fluxes flowing in the opposite directions along the winding axes of the coils 51, 52 are respectively generated. Because alternating current flows through the power transmitting unit 400, when the direction of current flowing through each coil is inverted, the direction of the corresponding magnetic flux is also inverted. After the inversion as well, magnetic fluxes flowing in the opposite directions along the winding axes of the coils 51, 52 are respectively generated inside the coil 51 and inside the coil 52.

The coil 31 of the power receiving unit 200 receives electric power through the electromagnetic fields (arrows AR11, AR12) respectively generated around the coils 51, 52. As described above, the core 20 and coil 31 of the power receiving unit 200 constitute the circular coil. Magnetic fluxes generated around the core 20 each have a so-called doughnut shape, and pass through the center portion of the core 20 having a circular shape in the facing direction (arrow Z direction in FIG. 1). The center portion here is near the center of the outer shape circle of the core 20 and is a hollow portion inside of the coil 31 where no coil 31 is present.

When electric power is transferred, the magnetic fluxes formed in the electromagnetic fields also pass through portions of the center magnetic pole portion 45, close to the outer edges 45S, 45T. For example, it is assumed that the power receiving unit 200 is arranged so as to deviate in the perpendicular direction B400 with respect to the position of the power transmitting unit 400. In this case as well, the magnetic fluxes are able to pass through the portion of the center magnetic pole portion 45, close to the outer edge 45S, so it is possible to suppress a decrease in power transfer efficiency.

On the other hand, it is assumed that the power receiving unit 200 is arranged so as to deviate in the direction C400 opposite to the perpendicular direction B400 with respect to the position of the power transmitting unit 400. In this case as well, the magnetic fluxes are able to pass through the portion of the center magnetic pole portion 45, close to the outer edge 45T, so it is possible to suppress a decrease in power transfer efficiency. With the external power supply device 61 including the power transmitting device 60 according to the present embodiment, even when the electromotive vehicle-side power receiving device 11 includes the circular, coil, it is possible to appropriately supply electric power to the vehicle.

<Transfer of Electric Power to Solenoid Coil>

Figure 14:
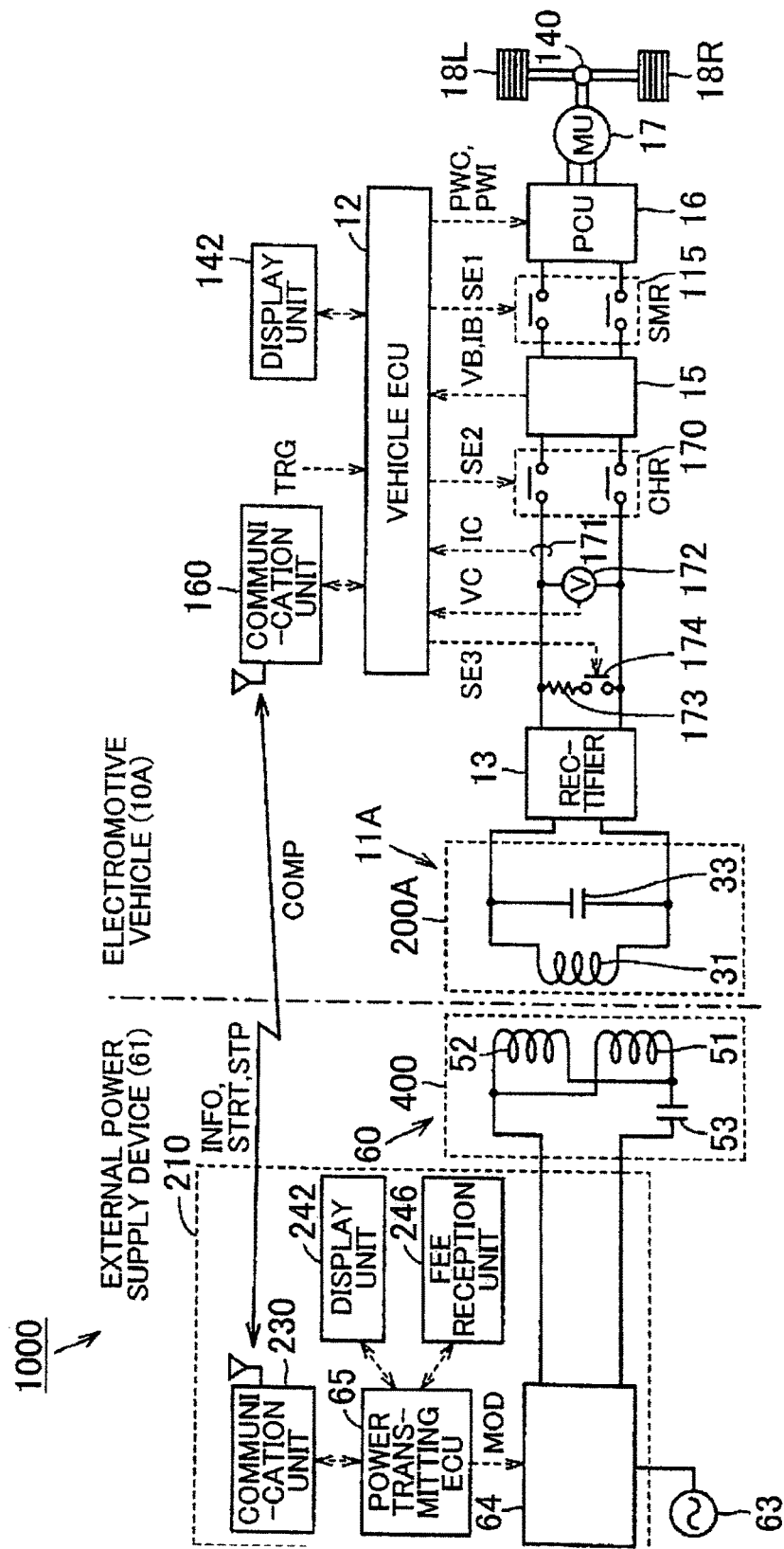
FIG. 14 is a circuit diagram that shows a state at the time when the power transmitting device according to the first embodiment supplies electric power to the electromotive vehicle including a solenoid coil as a power receiving device.
Figure 15:
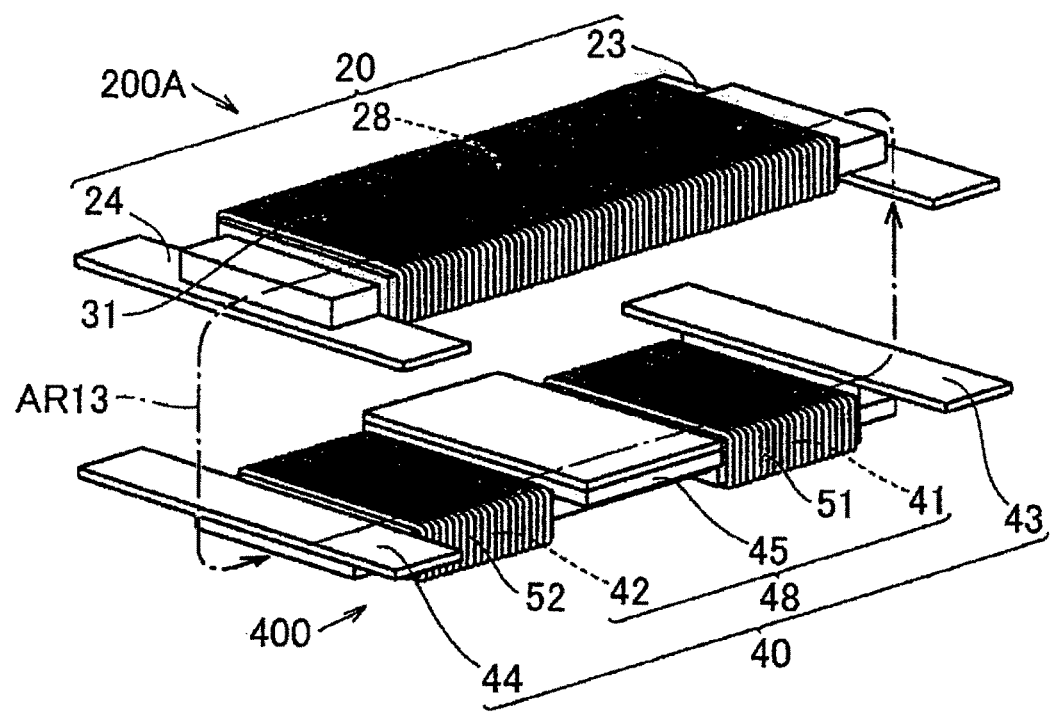
FIG. 15 is a perspective view that shows a state at the time when the power transmitting device according to the first embodiment supplies electric power to the electromotive vehicle including a power receiving coil made of the solenoid coil as the power receiving device.
Figure 16:
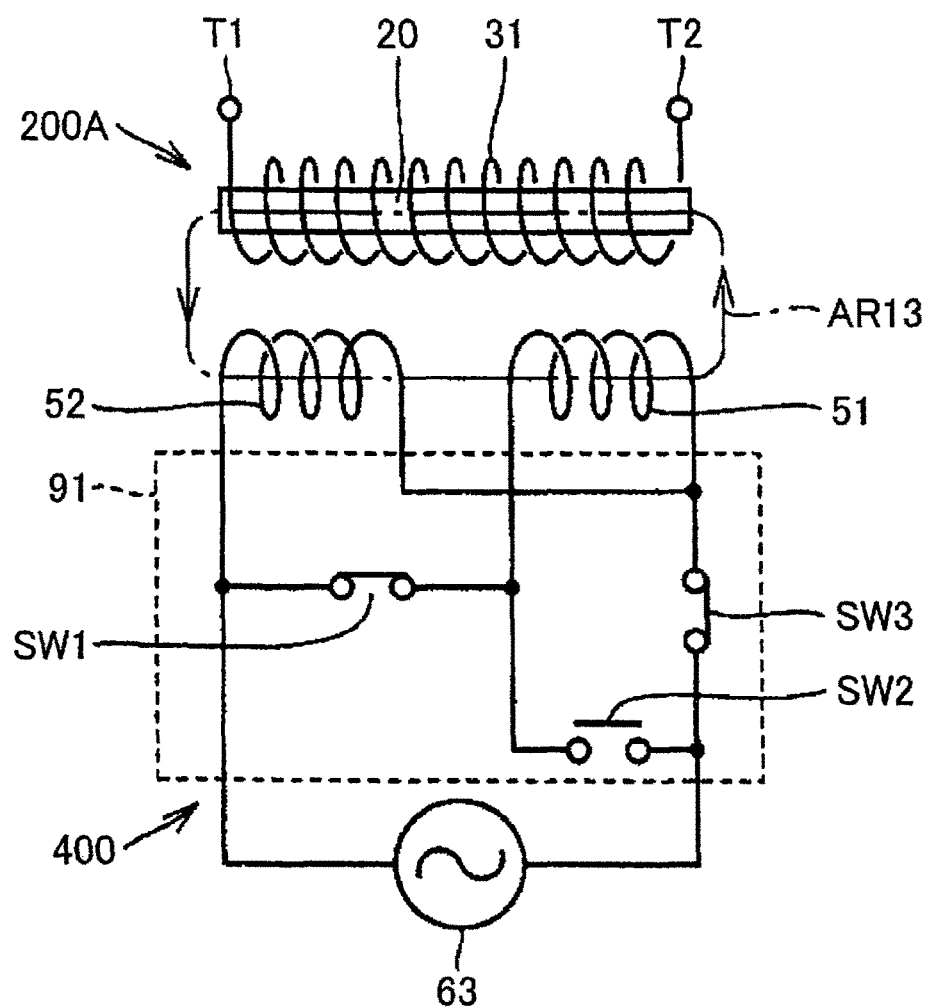
FIG. 16 is a circuit diagram that shows a state at the time when the power transmitting device according to the first embodiment supplies electric power to the solenoid coil of the power receiving device.

FIG. 14 to FIG. 16 are views that show a state where the external power supply device 61 including the power transmitting device 60 according to the present embodiment supplies electric power to an electromotive vehicle 10A including a solenoid coil-type power receiving coil as a power receiving device 11A. As shown in FIG. 14, the power receiving device 11A of the electromotive vehicle 10A differs from the power receiving device 11 of the electromotive vehicle 10 described with reference to FIG. 4 in that a power receiving unit 200A is provided.

FIG. 15 is a perspective view that schematically shows a state where electric power is transferred between the power receiving unit 200A and the power transmitting unit 400. The power receiving unit 200A includes the ferrite core 20, the coil 31 (secondary coil) and a capacitor (not shown). The coil 31 of the power receiving unit 200A is a solenoid coil having a square tubular shape as a whole.

The core 20 includes a shaft portion 28 and outside magnetic pole portions 23, 24. The core 20 has an H shape as a whole. The shaft portion 28 of the core 20 is formed in a plate shape, and has a shape extending in the direction in which the winding axis of the coil 31 extends. The winding axis of the coil 31 has a shape extending in a straight line. The coil 31 is formed so as to surround the winding axis.

The outside magnetic pole portion 23 is provided on one end portion of the shaft portion 28 in the direction in which the winding axis of the coil 31 extends. The outside magnetic pole portion 23 has a rectangular outer shape, and is formed in a plate shape. The outside magnetic pole portion 23 has a shape extending in a direction perpendicular to the direction in which the winding axis of the coil 31 extends. The outside magnetic pole portion 24 is provided on the other end portion of the shaft portion 28 in the direction in which the winding axis of the coil 31 extends. The outside magnetic pole portion 24 has a rectangular outer shape, and is formed in a plate shape. The outside magnetic pole portion 24 also has a shape extending in the direction perpendicular to the direction in which the winding axis of the coil 31 extends.

FIG. 16 is a circuit diagram that schematically shows a state where electric power is transferred between the power receiving unit 200A and the power transmitting unit 400. As shown in FIG. 15 and FIG. 16, when electric power is transferred between the power receiving unit 200A and the power transmitting unit 400, the power receiving unit 200A and the power transmitting unit 400 are arranged so as to face each other with an air gap therebetween.

The switching device 91 (see FIG. 16) receives information, including whether the type of the coil unit of the power receiving unit is a circular coil or a solenoid coil, via the communication unit 160 (see FIG. 14) and the communication unit 230 (see FIG. 14). The switching device 91 (see FIG. 16) is driven by the switching signal, and sets the switches SW1, SW3 in the on state and sets the switch SW2 in the off state. The coil 51 and the coil 52 are connected in parallel with each other.

Alternating current having a predetermined frequency is supplied from the alternating-current power supply 63 to the coils 51, 52. When the predetermined alternating current is supplied to the coils 51, 52, an electromagnetic field (arrow AR13) that oscillates at the predetermined frequency is formed around the coils 51, 52.

A magnetic flux indicated by the arrow AR13 in FIG. 15 passes through the outside, magnetic pole portion 44, winding portion 42, center magnetic pole portion 45, winding portion 41 and outside magnetic pole portion 43 of the core 40. Inside the coil 52, a magnetic flux flowing from the outside magnetic pole portion 44 side toward the center magnetic pole portion 45 side is generated. Inside the coil 51, a magnetic flux flowing from the center magnetic pole portion 45 side toward the outside magnetic pole portion 43 side is generated. Inside the coil 51 and inside the coil 52, magnetic fluxes flowing in the same direction along the winding axes of the coils 51, 52 are respectively generated. Because alternating current flows through the power transmitting unit 400A, when the direction of current flowing through each coil is inverted, the direction of the corresponding magnetic flux is also inverted. After the inversion as well, magnetic fluxes flowing in the same direction along the winding axes of the coils 51, 52 are respectively generated inside the coil 51 and inside the coil 52.

The coil 31 of the power receiving unit 200A receives electric power through the electromagnetic field (arrow AR13) generated around the coils 51, 52. As described above, the core 20 and coil 31 of the power receiving unit 200A constitute the solenoid coil. A magnetic flux generated around the core 20 has a single annular shape, and passes through the center portion of the core 20 having a plate shape in the longitudinal direction of the core 20. With the external power supply device 61 including the power transmitting device 60 according to the present embodiment, even when the electromotive vehicle-side power receiving device 11A includes the solenoid coil, it is possible to appropriately supply electric power to the vehicle.

Relationship Between Connection Mode of Coils 51, 52 and Number of Turns of Each of Coils 51, 52

Figure 17:
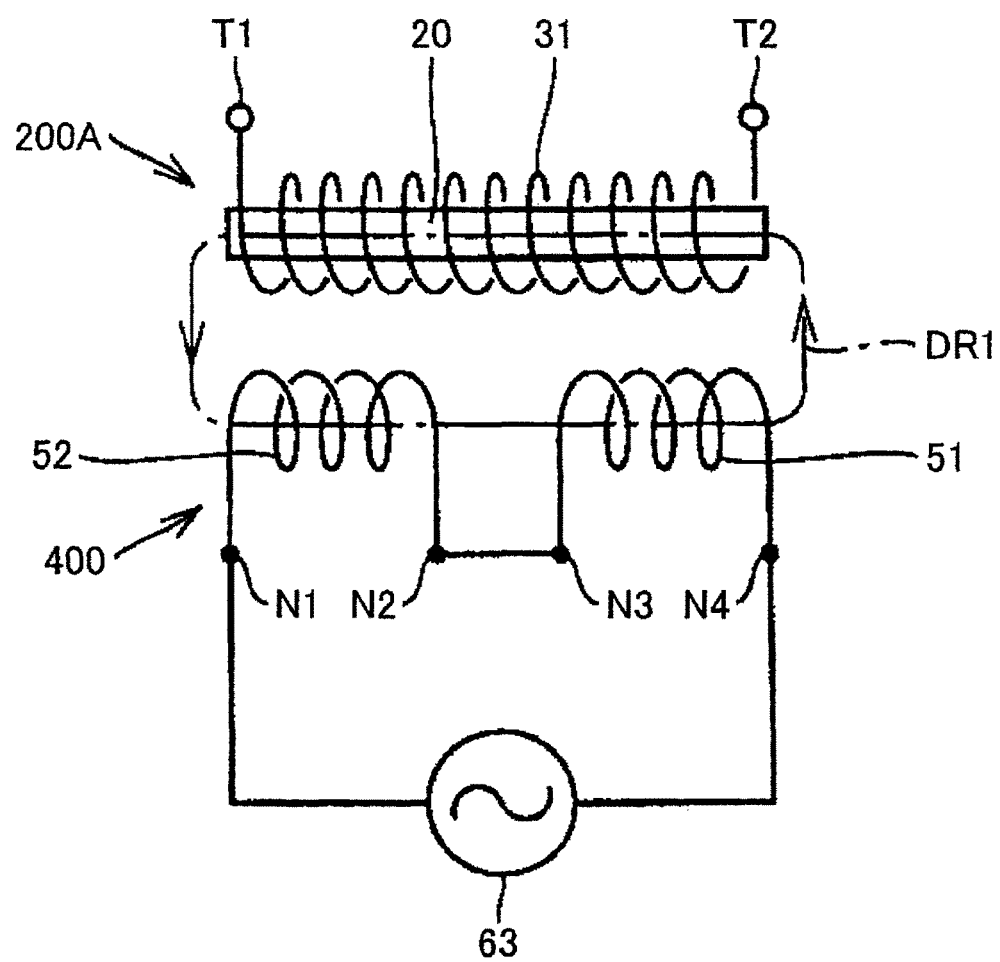
FIG. 17 is a circuit diagram that schematically shows a state at the time when the power transmitting device including two serially connected coils supplies electric power to the solenoid coil.
Figure 18:
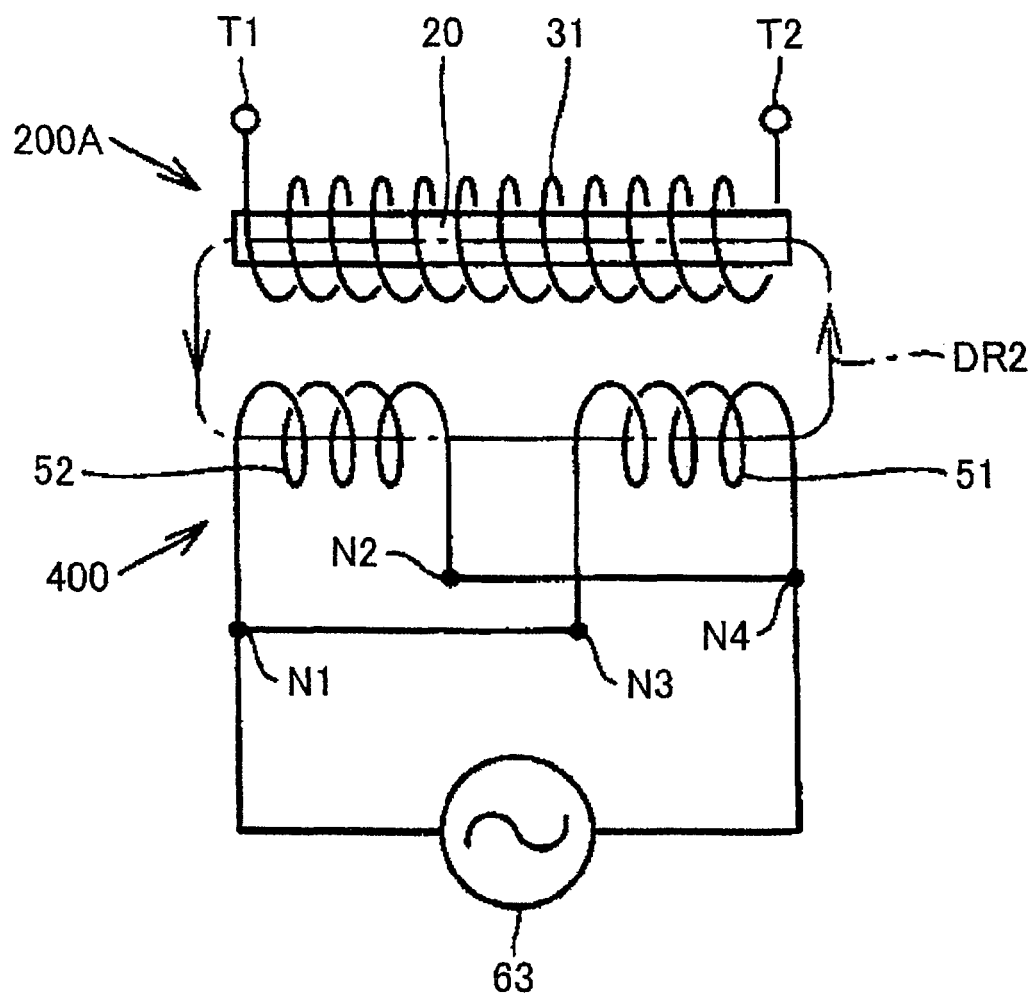
FIG. 18 is a circuit diagram that schematically shows a state at the time when the power transmitting device including two parallel connected coils supplies electric power to the solenoid coil.

FIG. 17 and FIG. 18 are circuit diagrams that schematically show a state at the time when the power transmitting unit 400 supplies electric power to the power receiving unit 200A. Hereinafter, the relationship between the connection mode of the coils 51, 52 and the number of turns of each of the coils 51, 52 will be described on the basis of a current I and the number of flux linkages $\lambda$ ($=N\Phi=LI$) of a main magnetic flux $\Phi$. The coil 31 of the power receiving unit 200A (also see FIG. 15) is a solenoid coil, and the winding axis of the coil 31 is parallel to the winding axis of each of the coils 51, 52. When electric power is transferred as shown in FIG. 17 and FIG. 18, magnetic fluxes flowing in the same direction along the winding axes of the coils 51, 52 are respectively generated (see arrows DR1, DR2) inside the coil 51 and inside the coil 52 in each case.

In the configuration shown in FIG. 17, the coil 51 and the coil 52 are connected in series with each other. A terminal N2 of the coil 52 and a terminal N3 of the coil 51 are connected to each other. A terminal N1 of the coil 52 and a terminal N4 of the coil 51 are connected to the alternating-current power supply 63.

On the other hand, in the configuration shown in FIG. 18, the coil 51 and the coil 52 are connected in parallel with each other. The terminal N2 of the coil 52 and the terminal N4 of the coil 51 are connected to each other, and the terminal N1 of the coil 52 and the terminal N3 of the coil 51 are connected to each other. The terminal N1 of the coil 52 and the terminal N4 of the coil 51 are connected to the alternating-current power supply 63.

In each of FIG. 17 and FIG. 18, the number of turns of each of the coils 51, 52 is denoted by N, and the current supplied from the alternating-current power supply 63 (inverter) is denoted by I. A magnetic flux that links with the coil 51 is denoted by $\phi1$, and a magnetic flux that links with the coil 52 is denoted by $\phi2$. It is assumed that the coils 51, 52 and the coil 31 do not deviate in position from each other and are arranged in correct position with respect to each other. Because the number of turns of each of the coils 51, 52 is the same, the self-inductance of each of the coils 51, 52 is equal to each other.

In the case of series connection shown in FIG. 17, a current of I flows through the coils 51, 52. Where the current is I and the number of flux linkages of the main magnetic flux $\Phi$ is $\lambda$ at the time when electric power is supplied to the solenoid coil, $\lambda=2N\Phi$. On the other hand, in the case of parallel connection shown in FIG. 18, a current of I/2 flows through each of the coil 51, 52. Where the current is I and the number of flux linkages of the main magnetic flux $\Phi$ is $\lambda$, $\lambda=N\Phi$. The number of turns is 2N in the case of series connection, the number of turns is N in the case of parallel connection, so the parallel number of winding wires (litz wires) becomes twice. Both in the case of series connection and in the case of parallel connection, $\phi1=\phi2=\Phi$. Thus, the strength (arrow DR1) of the magnetic field shown in FIG. 17 is larger than the strength (arrow DR2) of the magnetic field shown in FIG. 18.

Figure 19:
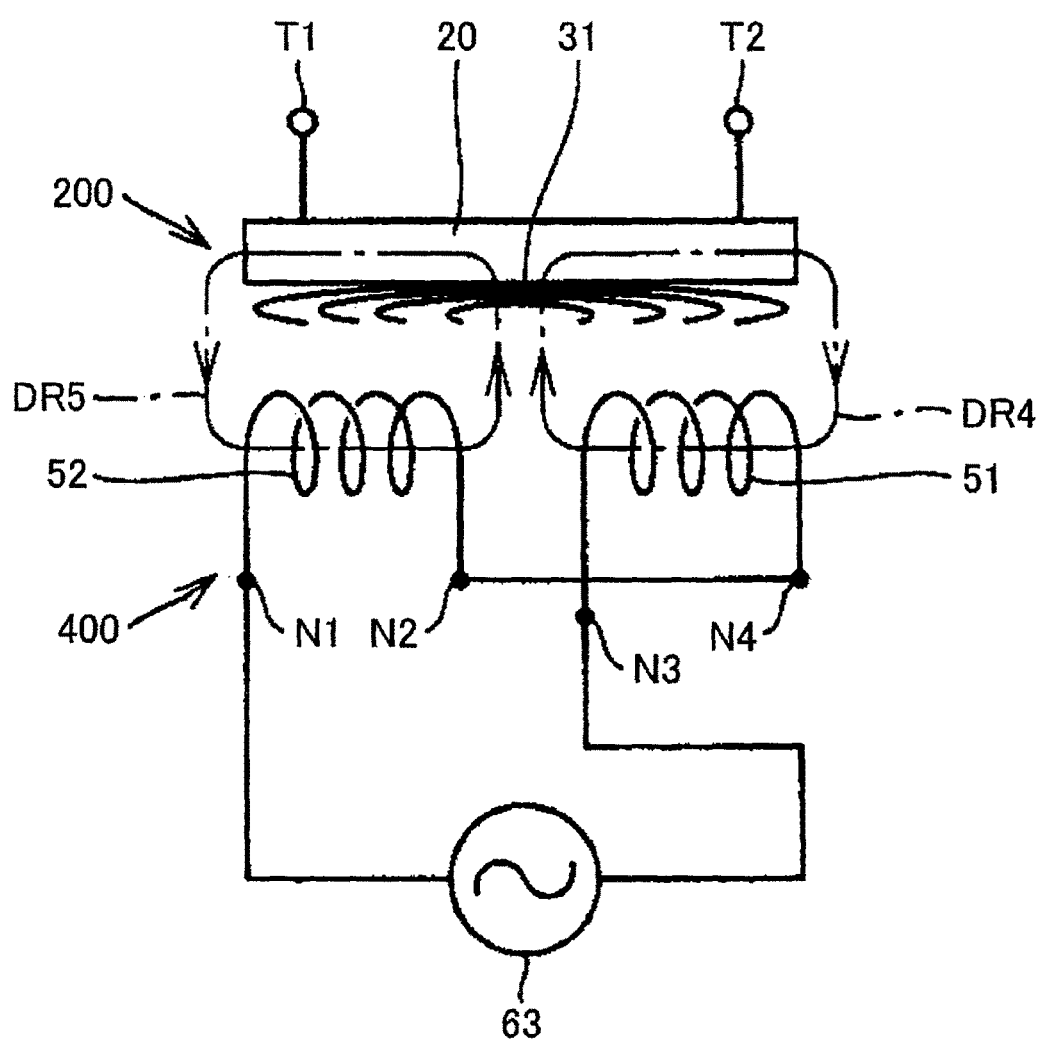
FIG. 19 is a circuit diagram that schematically shows a state at the time when the power transmitting device including the two serially connected coils supplies electric power to a circular coil.
Figure 20:
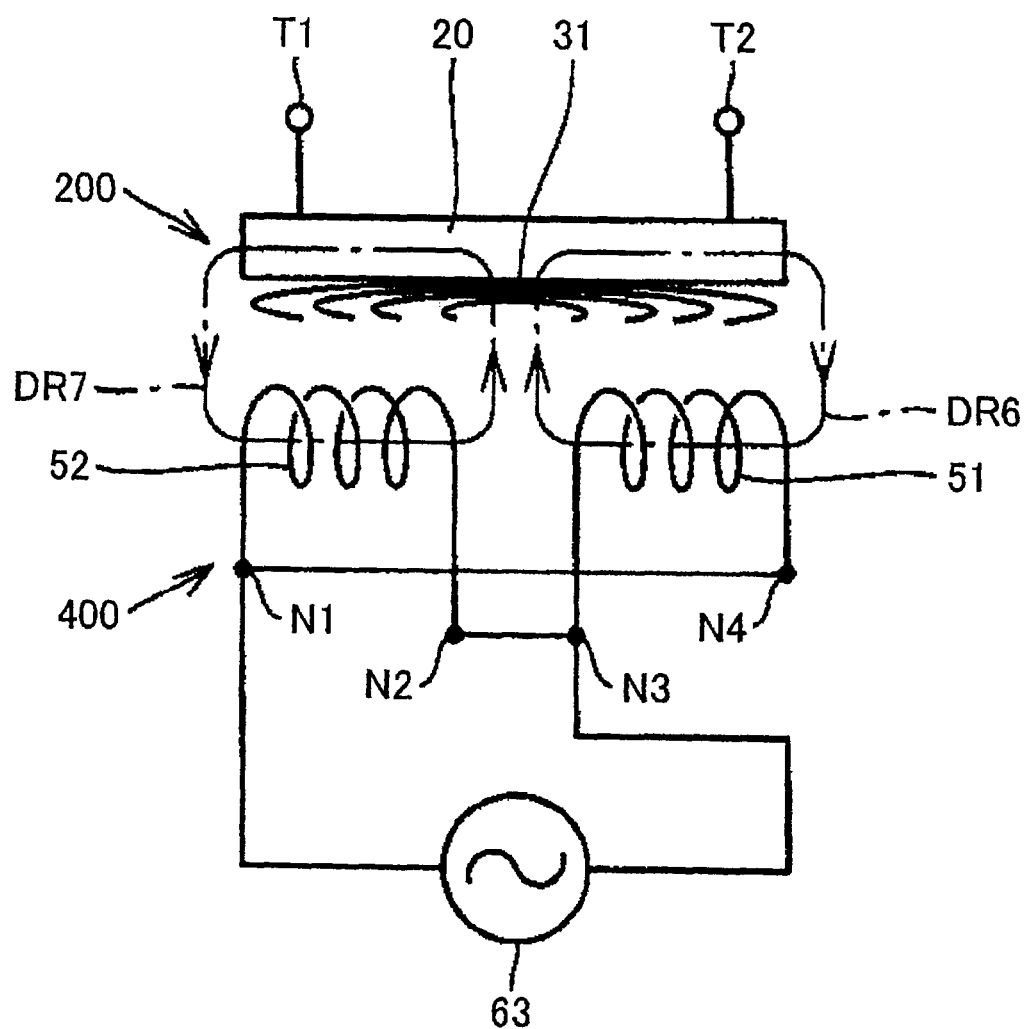
FIG. 20 is a circuit diagram that schematically shows a state at the time when the power transmitting device including the two parallel connected coils supplies electric power to the circular coil.

FIG. 19 and FIG. 20 are circuit diagrams that schematically show a state at the time when the power transmitting unit 400 supplies electric power to the power receiving unit 200. The coil 31 of the power receiving unit 200 (also see FIG. 13) is a circular coil, and the winding axis of the coil 31 is perpendicular to the winding axis of each of the coils 51, 52. It is assumed that the coils 51, 52 and the coil 31 do not deviate in position from each other and are arranged in correct position with respect to each other. When electric power is transferred as shown in FIG. 19 and FIG. 20, magnetic fluxes flowing in the opposite directions along the winding axes of the coils 51, 52 are respectively generated (see arrows DR4, DR5, DR6, DR7) inside the coil 51 and inside the coil 52 in each case.

In the configuration shown in FIG. 19, the coil 51 and the coil 52 are connected in series with each other. The terminal N2 of the coil 52 and the terminal N4 of the coil 51 are connected to each other. The terminal N1 of the coil 52 and the terminal N3 of the coil 51 are connected to the alternating-current power supply 63.

On the other hand, in the configuration shown in FIG. 20, the coil 51 and the coil 52 are connected in parallel with each other. The terminal N2 of the coil 52 and the terminal N3 of the coil 51 are connected to each other, and the terminal N1 of the coil 52 and the terminal N4 of the coil 51 are connected to each other. The terminal N1 of the coil 52 and the terminal N3 of the coil 51 are connected to the alternating-current power supply 63.

In each of FIG. 19 and FIG. 20, the number of turns of each of the coils 51, 52 is denoted by N, and the current supplied front the alternating-current power supply 63 (inverter) is denoted by I. A magnetic flux ($\Phi/2=\phi1=\phi2$), which is half the main magnetic flux $\Phi$, links with the coils 51, 52. Because the number of turns of each of the coils 51, 52 is the same, the self-inductance of each of the coils 51, 52 is equal to each other.

In the case of series connection shown in FIG. 19, a current of I flows through the coils 51, 52. Where the current is I and the number of flux linkages of the main magnetic flux $\Phi$ is $\lambda$ at the time when electric power is supplied to the circular coil, $\lambda=N\Phi$. The magnetic flux at the time when electric power is supplied to the circular coil is half the main magnetic flux at the time when electric power is supplied to the solenoid coil. On the other hand, in the case of parallel connection shown in FIG. 20, a current of I/2 flows through each of the coils 51, 52. Where the current is I and the number of flux linkages of the main magnetic flux $\Phi$ is $\lambda$ at the time when electric power is supplied to the circular coil, $\lambda=N\Phi/2$. The number of turns is N in the case of series connection, the number of turns is N/2 in the case of parallel connection, so the parallel number of winding wires (litz wires) becomes twice. Thus, the strength of each of the magnetic fields (arrows DR4, DR5) shown in FIG. 19 is larger than the strength of each of the magnetic fields (arrows DR6, DR7) shown in FIG. 20.

In the power transfer system 1000 and the power transmitting device 60 according to the present embodiment, when the power transmitting device 60 supplies electric power to the power receiving device 11 (the power receiving unit 200A shown in FIG. 15) including the solenoid coil, the configuration shown in FIG. 18 is employed. Specifically, when the power receiving coil is the solenoid coil, the switching device 91 connects the coil 51 and the coil 52 in parallel with each other such that magnetic fluxes flowing in the same direction along the winding axes of these coil 51 and coil 52 are respectively generated inside the coil 51 and inside the coil 52.

On the other hand, when the power transmitting device 60 supplies electric power to the power receiving device 11 (power receiving unit 200 shown in FIG. 13) including the circular coil, the configuration shown in FIG. 19 is employed. Specifically, when the power receiving coil is the circular coil, the switching device 91 connects the coil 51 and the coil 52 in series with each other such that magnetic fluxes flowing in the opposite directions along the winding axes of the coil 51 and coil 52 are respectively generated inside the coil 51 and inside the coil 52.

In the power transfer system 1000 and the power transmitting device 60 according to the present embodiment, the number of flux linkages of the power transmitting unit 400 as a whole is substantially the same value ($\lambda=N\Phi$ as described above) not only when electric power is supplied to the power receiving device 11 (the power receiving unit 200A shown in FIG. 15) including the solenoid coil but also when electric power is supplied to the power receiving device 11 (the power receiving unit 200 shown in FIG. 13) including the circular coil. When electric power is transmitted to the coil 31 with the use of the coils 51, 52 electrically connected to each other and arranged at an interval, it is possible to change the connection mode of the coils 51, 52 on the basis of the type of the coil 31.

With this configuration, even when the secondary side is the solenoid coil or the circular coil, it is possible to suppress fluctuations in output voltage and output current of the capacity of the inverter, or the like, that drives the primary-side power transmitting unit 400, so it is possible to set the output voltage and output current of the capacity of the inverter, or the like, to lower values.

Second Embodiment

Figure 21:
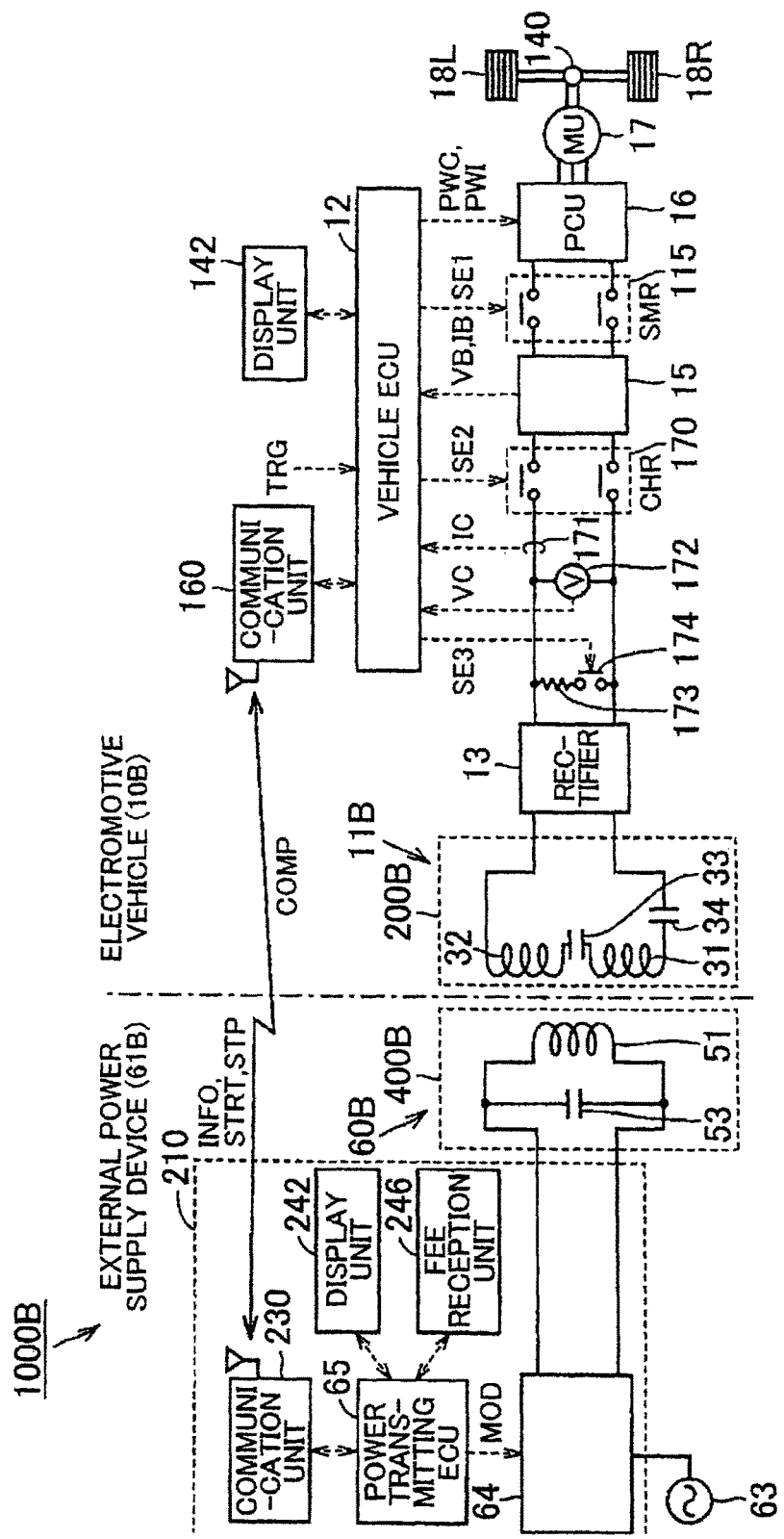
FIG. 21 is a view that shows the detailed circuit configuration of a power transfer system according to a second embodiment.

FIG. 21 is a view that shows the detailed circuit configuration of a power transfer system 1000B according to a second embodiment. The power transfer system 1000B includes an external power supply device 61B and an electromotive vehicle 10B.

The external power supply device 61B differs from the external power supply device 61 in that a power transmitting device 60B is provided instead of the power transmitting device 60 (see FIG. 4) of the external power supply device 61. The electromotive vehicle 10B differs from the electromotive vehicle 10 in that a power receiving device 11B is provided instead of the power receiving device 11 (see FIG. 4) of the electromotive vehicle 10.

The power transmitting device 60B of the external power supply device 61B includes a power transmitting unit 400B. The power transmitting unit 400B includes the coil 51, which serves as a power transmitting coil, and the capacitor 53. The capacitor 53 according to the present embodiment is connected in parallel with the coil 51. The coil 51 has a stray capacitance. In the power transmitting unit 400B, an electric circuit is formed of the inductance of the coil 51, the stray capacitance of the coil 51 and the capacitance of the capacitor 53. The capacitor 53 is not an indispensable component and may be used as needed.

The capacitor 53 constitutes an LC resonant circuit together with the coil 51. The capacitance of the capacitor 53 is set as needed on the basis of the inductance of the coil 51 such that a predetermined frequency is obtained. The capacitor 53 may be one or a plurality of switching capacitors selected from among a plurality of switching capacitors having different capacitances by switching electrical connection. The capacitor 53 may be the one (for example, variable capacitor) of which the capacitance is adjustable. These switching capacitor and variable capacitor may be used as the capacitor 53 in combination.

The power receiving device 11B of the electromotive vehicle 10B includes a power receiving unit 200B. The power receiving unit 200B includes coils 31, 32, which serve as power receiving coils, and capacitors 33, 34. FIG. 21 shows a state where the coil 31 (a first power receiving coil or a first coil) and the coil 32 (a second power receiving coil or a second coil) according to the present embodiment are connected in series with each other. The capacitor 33 is provided between the coil 31 and the coil 32. The capacitor 34 is provided between the coil 31 and the rectifier 13. Although details will be described later, the coils 31, 32 are selectively switched between a series connection state and a parallel connection state by a switching device 92 (see FIG. 22).

The capacitors 33, 34 form an LC resonant circuit together with the coils 31, 32. The capacitance of the capacitors 33, 34 is set as needed on the basis of the inductance of each of the coils 31, 32 such that a predetermined frequency is obtained. The capacitors 33, 34 each may be one or a plurality of switching capacitors selected from among a plurality of switching capacitors having different capacitances by switching electrical connection. The capacitors 33, 34 each may be the one (for example variable capacitor) of which the capacitance is adjustable. These switching capacitor and variable capacitor may be used as the capacitors 33, 34 in combination.

The coils 31, 32 contactlessly receive electric power from the coil 51 (primary coil) of the power transmitting unit 400B of the power transmitting device 60B through electromagnetic induction by using an electromagnetic field. The number of turns of each of the coils 31, 32 and a distance from the coils 31, 32 to the coil 51 are set as needed on the basis of the distance between the coils 31, 32 and the coil 51, the frequency of the coil 51, the frequency of the coils 31, 32, and the like, such that a coupling coefficient κ that indicates the degree of coupling between the coil 51 and the coils 31, 32, and the like, become appropriate values.

Figure 22:
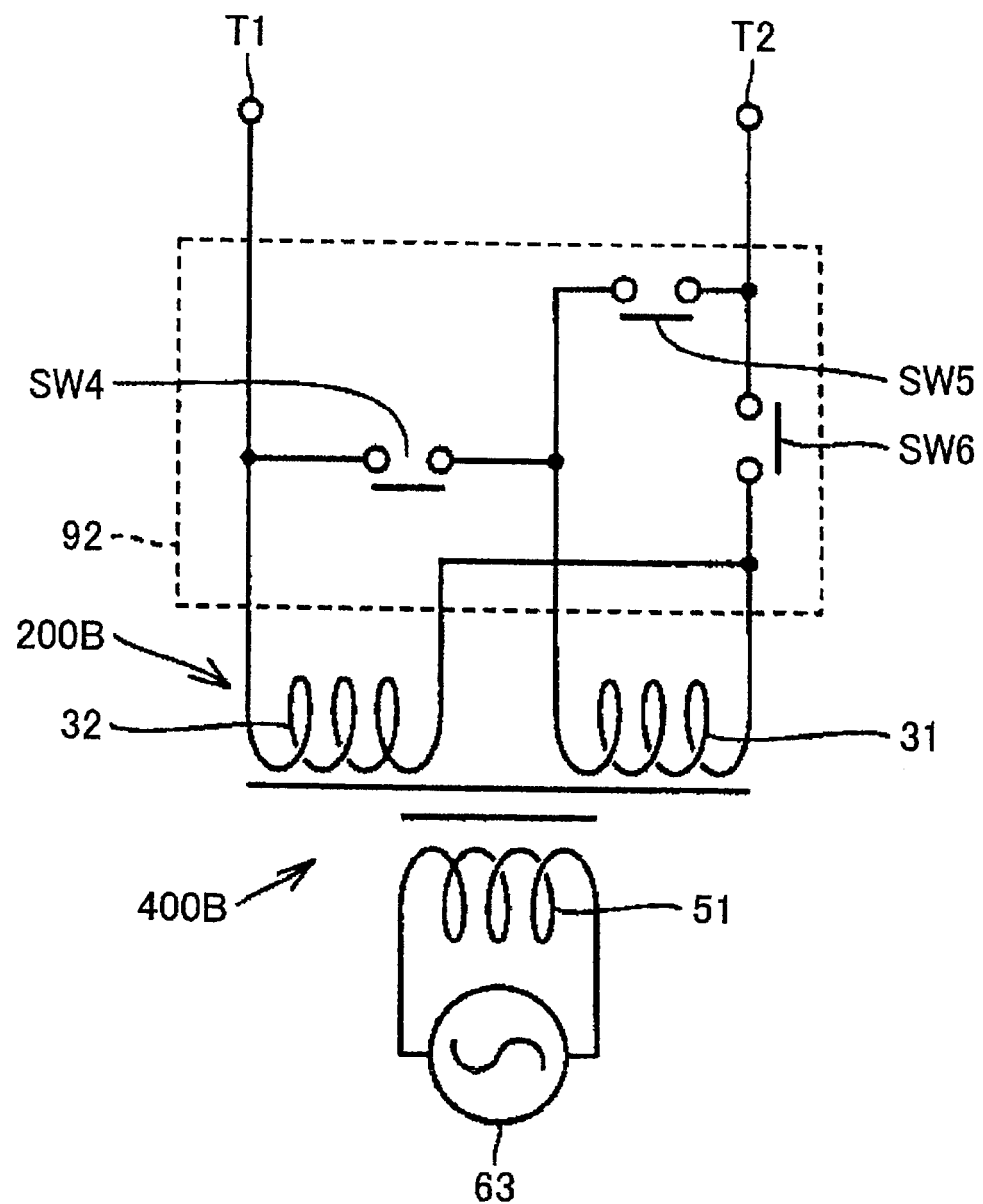
FIG. 22 is a circuit diagram that schematically shows a switching device used in a power receiving device of the power transfer system according to the second embodiment and a surrounding configuration of the switching device.

FIG. 22 is a circuit diagram that schematically shows the switching device 92 used in the power receiving unit 200B and its surrounding configuration. The power transmitting unit 400B includes the coil 51. Both terminals of the coil 51 are connected to the alternating-current power supply 63. The terminals T1, T2 of the power receiving unit 200B are connected to the rectifier 13 (see FIG. 21). The coils 31, 32 used in the power receiving unit 200B are configured to be able to switch the direction of current flowing through the coils 31, 32 in an electrical control manner by operation of the switching device 92.

The power receiving device including the power receiving unit 200B is able to change between a configuration (see FIG. 29 and FIG. 30) corresponding to a circular coil and a configuration (see FIG. 32 and FIG. 33) corresponding to a solenoid coil (also referred to as square coil) by a switching signal transmitted from the communication unit 230 (see FIG. 21) to the communication unit 160 (see FIG. 21). For example, when switches SW4, SW6 are set in the off state and a switch SW5 is set in the on state (see FIG. 30), the coils 31, 32 are connected in series with each other. For example, when the switches SW4, SW6 are set in the on state and the switch SW5 is set in the off state (see FIG. 33), the coils 31, 32 are connected in parallel with each other.

Details of these operations will be described later with reference to FIG. 29 to FIG. 33.

<Power Receiving Unit 200B>

FIG. 23 is a perspective view that shows the power receiving unit 200B of the electromotive vehicle 10B (see FIG. 21). The power receiving unit 200B includes the core 20, the coil 31, the coil 32 and the capacitors 33, 34 (see FIG. 21). The power receiving unit 200B is contained in the case 66 (see FIG. 3) together with the rectifier 13 (see FIG. 21), and the like.

The core 20 is formed of a ferrite member, and includes the shaft portion 28 and outside magnetic pole portions 23, 24. The shaft portion 28 has such a shape that the shaft portion 28 extends in a direction (winding axis direction) in which winding axes A200 of the coils 31, 32 extend. In the present embodiment, the winding axes A200 of the coils 31, 32 are located along the same straight line, and have a shape extending in a straight line. The coils 31, 32 are arranged next to each other at an interval in the direction in which the winding axes A200 extend. The winding axis A200 of each of the coils 31, 32 extends in a direction that intersects with the facing direction (arrow Z direction in FIG. 1) (direction perpendicular to the facing direction).

The facing direction is a direction in which the coils 31, 32 face the coil 51 of the power transmitting unit 400B. The facing direction in the present embodiment is a direction perpendicular to the surface (ground surface) of the parking space 62 (see FIG. 1). The winding axes A200 extend in a direction parallel to the surface (ground surface) of the parking space 62 (see FIG. 1). The coils 31, 32 are provided so as to surround the corresponding winding axes A200.

For example, where the coil 31 is sectioned into unit length from one end portion in the longitudinal direction of the coil 31 to the other end portion in the longitudinal direction of the coil 31, the winding axis A200 of the coil 31 is a line drawn to pass through the curvature radius center of the coil 31 for each unit length or near the curvature radius center. A method of deriving the winding axis A200 that is an imaginary line from the curvature radius center of the coil 31 for each unit length includes various approximation methods, such as linear approximation, logarithmic approximation and polynomial approximation. The same applies to the winding axis A200 of the coil 32. In the present embodiment, the winding axis of the coil 31 and the winding axis of the coil 32 form substantially the same straight line as the winding axis A200.

The shaft portion 28 includes a winding portion 21 that serves as a first shaft portion, a winding portion 22 that serves as a second shaft portion and a center magnetic pole portion 25 that serves as an intermediate portion. In the present embodiment, the coils 31, 32 and the winding portions 21, 22 are fixed with the use of support members 26, 27.

FIG. 24 is a perspective view that shows the support member 26. The support member 26 includes plate portions 26A, 26B and a tubular portion 26C. Each of the plate portions 26A, 26B has a plate shape, and is arranged so as to extend in the direction perpendicular to the winding axis A200 of the coil 31. Each of the plate portions 26A, 26B according to the present embodiment has a rectangular outer shape, and is arranged so as to extend in the direction perpendicular to the winding axis A200 of the coil 31. The plate portion 26A and the plate portion 26B are arranged so as to face each other at an interval in a direction in which the winding axis A200 extends.

The plate portion 26A has an opening 26AH having a rectangular inner peripheral shape. The plate portion 26B has an opening 26BH having a rectangular inner peripheral shape. The tubular portion 26C has a hollow shape. The tubular portion 26C according to the present embodiment has a square tubular shape, and is provided so as to connect the plate portion 26A to the plate portion 26B. The opening 26AH of the plate portion 26A and the opening 26BH of the plate portion 26B communicate with each other via the inside of the tubular portion 26C.

The winding portion 21 is formed by laminating ferrites 21A, 21B, 21C having a plate shape, and is inserted inside the tubular portion 26C. The winding portion 21 according to the present embodiment is formed of the plurality of ferrites; instead, the winding portion 21 may be formed of a single ferrite. The coil 31 is wound around the tubular portion 26C.

In a state where the coil 31 is wound around the tubular portion 26C, the coil 31 is arranged around the winding portion 21. The coil 31 is formed so as to be displaced in the direction in which the winding axis A200 extends as a portion of the coil 31 shifts from one end portion toward the other end portion in the direction in which the winding axis A200 extends. A positional deviation of the coil 31 in the direction along the winding axis A200 is prevented by the plate portion 26A. A positional deviation of the coil 31 in a direction opposite to the direction along the winding axis A200 is prevented by the plate portion 26B.

The reference signs indicated with parentheses in FIG. 24 correspond to the support member 27. In the present embodiment, the support member 27 has the same shape as the support member 26. The support member 27 includes plate portions 27A, 27B and a tubular portion 27C. Each of the plate portions 27A, 27B has a plate shape, and is arranged so as to extend in the direction perpendicular to the winding axis A200 of the coil 32. Each of the plate portions 27A, 27B according to the present embodiment has a rectangular outer shape, and is arranged so as to extend in the direction perpendicular to the winding axis A200 of the coil 32. The plate portion 27A and the plate portion 27B are arranged so as to face each other at an interval in the direction in which the winding axis A200 extends.

The plate portion 27A has an opening 27AH having a rectangular inner peripheral shape. The plate portion 27B has an opening 27BH having a rectangular inner peripheral shape. The tubular portion 27C has a hollow shape. The tubular portion 27C according to the present embodiment has a square tubular shape, and is provided so as to connect the plate portion 27A to the plate portion 27B. The opening 27AH of the plate portion 27A and the opening 27BH of the plate portion 27B communicate with each other via the inside of the tubular portion 27C.

The winding portion 22 is formed by laminating ferrites 22A, 22B, 22C having a plate shape, and is inserted inside the tubular portion 27C. The winding portion 22 according to the present embodiment is formed of the plurality of ferrites; instead, the winding portion 22 may be formed of a single ferrite. The coil 32 is wound around the tubular portion 27C.

In a state where the coil 32 is wound around the tubular portion 27C, the coil 32 is arranged around the winding portion 22. The coil 32 is formed so as to be displaced in the direction in which the winding axis A200 extends as a portion of the coil 32 shifts from one end toward the other end in the direction in which the winding axis A200 extends. A positional deviation of the coil 32 in the direction along the winding axis A200 is prevented by the plate portion 27A.

A positional deviation of the coil 32 in a direction opposite to the direction along the winding axis A200 is prevented by the plate portion 27B.

Referring back to FIG. 23, the center magnetic pole portion 25 of the core 20 includes a ferrite and a fixing member (not shown) that fixes the ferrite. The center magnetic pole portion 25 is provided between the support member 26 and the support member 27 in the direction in which the winding axis A200 extends. The ferrite of the center magnetic pole portion 25 is arranged between the winding portion 21 and the winding portion 22 in the direction in which the winding axis A200 extends. The ferrite used in the center magnetic pole portion 25 has a rectangular parallelepiped shape as a whole. The ferrite used in the center magnetic pole portion 25 may also be formed of a plurality of members or may be formed of a single member.

The outside magnetic pole portion 23 of the core 20 is provided on the side of the end portion of the winding portion 21 with respect to the center magnetic pole portion 25 of the shaft portion 28 in the direction in which the winding axis A200 extends. In other words, the outside magnetic pole portion 23 located at one end of the winding portion 21 in the winding axis direction A200, and the one end of the winding portion 21 being opposite to other end which faces the center magnetic pole portion 25. The outside magnetic pole portion 23 is formed in a plate shape, and includes a ferrite and a fixing member (not shown) that fixes the ferrite.

The outside magnetic pole portion 23 has a rectangular outer shape, and has a shape extending in a perpendicular direction B200. The perpendicular direction B200 here is a direction perpendicular to both the facing direction (Z direction in FIG. 1) that is the direction in which the coils 31, 32 face the coil 51 and the direction in which the winding axis A200 extends. The perpendicular direction B200 is not limited to just the perpendicular case, and may be a direction (intersecting direction) that intersects the facing direction (Z direction in FIG. 1) that is the direction in which the coils 31, 32 face the coil 51 and the direction in which the winding axis A200 extends. The ferrite used in the outside magnetic pole portion 23 may also be formed of a plurality of members or may be formed of a single member.

The outside magnetic pole portion 24 of the core 20 is provided on the side of the end portion of the winding portion 22 with respect to the center magnetic pole portion 25 of the shaft portion 28 in the direction in which the winding axis A200 extends. In other words, the outside magnetic pole portion 24 located at one end of the winding portion 22 in the winding axis direction A200, and the one end of the winding portion 22 being opposite to other end which faces the center magnetic pole portion 25. The outside magnetic pole portion 24 is formed in a plate shape, and includes a ferrite and a fixing member (not shown) that fixes the ferrite.

The outside magnetic pole portion 24 also has a rectangular outer shape, and has a shape extending in the perpendicular direction B200. The perpendicular direction B200 here is a direction perpendicular to both the facing direction (Z direction in FIG. 1) that is the direction in which the coils 31, 32 face the coil 51 and the direction in which the winding axis A200 extends. The ferrite used in the outside magnetic pole portion 24 may also be formed of a plurality of members or may be formed of a single member.

Figure 25:
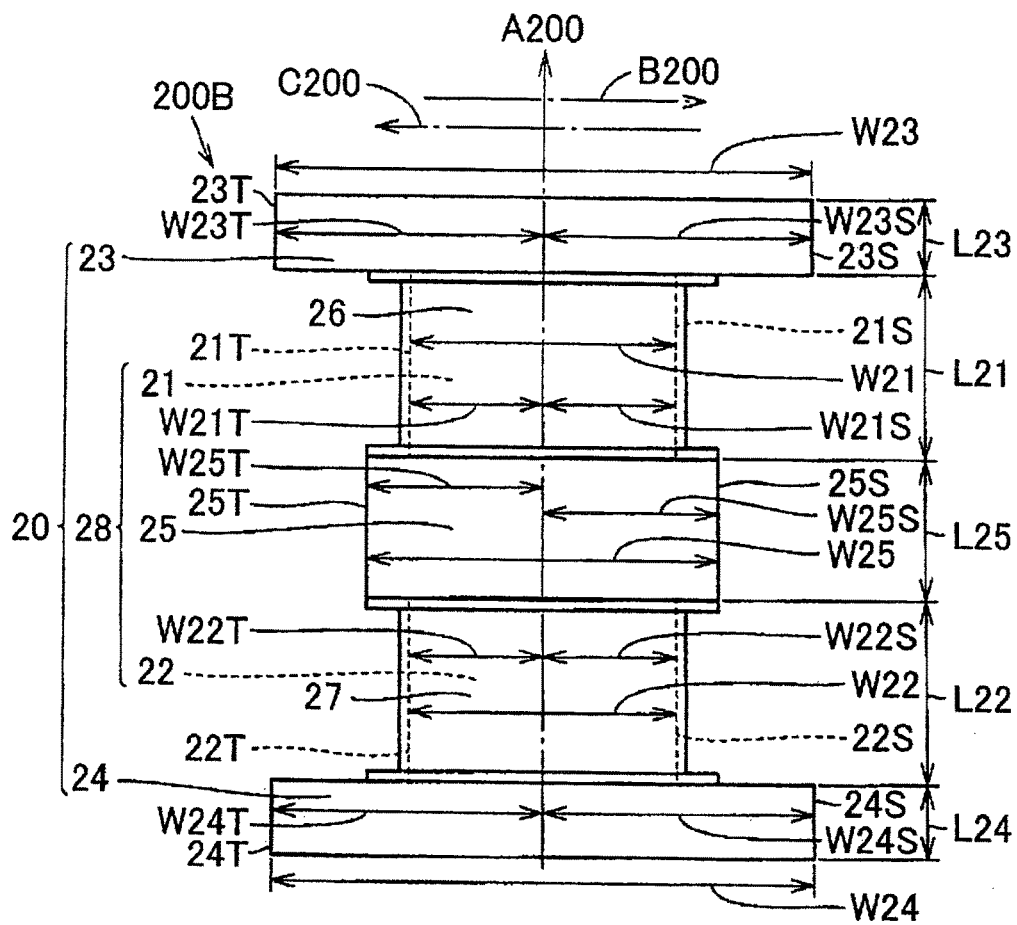
FIG. 25 is a plan view that shows a core used in the power receiving unit of the power receiving device according to the second embodiment.
Figure 26:
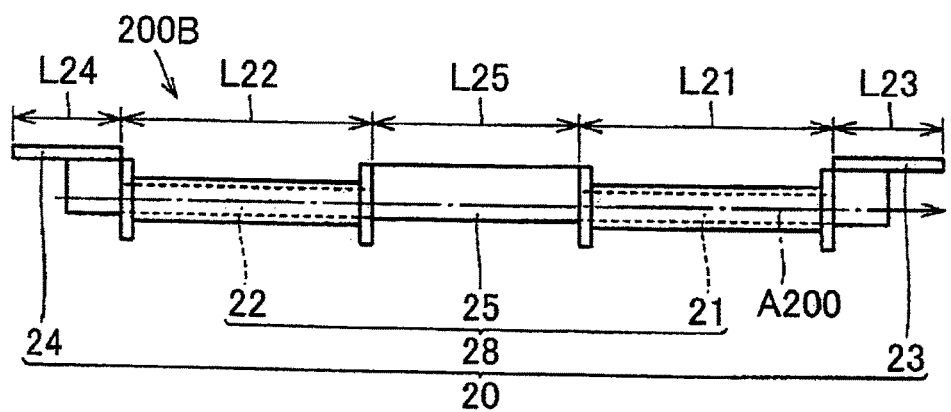
FIG. 26 is a side view that shows the core used in the power receiving unit of the power receiving device according to the second embodiment.
Figure 27:
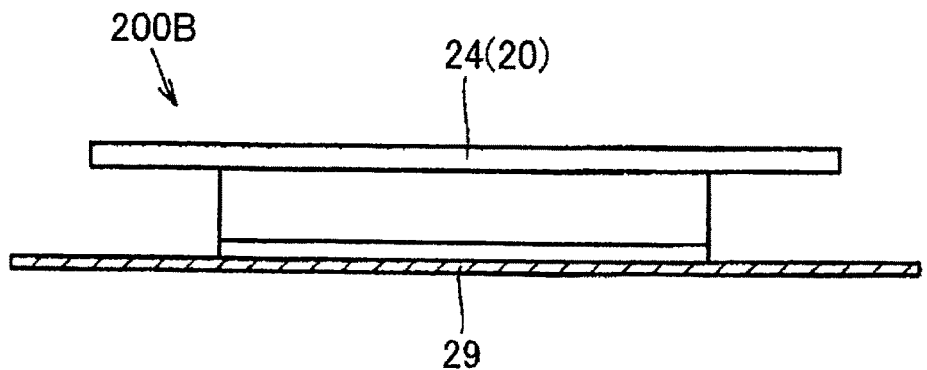
FIG. 27 is a front view that shows the core used in the power receiving unit of the power receiving device according to the second embodiment.

FIG. 25 is a plan view that shows the core 20. FIG. 26 is a side view that shows the core 20. FIG. 27 is a front view that shows the core 20. For the sake of convenience of description, FIG. 25 to FIG. 27 show a state where the coils 31, 32 (see FIG. 23) are not wound around the core 20. Although only shown in FIG. 27, a shield 29 is arranged on the upper side of the power receiving unit 200B. The upper side of the power receiving unit 2003 here includes a direction heading from the power transmitting unit 400B toward the power receiving unit 200B in the facing direction (Z direction in FIG. 1) that is the direction in which the power transmitting unit 400B and the power receiving unit 200B face each other. The thickness of the shield 29 in facing direction is, for example, 1 mm.

<Center Magnetic Pole Portion 25>

As mainly shown in FIG. 25, in the perpendicular direction B200 perpendicular to both the winding axis A200 and the facing direction (Z direction in FIG. 1), the center magnetic pole portion 25 has a length W25. The center magnetic pole portion 25 according to the present embodiment has an outer edge 25S at the front side in the direction in which the perpendicular direction B200 extends, and has an outer edge 25T at the front side in the direction in which a direction C200 opposite to the perpendicular direction B200.

The outer edges 25S, 25T according to the present embodiment each have a planar shape extending from the upper side toward the lower side (in a direction vertical to the sheet of FIG. 25). The upper side here includes a direction heading from the power transmitting unit 400B toward the power receiving unit 200B in the facing direction (Z direction in FIG. 1) that is the direction in which the power transmitting unit 400B and the power receiving unit 200 face each other. The lower side here includes a direction heading from the power receiving unit 200B toward the power transmitting unit 400B in the facing direction (Z direction in FIG. 1) that is the direction in which the power transmitting unit 400B and the power receiving unit 200B face each other.

When the power receiving unit 200B is viewed in the direction perpendicular to both the winding axis A200 and the perpendicular direction B200 (when the power receiving unit 200B is viewed in plan as shown in FIG. 25), the outer edges 25S, 25T according to the present embodiment are parallel to the winding axis A200. The length W25 according to the present embodiment is a size between the outer edge 25S and the outer edge 25T, and is the same value at any position in the direction in which the winding axis A200 extends. In other words, the center magnetic pole portion 25 according to the present embodiment has such a shape that the length W25 in the perpendicular direction B200 is the same value at any position in the direction in which the winding axis A200 extends.

In the present embodiment, the outer edge 25S of the center magnetic pole portion 25 corresponds to a portion of the center magnetic pole portion 25, farthest from the winding axis A200 in the direction in which the perpendicular direction B200 extends. A size W25S between the outer edge 25S and the winding axis A200 in the perpendicular direction B200 is the same value at any position in the direction in which the winding axis A200 extends.

In the present embodiment, the outer edge 25T of the center magnetic pole portion 25 corresponds to a portion of the center magnetic pole portion 25, farthest from the winding axis A200 in the direction in which the direction C200 opposite to the perpendicular direction B200 extends. A size W25T between the outer edge 25T and the winding axis A200 in the opposite direction C200 is the same value at any position in the direction in which the winding axis A200 extends.

In the present embodiment, the size W25S and the size W25T have the same value, and the length W25 is equal to the sum of the size W25S and the size W25T. When the outer edge 25S and the outer edge 25T are not parallel to each other, the length W25 of the center magnetic pole portion 25 may be, for example, calculated as the average of the length W25 per unit length of the center magnetic pole portion 25 at a selected position in the direction in which the winding axis A200 extends. As shown in FIG. 26, the center magnetic pole portion 25 in the present embodiment has a length L25 in the direction in which the winding axis A200 extends.

<Winding Portion 21>

As shown in FIG. 25, in the perpendicular direction B200 perpendicular to both the winding axis A200 and the facing direction (Z direction in FIG. 1), the winding portion 21 has a length W21. The winding portion 21 according to the present embodiment has an outer edge 21S at the front side in the direction in which the perpendicular direction B200 extends, and has an outer edge 21T at the front side in the direction in which the direction C200 opposite to the perpendicular direction B200 extends.

The outer edges 21S, 21T according to the present embodiment each have a planar shape extending from the upper side toward the lower side (in a direction vertical to the sheet of FIG. 25). The upper side here includes a direction heading from the power transmitting unit 400B toward the power receiving unit 200B in the facing direction (Z direction in FIG. 1) that is the direction in which the power transmitting unit 400B and the power receiving unit 200 face each other. The lower side here includes a direction heading from the power receiving unit 200B toward the power transmitting unit 400B in the facing direction (Z direction in FIG. 1) that is the direction in which the power transmitting unit 400B and the power receiving unit 200B face each other.

When the power receiving unit 200B is viewed in the direction perpendicular to both the winding axis A200 and the perpendicular direction B200 (when the power receiving unit 200B is viewed in plan as shown in FIG. 25), the outer edges 21S, 21T according to the present embodiment are parallel to the winding axis A200. The length W21 according to the present embodiment is a size between the outer edge 21S and the outer edge 21T, and is the same value at any position in the direction in which the winding axis A200 extends. In other words, the winding portion 21 according to the present embodiment has such a shape that the length W21 in the perpendicular direction B200 is the same value at any position in the direction in which the winding axis A200 extends.

In the present embodiment, the outer edge 21S of the winding portion 21 corresponds to a portion of the winding portion 21, farthest from the winding axis A200 in the direction in which the perpendicular direction B200 extends. A size W21S between the outer edge 21S and the winding axis A200 in the perpendicular direction B200 is the same value at any position in the direction in which the winding axis A200 extends.

In the present embodiment, the outer edge 21T of the winding portion 21 corresponds to a portion of the winding portion 21, farthest from the winding axis A200 in the direction in which the direction C200 opposite to the perpendicular direction B200 extends. A size W21T between the outer edge 21T and the winding axis A200 in the opposite direction C200 is the same value at any position in the direction in which the winding axis A200 extends.

In the present embodiment, the size W21S and the size W21T have the same value, and the length W21 is equal to the sum of the size W21S and the size W21T. When the outer edge 21S and the outer edge 21T are not parallel to each other, the length W21 of the winding portion 21 may be, for example, calculated as the average of the length W21 per unit length of the winding portion 21 at a selected position in the direction in which the winding axis A200 extends. As shown in FIG. 26, the winding portion 21 in the present embodiment has a length L21 in the direction in which the winding axis A200 extends.

<Winding Portion 22>

As shown in FIG. 25, in the perpendicular direction B200 perpendicular to both the winding axis A200 and the facing direction (Z direction in FIG. 1), the winding portion 22 has a length W22. The winding portion 22 according to the present embodiment has an outer edge 22S at the front side in the direction in which the perpendicular direction B200 extends, and has an outer edge 22T at the front side in the direction in which the direction C200 opposite to the perpendicular direction B200 extends.

The outer edges 22S, 22T according to the present embodiment each have a planar shape extending from the upper side toward the lower side (in a direction vertical to the sheet of FIG. 25). The upper side here includes a direction heading from the power transmitting unit 400B toward the power receiving unit 200B in the facing direction (Z direction in FIG. 1) that is the direction in which the power transmitting unit 400B and the power receiving unit 200 face each other. The lower side here includes a direction heading from the power receiving unit 200B toward the power transmitting unit 400B in the facing direction (Z direction in FIG. 1) that is the direction in which the power transmitting unit 400B and the power receiving unit 200B face each other.

When the power receiving unit 200B is viewed in the direction perpendicular to both the winding axis A200 and the perpendicular direction B200 (when the power receiving unit 200B is viewed in plan as shown in FIG. 25), the outer edges 22S, 22T according to the present embodiment are parallel to the winding axis A200. The length W22 according to the present embodiment is a size between the outer edge 22S and the outer edge 22T, and is the same value at any position in the direction in which the winding axis A200 extends. In other words, the winding portion 22 according to the present embodiment has such a shape that the length W22 in the perpendicular direction B200 is the same value at any position in the direction in which the winding axis A200 extends.

In the present embodiment, the outer edge 22S of the winding portion 22 corresponds to a portion of the winding portion 22, farthest from the winding axis A200 in the direction in which the perpendicular direction B200 extends. A size W22S between the outer edge 22S and the winding axis A200 in the perpendicular direction B200 is the same value at any position in the direction in which the winding axis A200 extends.

In the present embodiment, the outer edge 22T of the winding portion 22 corresponds to a portion of the winding portion 22, farthest from the winding axis A200 in the direction in which the direction C200 opposite to the perpendicular direction B200 extends. A size W22T between the outer edge 22T and the winding axis A200 in the opposite direction C200 is the same value at any position in the direction in which the winding axis A200 extends.

In the present embodiment, the size W22S and the size W22T have the same value, and the length W22 is equal to the sum of the size W22S and the size W22T. When the outer edge 22S and the outer edge 22T are not parallel to each other, the length W22 of the winding portion 22 may be, for example, calculated as the average of the length W22 per unit length of the winding portion 22 at a selected position in the direction in which the winding axis A200 extends. As shown in FIG. 26, the winding portion 22 in the present embodiment has a length L22 in the direction in which the winding axis A200 extends.

In the present embodiment, the length W21 of the winding portion 21 and the length W22 of the winding portion 22 have the same value. The size W21S of the winding portion 21, the size W21T of the winding portion 21, the size W22S of the winding portion 22 and the size W22T of the winding portion 22 all have the same value. The length L21 of the winding portion 21 and the length L22 of the winding portion 22 have the same value.

<Outside Magnetic Pole Portion 23>

As shown in FIG. 25, in the perpendicular direction B200 perpendicular to both the winding axis A200 and the facing direction (Z direction in FIG. 1), the outside magnetic pole portion 23 has a length W23. The outside magnetic pole portion 23 according to the present embodiment has an outer edge 23S at the front side in the direction in which the perpendicular direction B200 extends, and has an outer edge 23T at the front side in the direction in which the direction C200 opposite to the perpendicular direction B200 extends.

The outer edges 23S, 23T according to the present embodiment each have a planar shape extending from the upper side toward the lower side (in a direction vertical to the sheet of FIG. 25). The upper side here includes a direction heading from the power transmitting unit 400B toward the power receiving unit 200B in the facing direction (Z direction in FIG. 1) that is the direction in which the power transmitting unit 400B and the power receiving unit 200 face each other. The lower side here includes a direction heading from the power receiving unit 200B toward the power transmitting unit 400B in the facing direction (Z direction in FIG. 1) that is the direction in which the power transmitting unit 400B and the power receiving unit 200B face each other.

When the power receiving unit 200B is viewed in the direction perpendicular to both the winding axis A200 and the perpendicular direction B200 (when the power receiving unit 200B is viewed in plan as shown in FIG. 25), the outer edges 23S, 23T according to the present embodiment are parallel to the winding axis A200. The length W23 according to the present embodiment is a size between the outer edge 23S and the outer edge 23T, and is the same value at any position in the direction in which the winding axis A200 extends. In other words, the outside magnetic pole portion 23 according to the present embodiment has such a shape that the length W23 in the perpendicular direction B200 is the same value at any position in the direction in which the winding axis A200 extends.

In the present embodiment, the outer edge 23S of the outside magnetic pole portion 23 corresponds to a portion of the outside magnetic pole portion 23, farthest from the winding axis A200 in the direction in which the perpendicular direction B200 extends. A size W23S between the outer edge 23S and the winding axis A200 in the perpendicular direction B200 is the same value at any position in the direction in which the winding axis A200 extends.

In the present embodiment, the outer edge 23T of the outside magnetic pole portion 23 corresponds to a portion of the outside magnetic pole portion 23, farthest from the winding axis A200 in the direction in which the direction C200 opposite to the perpendicular direction B200 extends. A size W23T between the outer edge 23T and the winding axis A200 in the opposite direction C200 is the same value at any position in the direction in which the winding axis A200 extends.

In the present embodiment, the size W23S and the size W23T have the same value, and the length W23 is equal to the sum of the size W23S and the size W23T. When the outer edge 23S and the outer edge 23T are not parallel to each other, the length W23 of the outside magnetic pole portion 23 may be, for example, calculated as the average of the length W23 per unit length of the outside magnetic pole portion 23 at a selected position in the direction in which the winding axis A200 extends. As shown in FIG. 26, the outside magnetic pole portion 23 in the present embodiment has a length L23 in the direction in which the winding axis A200 extends.

<Outside Magnetic Pole Portion 24>

As shown in FIG. 25, in the perpendicular direction B200 perpendicular to both the winding axis A200 and the facing direction (Z direction in FIG. 1), the outside magnetic pole portion 24 has a length W24. The outside magnetic pole portion 24 according to the present embodiment has an outer edge 24S at the front side in the direction in which the perpendicular direction B200 extends, and has an outer edge 24T at the front side in the direction in which the direction C200 opposite to the perpendicular direction B200 extends.

The outer edges 24S, 24T according to the present embodiment each have a planar shape extending from the upper side toward the lower side (in a direction vertical to the sheet of FIG. 25). The upper side here includes a direction heading from the power transmitting unit 400B toward the power receiving unit 200B in the facing direction (Z direction in FIG. 1) that is the direction in which the power transmitting unit 400B and the power receiving unit 200 face each other. The lower side here includes a direction heading from the power receiving unit 200B toward the power transmitting unit 400B in the facing direction (Z direction in FIG. 1) that is the direction in which the power transmitting unit 400B and the power receiving unit 200B face each other.

When the power receiving unit 200B is viewed in the direction perpendicular to both the winding axis A200 and the perpendicular direction B200 (when the power receiving unit 200B is viewed in plan as shown in FIG. 25), the outer edges 24S, 24T according to the present embodiment are parallel to the winding axis A200. The length W24 according to the present embodiment is a size between the outer edge 24S and the outer edge 24T, and is the same value at any position in the direction in which the winding axis A200 extends. In other words, the outside magnetic pole portion 24 according to the present embodiment has such a shape that the length W24 in the perpendicular direction B200 is the same value at any position in the direction in which the winding axis A200 extends.

In the present embodiment, the outer edge 24S of the outside magnetic pole portion 24 corresponds to a portion of the outside magnetic pole portion 24, farthest from the winding axis A200 in the direction in which the perpendicular direction B200 extends. A size W25S between the outer edge 24S and the winding axis A200 in the perpendicular direction B200 is the same value at any position in the direction in which the winding axis A200 extends.

In the present embodiment, the outer edge 24T of the outside magnetic pole portion 24 corresponds to a portion of the outside magnetic pole portion 24, farthest from the winding axis A200 in the direction in which the direction C200 opposite to the perpendicular direction B200 extends. A size W24T between the outer edge 24T and the winding axis A200 in the opposite direction C200 is the same value at any position in the direction in which the winding axis A200 extends.

In the present embodiment, the size W24S and the size W24T have the same value, and the length W24 is equal to the sum of the size W24S and the size W24T. When the outer edge 24S and the outer edge 24T are not parallel to each other, the length W24 of the outside magnetic pole portion 24 may be, for example, calculated as the average of the length W24 per unit length of the outside magnetic pole portion 24 at a selected position in the direction in which the winding axis A200 extends. As shown in FIG. 26, the outside magnetic pole portion 24 in the present embodiment has a length L24 in the direction in which the winding axis A200 extends.

In the present embodiment, the length W23 of the outside magnetic pole portion 23 and the length W24 of the outside magnetic pole portion 24 have the same value. The size W23S of the outside magnetic pole portion 23, the size W23T of the outside magnetic pole portion 23, the size W24S of the outside magnetic pole portion 24 and the size W24T of the outside magnetic pole portion 24 all have the same value. The length L23 of the outside magnetic pole portion 23 and the length L24 of the outside magnetic pole portion 24 also have the same value.

As shown in FIG. 25, the length W25 of the center magnetic pole portion 25 in the perpendicular direction B200 is larger than the length W21 of the winding portion 21 in the perpendicular direction B200, and is larger than the length W22 of the winding portion 22 in the perpendicular direction B200. Suitably, the length W25 of the center magnetic pole portion 25 in the perpendicular direction B200 should be smaller than the length W23 of the outside magnetic pole portion 23 in the perpendicular direction B200, and should be smaller than the length W24 of the outside magnetic pole portion 24 in the perpendicular direction B200.

<Size Relationship> (W25<W23, W25<W24, W25>W21, W25>W22)

In the present embodiment, the size W25S between the portion (outer edge 25S) of the center magnetic pole portion 25, farthest from the winding axis A200 in the perpendicular direction B200, and the winding axis A200 is smaller than the size W23S between the portion (outer edge 23S) of the outside magnetic pole portion 23, farthest from the winding axis A200 in the perpendicular direction B200, and the winding axis A200, and is smaller than the size W24S between the portion (outer edge 24S) of the outside magnetic pole portion 24, farthest from the winding axis A200 in the perpendicular direction B200, and the winding axis A200.

<Size Relationship> (W25S<W23S, W25S<W24S)

In the present embodiment, the size W25S between the portion (outer edge 25S) of the center magnetic pole portion 25, farthest from the winding axis A200 in the perpendicular direction B200, and the winding axis A200 is larger than the size W21S between the portion (outer edge 21S) of the winding portion 21, farthest from the winding axis A200 in the perpendicular direction B200, and the winding axis A200, and is larger than the size W22S between the portion (outer edge 22S) of the winding portion 22, farthest from the winding axis A200 in the perpendicular direction B200, and the winding axis A200.

<Size Relationship> (W25S>W21S, W25S>W22S)

In the present embodiment, the size W25T between the portion (outer edge 25T) of the center magnetic pole portion 25, farthest from the winding axis A200 in the direction C200 opposite to the perpendicular direction B200, and the winding axis A200 is smaller than the size W23T between the portion (outer edge 23T) of the outside magnetic pole portion 23, farthest from the winding axis A200 in the direction C200 opposite to the perpendicular direction B200, and the winding axis A200, and is smaller than the size W24T between the portion (outer edge 24T) of the outside magnetic pole portion 24, farthest from the winding axis A200 in the direction C200 opposite to the perpendicular direction B200, and the winding axis A200.

<Size Relationship> (W25T<W23T, W25T<W24T)

In the present embodiment, the size W25T between the portion (outer edge 25T) of the center magnetic pole portion 25, farthest from the winding axis A200 in the direction C200 opposite to the perpendicular direction B200, and the winding axis A200 is larger than the size W21T between the portion (outer edge 21T) of the winding portion 21, farthest from the winding axis A200 in the direction C400 opposite to the perpendicular direction B200, and the winding axis A200, and is larger than the size W22T between the portion (outer edge 22T) of the winding portion 22, farthest from the winding axis A200 in the direction C200 opposite to the perpendicular direction B200, and the winding axis A200.

<Size Relationship> (W25T>W21T, W25T>W22T)

Suitably, as shown in FIG. 25, the portion (outer edge 25S) of the center magnetic pole portion 25, farthest from the winding axis A200 in the perpendicular direction B200, should be located closer to the winding axis A200 in the perpendicular direction B200 than the portion (outer edge 23S) of the outside magnetic pole portion 23, farthest from the winding axis A200 in the perpendicular direction B200. Similarly, the portion (outer edge 25S) of the center magnetic pole portion 25, farthest from the winding axis A200 in the perpendicular direction B200, should be located closer to the winding axis A200 in the perpendicular direction B200 than the portion (outer edge 24S) of the outside magnetic pole portion 24, farthest from the winding axis A200 in the perpendicular direction B200.

Suitably, as shown in FIG. 25, the portion (outer edge 25T) of the center magnetic pole portion 25, farthest from the winding axis A200 in the direction C200 opposite to the perpendicular direction B200, should be located closer to the winding axis A200 in the direction C200 opposite to the perpendicular direction B200 than the portion (outer edge 23T) of the outside magnetic pole portion 23, farthest from the winding axis A200 in the direction C200 opposite to the perpendicular direction B200. Similarly, the portion (outer edge 25T) of the center magnetic pole portion 25, farthest from the winding axis A200 in the direction C200 opposite to the perpendicular direction B200, should be located closer to the winding axis A200 in the direction C200 opposite to the perpendicular direction B200 than the portion (outer edge 24T) of the outside magnetic pole portion 24, farthest from the winding axis A200 in the direction C200 opposite to the perpendicular direction B200.

Figure 28:
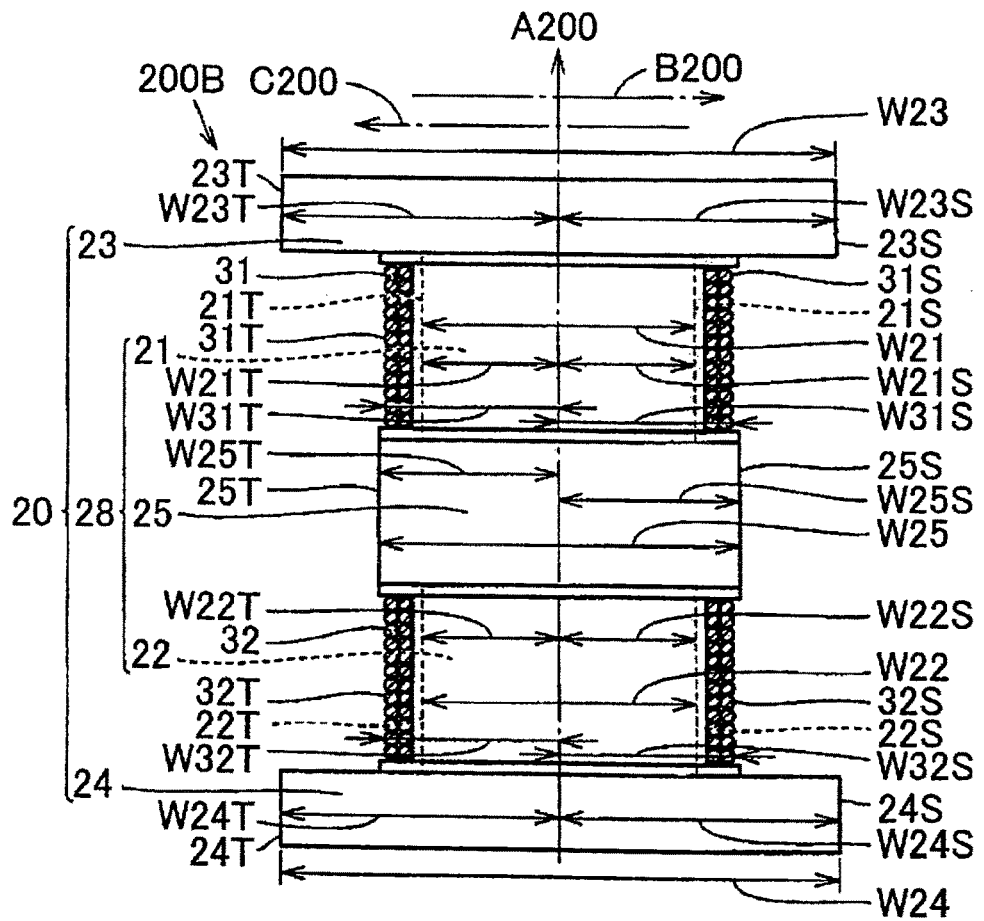
FIG. 28 is a plan view that shows a state where coils are arranged around the core used in the power receiving unit of the power receiving device according to the second embodiment.

FIG. 28 is a plan view that shows a state where the coil 31 is arranged around the winding portion 21 of the core 20 and the coil 32 is arranged around the winding portion 22 of the core 20. In the present embodiment, an external common tangent of the coil 31 at the front side (right side in the sheet of FIG. 28) in the perpendicular direction B200 extends in a straight line parallel to the winding axis A200. In other words, a straight line that connects the portions (portions 31S) of the coil 31, farthest from the winding axis A200 in the perpendicular direction B200, extends in a straight line parallel to the winding axis A200. The straight line corresponds to the external common tangent of the coil 31 at the front side (right side in the sheet of FIG. 28) in the perpendicular direction B200.

An external common tangent of the coil 31 at the front side (left side in the sheet of FIG. 28) in the direction C200 opposite to the perpendicular direction B200 extends in a straight line parallel to the winding axis A200. In other words, a straight line that connects the portions (portions 31T) of the coil 31, farthest from the winding axis A200 in the direction C200 opposite to the perpendicular direction B200, extends in a straight line parallel to the winding axis A200. The straight line corresponds to the external common tangent of the coil 31 at the front side (left side in the sheet of FIG. 28) in the direction C200 opposite to the perpendicular direction B200.

An external common tangent of the coil 32 at the front side (right side in the sheet of FIG. 28) in the perpendicular direction B200 also extends in a straight line parallel to the winding axis A200. In other words, a straight line that connects the portions (portions 32S) of the coil 32, farthest from the winding axis A200 in the perpendicular direction B200, extends in a straight line parallel to the winding axis A200. The straight line corresponds to the external common tangent of the coil 32 at the front side (right side in the sheet of FIG. 28) in the perpendicular direction B200.

An external common tangent of the coil 32 at the front side (left side in the sheet of FIG. 28) in the direction C200 opposite to the perpendicular direction B200 extends in a straight line parallel to the winding axis A200. In other words, a straight line that connects the portions (portions 32T) of the coil 32, farthest from the winding axis A200 in the direction C200 opposite to the perpendicular, direction B200, extends in a straight line parallel to the winding axis A200. The straight line corresponds to the external common tangent of the coil 32 at the front side (left side in the sheet of FIG. 28) in the direction C200 opposite to the perpendicular direction B200.

As shown in FIG. 28, more suitably, the size W25S between the portion (outer edge 25S) of the center magnetic pole portion 25, farthest from the winding axis A200 in the perpendicular direction B200, and the winding axis A200 should be larger than the size W31S between the portions (portions 31S) of the coil 31, farthest from the winding axis A200 in the perpendicular direction B200, and the winding axis A200. Similarly, the size W25S between the portion (outer edge 25S) of the center magnetic pole portion 25, farthest from the winding axis A200 in the perpendicular direction B200, and the winding axis A200 should be larger than the size W32S between the portions (portions 32S) of the coil 32, farthest from the winding axis A200 in the perpendicular direction B200, and the winding axis A200.
<Size Relationship> (W25S>W31S, W25S>W32S)

More suitably, the size W25T between the portion (outer edge 25T) of the center magnetic pole portion 25, farthest from the winding axis A200 in the direction C200 opposite to the perpendicular direction B200, and the winding axis A200 should be larger than the size W31T between the portions (portions 31T) of the coil 31, farthest from the winding axis A200 in the direction C200 opposite to the perpendicular direction B200, and the winding axis A200. Similarly, the size W25T between the portion (outer edge 25T) of the center magnetic pole portion 25, farthest from the winding axis A200 in the direction C200 opposite to the perpendicular direction B200, and the winding axis A200 should be larger than the size W32T between the portions (portions 32T) of the coil 32, farthest from the winding axis A200 in the direction C200 opposite to the perpendicular direction B200, and the winding axis A200.

<Size Relationship> (W25T>W31T, W25T>W32T)

Referring back to FIG. 25 and FIG. 26, more suitably, the length L25 of the center magnetic pole portion 25 should be larger than the length L23 of the outside magnetic pole portion 23. The length L25 of the center magnetic pole portion 25 should be larger than the length L24 of the outside magnetic pole portion 24. When a circular coil is used in the power transmitting device, the center magnetic pole portion 25 faces the center portion of the core having a circular shape in the power transmitting device. Because the length L25 of the center magnetic pole portion 25 is larger than the length L23 or the length L24, it is possible to obtain a high coupling coefficient.

<Size Relationship> (L25>L23, L25>L24)

<Transfer of Electric Power from Circular Coil>

Figure 30:
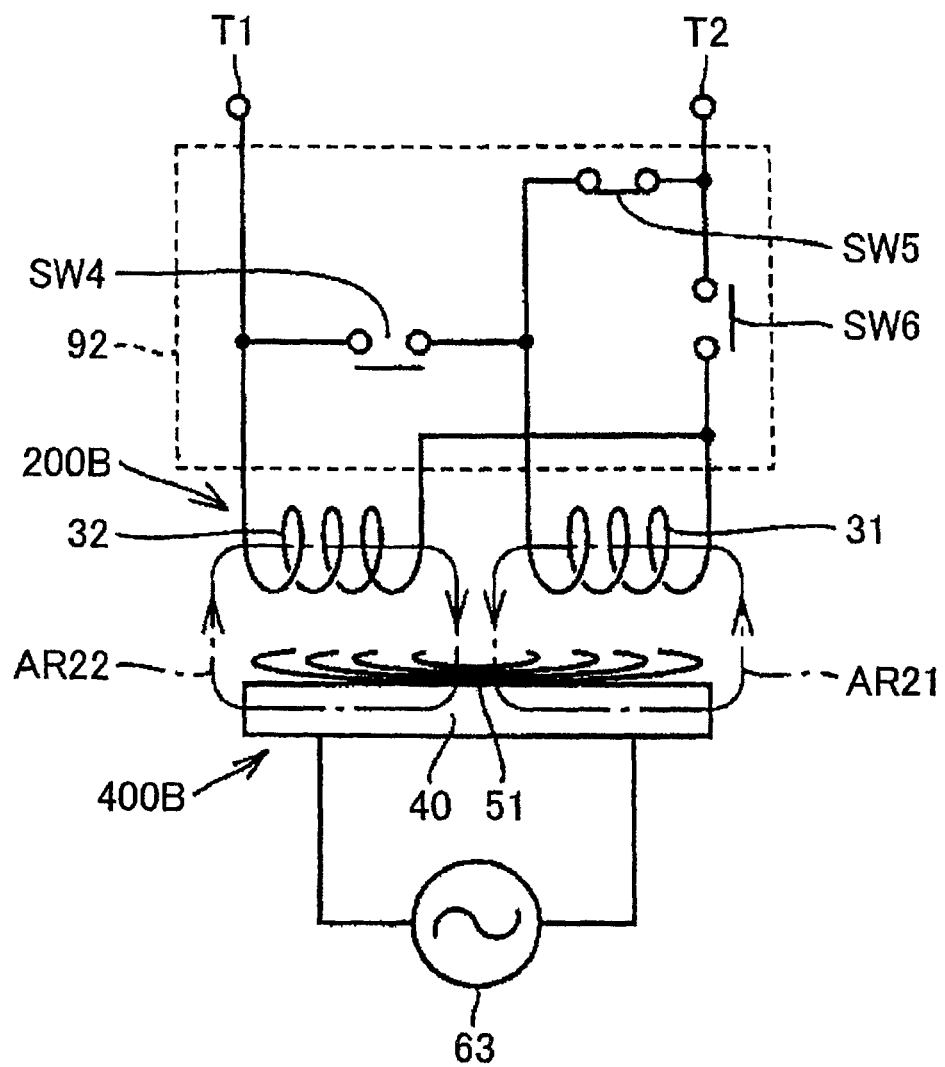
FIG. 30 is a circuit diagram that schematically shows a state where electric power is transferred with the use of the power transfer system according to the second embodiment.

FIG. 29 is a perspective view that schematically shows a state where electric power is transferred between the power receiving unit 200B and the power transmitting unit 400B. FIG. 30 is a circuit diagram that schematically shows a state where electric power is transferred between the power receiving unit 200B and the power transmitting unit 400B. As shown in FIG. 29 and FIG. 30, when electric power is transferred between the power receiving unit 200B and the power transmitting unit 400B, the power receiving unit 200B and the power transmitting unit 400B are arranged so as to face each other with an air gap therebetween.

The switching device 92 (see FIG. 22) receives information, including whether the type of the coil unit of the power transmitting unit is a circular coil or a solenoid coil, via the communication unit 230 (see FIG. 21) and the communication unit 160 (see FIG. 21). The switching device 92 is driven by the switching signal, and sets the switches SW4, SW6 in the off state and sets the switch SW5 in the on state. The coil 31 and the coil 32 are connected in series with each other.

Alternating current having a predetermined frequency is supplied from the alternating-current power supply 63 to the coil 51. When the predetermined alternating current is supplied to the coil 51, electromagnetic fields (arrows AR21, AR22) that oscillate at the predetermined frequency are formed around the coil 51.

A magnetic flux indicated by the arrow AR21 in FIG. 29 flows from the center of the core 40 toward the power receiving unit 200B side, and passes through the center magnetic pole portion 25, winding portion 21 and outside magnetic pole portion 23 of the core 20. Inside the coil 31, a magnetic flux flowing from the center magnetic pole portion 25 side toward the outside magnetic pole portion 23 side is generated.

A magnetic flux indicated by the arrow AR22 in FIG. 29 flows from the center of the core 40 toward the power receiving unit 200B side, and passes through the center magnetic pole portion 25, the winding portion 22 and the outside magnetic pole portion 24. Inside the coil 32, a magnetic flux flowing from the center magnetic pole portion 25 side toward the outside magnetic pole portion 24 side is generated. Inside the coil 31 and inside the coil 32, magnetic fluxes flowing in the opposite directions along the winding axes of the coils 31, 32 are respectively generated. Because alternating current flows through the power transmitting unit 400B, when the direction of current flowing through each coil is inverted, the direction of the corresponding magnetic flux is also inverted. After the inversion as well, magnetic fluxes flowing in the opposite directions along the winding axes of the coils 31, 32 are respectively generated inside the coil 31 and inside the coil 32.

The coils 31, 32 of the power receiving unit 200B receive electric power through the electromagnetic fields (arrows AR21, AR22) generated around the coil 51. As described above, the core 40 and coil 51 of the power transmitting unit 400B constitute the circular coil. Magnetic fluxes generated around the core 40 each have a so-called doughnut shape, and pass through the center portion of the core 40 having a circular shape in the facing direction (arrow Z direction in FIG. 1). The center portion here is near the center of the outer shape circle of the core 40 and is a hollow portion inside of the coil 51 where no coil 51 is present.

When electric power is transferred, the magnetic fluxes formed in the electromagnetic fields also pass through portions of the center magnetic pole portion 25, close to the outer edges 25S, 25T. For example, it is assumed that the power receiving unit 200B is arranged so as to deviate in the perpendicular direction B200 with respect to the position of the power transmitting unit 400B. In this case as well, the magnetic fluxes are able to pass through the portion of the center magnetic pole portion 25, close to the outer edge 25S, so it is possible to suppress a decrease in power transfer efficiency.

On the other hand, it is assumed that the power receiving unit 200B is arranged so as to deviate in the direction C200 opposite to the perpendicular direction B200 with respect to the position of the power transmitting unit 400B. In this case as well, the magnetic fluxes are able to pass through the portion of the center magnetic pole portion 25, close to the outer edge 25T, so it is possible to suppress a decrease in power transfer efficiency. With the electromotive vehicle 10B including the power receiving device 11B according to the present embodiment, even when the external power supply device-side power transmitting device 60B includes the circular coil, it is possible to appropriately supply electric power from the external power supply device.

<Transfer of Electric Power from Solenoid Coil>

Figure 31:
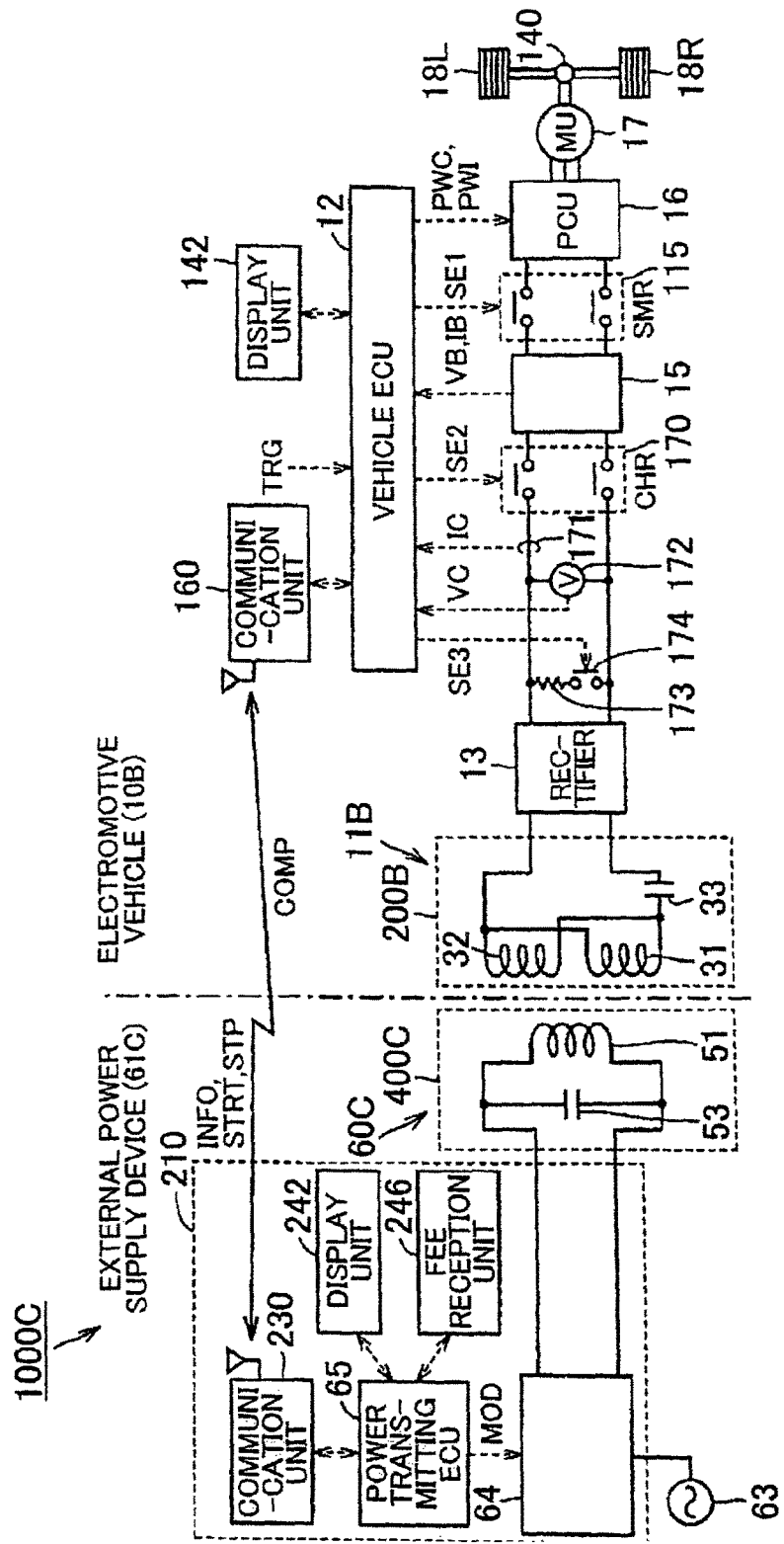
FIG. 31 is a circuit diagram that shows a state at the time when the power receiving device according to the second embodiment is supplied with electric power from an external power supply device including a solenoid coil as a power transmitting device.
Figure 32:
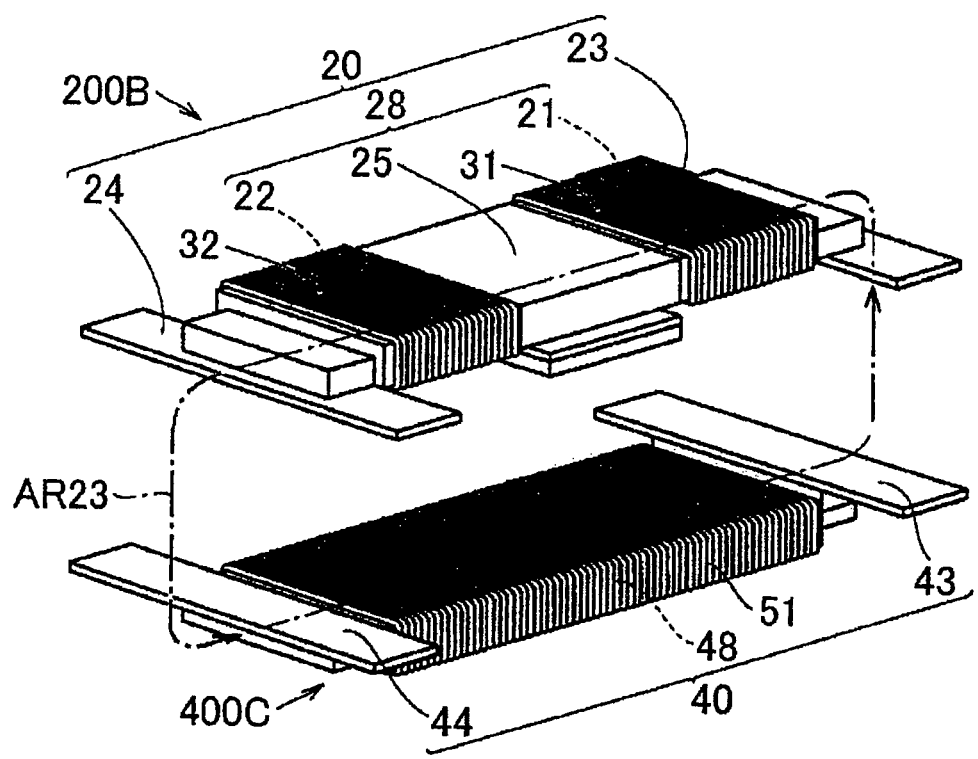
FIG. 32 is a perspective view that shows a state at the time when the power receiving device according to the second embodiment is supplied with electric power from the external power supply device including the solenoid coil as the power transmitting device.
Figure 33:
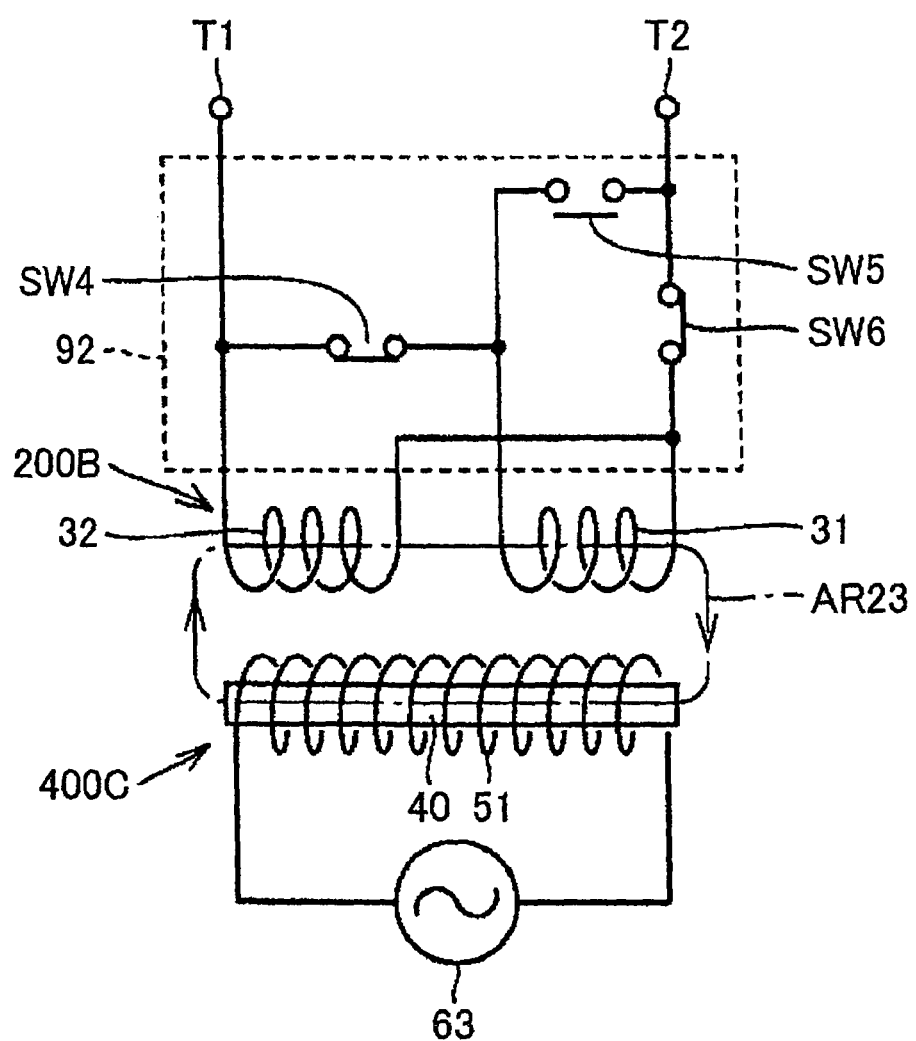
FIG. 33 is a circuit diagram that shows a state at the time when the power receiving device according to the second embodiment is supplied with electric power from the external power supply device including the solenoid coil as the power transmitting device.

FIG. 31 to FIG. 33 are views that show a state at the time when an external power supply device 61C including a solenoid coil-type power transmitting coil as a power transmitting device 60C supplies electric power to the electromotive vehicle 10B including the power receiving device 11B according to the present embodiment. As shown in FIG. 31, the power transmitting device 60C of the external power supply device 61C differs from the power transmitting device 60B described with reference to FIG. 21 in that a power transmitting unit 400C is provided.

FIG. 32 is a perspective view that schematically shows a state where electric power is transferred between the power receiving unit 200B and the power transmitting unit 400C. The power transmitting unit 400C includes the ferrite core 40, the coil 51 (primary coil) and a capacitor (not shown) (capacitor 53 in FIG. 31). The coil 51 of the power transmitting unit 400C is a solenoid coil having a square tubular shape as a whole.

The core 40 includes the shaft portion 48 and the outside magnetic pole portions 43, 44. The core 40 has an H shape as a whole. The shaft portion 48 of the core 40 is formed in a plate shape, and has a shape extending in a direction in which the winding axis of the coil 51 extends. The winding axis of the coil 51 has a shape extending in a straight line. The coil 51 is formed so as to surround the winding axis.

The outside magnetic pole portion 43 is provided on one end portion of the shaft portion 48 in the direction in which the winding axis of the coil 51 extends. The outside magnetic pole portion 43 has a rectangular outer shape, and is formed in a plate shape. The outside magnetic pole portion 43 has a shape extending in a direction perpendicular to the direction in which the winding axis of the coil 51 extends. The outside magnetic pole portion 44 is provided on the other end portion of the shaft portion 48 in the direction in which the winding axis of the coil 51 extends. The outside magnetic pole portion 44 has a rectangular outer shape, and is formed in a plate shape. The outside magnetic pole portion 44 also has a shape extending in the direction perpendicular to the direction in which the winding axis of the coil 51 extends.

FIG. 33 is a circuit diagram that schematically shows a state where electric power is transferred between the power receiving unit 200B and the power transmitting unit 400C. As shown in FIG. 32 and FIG. 33, when electric power is transferred between the power receiving unit 200B and the power transmitting unit 400C, the power receiving unit 200B and the power transmitting unit 400C are arranged so as to face each other with an air gap therebetween.

The switching device 92 (see FIG. 22) receives information, including whether the type of the coil unit of the power transmitting unit is a circular coil or a solenoid coil, via the communication unit 230 (see FIG. 21) and the communication unit 160 (see FIG. 21). The switching device 92 (see FIG. 22) is driven by the switching signal, and sets the switches SW4, SW6 in the on state and sets the switch SW5 in the off state. The coil 31 and the coil 32 are connected in parallel with each other.

Alternating current having a predetermined frequency is supplied from the alternating-current power supply 63 to the coil 51. When the predetermined alternating current is supplied to the coil 51, an electromagnetic field (arrow AR23) that oscillates at the predetermined frequency is formed around the coil 51.

A magnetic flux indicated by the arrow AR23 in FIG. 32 flows through the outside magnetic pole portion 44, shaft portion 48 and outside magnetic pole portion 43 of the core 40, and passes through the outside magnetic pole portion 23, winding portion 21, center magnetic pole portion 25, winding portion 22 and outside magnetic pole portion 24 of the core 20. Inside the coil 31, a magnetic flux flowing from the outside magnetic pole portion 23 side toward the center magnetic pole portion 25 side is generated. Inside the coil 32, a magnetic flux flowing from the center magnetic pole portion 25 side toward the outside magnetic pole portion 24 side is generated. Inside the coil 31 and inside the coil 32, magnetic fluxes flowing in the same direction along the winding axes of the coils 31, 32 are respectively generated. Because alternating current flows through the power transmitting unit 400C, when the direction of current flowing through each coil is inverted, the direction of the corresponding magnetic flux is also inverted. After the inversion as well, magnetic fluxes flowing in the same direction along the winding axes of the coils 31, 32 are respectively generated inside the coil 31 and inside the coil 32.

The coils 31, 32 of the power receiving unit 200B receive electric power through the electromagnetic field (arrow AR23) generated around the coil 51. As described above, the core 40 and coil 51 of the power transmitting unit 400C constitute the solenoid coil. A magnetic flux generated around the core 40 has a single annular shape, and passes through the center portion of the core 40 having a plate shape in the longitudinal direction of the core 40. With the electromotive vehicle 10B including the power receiving device 11B according to the present embodiment, even when the external power supply device-side power transmitting device 60C includes the solenoid coil, it is possible to appropriately supply electric power from the external power supply device.

<Relationship Between Connection Mode of Coils 31, 32 and Number of Turns of Each of Coils 31, 32>

As in the case described above with reference to FIG. 17 to FIG. 20, the number of turns of each of the coils 31, 32 is denoted by N, and the current supplied from the alternating-current power supply 63 (inverter) is denoted by I. Because the number of turns of each of the coils 31, 32 is the same, the self-inductance of each of the coils 31, 32 is equal to each other. In the case of series connection shown in FIG. 30, a current of I flows through the coils 31, 32. Where the current is I and the number of flux linkages of the main magnetic flux $\Phi$ is $\lambda$ at the time when electric power is supplied to the circular coil, $\lambda=N\Phi$. The magnetic flux at the time when electric power is supplied to the circular coil is half the main magnetic flux at the time when electric power is supplied to the solenoid coil. In the case of parallel connection shown in FIG. 33, a current of I/2 flows through each of coils 31, 32. Where the current is I and the number of flux linkages of the main magnetic flux $\Phi$ is $\lambda$, $\lambda=N\Phi$. The number of turns is 2N in the case of series connection, the number of turns is N in the case of parallel connection, so the parallel number of winding wires (Litz wires) becomes twice.

In the power transfer system 1000B and the power receiving device 11B according to the present embodiment, when the power transmitting device 60B (the power transmitting unit 400B shown in FIG. 29) including the circular coil supplies electric power to the power receiving device 11B, the configuration shown in FIG. 30 is employed. Specifically, when the power transmitting coil is the circular coil, the switching device 92 connects the coil 31 and the coil 32 in series with each other such that magnetic fluxes flowing in the opposite directions along the winding axes of the coil 31 and the coil 32 are respectively generated inside the coil 31 and inside the coil 32.

On the other hand, when the power transmitting device 60C (the power transmitting unit 400C shown in FIG. 32) including the solenoid coil supplies electric power to the power receiving device 11B, the configuration shown in FIG. 33 is employed. Specifically, when the power transmitting coil is the solenoid coil, the switching device 92 connects the coil 31 and the coil 32 in parallel with each other such that magnetic fluxes flowing in the same direction along the winding axes of the coil 31 and the coil 32 are respectively generated inside the coil 31 and inside the coil 32.

In the power transfer system 1000B and the power receiving device 11B according to the present embodiment, the number of flux linkages of the power receiving unit 200B as a whole is substantially the same value ($\lambda=N\Phi$ as described above) not only when electric power is supplied from the power transmitting device 60B (the power transmitting unit 400B shown in FIG. 29) including the circular coil but also when electric power is supplied from the power transmitting device 60C (the power transmitting unit 400C shown in FIG. 32) including the solenoid coil. When electric power is transmitted to the coils 31, 32 electrically connected to each other and arranged at an interval with the use of the coil 51, it is possible to change the connection mode of the coils 31, 32 on the basis of the type of the coil 51. With this configuration, even when the primary side is the solenoid coil or the circular coil, it is possible to suppress fluctuations in the capacity of the secondary-side inverter, or the like.

The embodiments based on the invention are described above; however, the embodiments described above are illustrative and not restrictive in all respects. The scope of the invention is defined by the appended claims. The scope of the invention is intended to encompass all modifications within the scope of the appended claims and equivalents thereof.

The invention is applicable to the power receiving device, the power transmitting device and the power transfer system.

The invention claimed is:

1. A power transmitting device comprising:
   a power transmitting coil configured to contactlessly transmit electric power to a power receiving coil in a state where the power transmitting coil faces the power receiving coil, the power transmitting coil including a first power transmitting coil and a second power transmitting coil, the first power transmitting coil being provided so as to surround a winding axis extending in a winding axis direction that intersects with a facing direction in which the power transmitting coil faces the power receiving coil, the second power transmitting coil being electrically connected to the first power transmitting coil and arranged next to the first power transmitting coil in the winding axis direction with a gap from the first power transmitting coil; and
   a switching device configured to, when the power receiving coil is a solenoid coil, connect the first power transmitting coil and the second power transmitting coil in parallel with each other such that first magnetic flux generated inside the first power transmitting coil and second magnetic flux generated inside the second power transmitting coil flow in the same direction along the winding axis, and the switching device configured to, when the power receiving coil is a circular coil, connect the first power transmitting coil and the second power transmitting coil in series with each other such that the first magnetic flux and the second magnetic flux flow in opposite directions along the winding axis.

2. The power transmitting device according to claim 1, further comprising:
   a core around which the power transmitting coil is wound, the core including:
   a first shaft portion around which the first power transmitting coil is wound;
   a second shaft portion around which the second power transmitting coil is wound;
   an intermediate portion provided between the first shaft portion and the second shaft portion; and
   an outside magnetic pole portion provided so as to extend in an intersecting direction that intersects with both the facing direction and the winding axis direction, the outside magnetic pole portion located at one end of the first shaft portion in the winding axis direction, the one end of the first shaft portion being opposite to the other end which faces the intermediate portion, a length of the intermediate portion being smaller in the intersecting direction than a length of the outside magnetic pole portion in the intersecting direction.

3. The power transmitting device according to claim 2, wherein
   a length of the intermediate portion is larger in the winding axis direction than a length of the outside magnetic pole portion.

4. The power transmitting device according to claim 2, wherein
   a length of the intermediate portion is larger in the intersecting direction than a length of the first shaft portion and a length of the second shaft portion.

5. The power transmitting device according to claim 1, wherein
the winding axis direction is a direction perpendicular to the facing direction.

6. A power receiving device characterized by comprising:
a power receiving coil configured to contactlessly receive electric power from a power transmitting coil in a state where the power receiving coil faces the power transmitting coil, the power receiving coil including a first power receiving coil and a second power receiving coil, the first power receiving coil being provided so as to surround a winding axis extending in a winding axis direction that intersects with a facing direction in which the power receiving coil faces the power transmitting coil, the second power receiving coil being electrically connected to the first power receiving coil and arranged next to the first power receiving coil in the winding axis direction with a gap from the first power receiving coil; and
a switching device configured to, when the power transmitting coil is a solenoid coil, connect the first power receiving coil and the second power receiving coil in parallel with each other such that first magnetic flux generated inside the first power receiving coil and second magnetic flux generated inside the second power receiving coil flow in the same direction along the winding axis, and the switching device configured to, when the power transmitting coil is a circular coil, connect the first power receiving coil and the second power receiving coil in series with each other such that the first magnetic flux and the second magnetic flux flow in opposite directions along the winding axis.

7. The power receiving device according to claim 6, further comprising:
a core around which the power receiving coil is wound, the core including:
a first shaft portion around which the first power receiving coil is wound;
a second shaft portion around which the second power receiving coil is wound;
an intermediate portion provided between the first shaft portion and the second shaft portion; and
an outside magnetic pole portion provided so as to extend in an intersecting direction that intersects with both the facing direction and the winding axis direction, the outside magnetic pole portion located at one end of the first shaft portion in the winding axis direction, the one end of the first shaft portion being opposite to other end which faces the intermediate portion, a length of the intermediate portion being smaller in the intersecting direction than a length of the outside magnetic pole portion in the intersecting direction.

8. The power receiving device according to claim 7, wherein
a length of the intermediate portion is larger in the winding axis direction than a length of the outside magnetic pole portion.

9. The power receiving device according to claim 7, wherein
a length of the intermediate portion is larger in the intersecting direction than a length of the first shaft portion and a length of the second shaft portion.

10. The power receiving device according to claim 6, wherein
the winding axis direction is a direction perpendicular to the facing direction.

11. A power transfer system characterized by comprising:
a power receiving device; and
a power transmitting device configured to contactlessly transmit electric power to the power receiving device in a state where the power transmitting device faces the power receiving device,
one of the power receiving device and the power transmitting device including
a first coil provided so as to surround a winding axis extending in a winding axis direction that intersects with a facing direction in which the power receiving device and the power transmitting device face each other;
a second coil electrically connected to the first coil and arranged next to the first coil in the winding axis direction with a gap from the first coil; and
a switching device configured to, when a coil included in the other one of the power receiving device and the power transmitting device is a solenoid coil, connect the first coil and the second coil in parallel with each other such that first magnetic flux generated inside the first coil and second magnetic flux generated inside the second coil flow in the same direction along the winding axis, and the switching device configured to, when the coil included in the other one of the power receiving device and the power transmitting device is a circular coil, connect the first coil and the second coil in series with each other such that the first magnetic flux and the second magnetic flux flow in opposite directions along the winding axis.

* * * * *